US012302104B1

(12) United States Patent
Pan

(10) Patent No.: US 12,302,104 B1
(45) Date of Patent: May 13, 2025

(54) METHOD AND APPARATUS FOR SUPPORTING NETWORK ASSISTANCE SECURITY ESTABLISHMENT IN UE-TO-UE RELAY IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/983,922

(22) Filed: Dec. 17, 2024

Related U.S. Application Data

(60) Provisional application No. 63/614,718, filed on Dec. 26, 2023.

(51) Int. Cl.
| | | |
|---|---|---|
| *H04W 12/082* | (2021.01) | |
| *H04W 12/062* | (2021.01) | |
| *H04W 12/08* | (2021.01) | |
| *H04W 76/14* | (2018.01) | |
| *H04W 76/20* | (2018.01) | |
| *H04W 88/04* | (2009.01) | |
| *H04W 92/18* | (2009.01) | |

(52) U.S. Cl.
CPC ........... *H04W 12/08* (2013.01); *H04W 76/14* (2018.02); *H04W 76/20* (2018.02); *H04W 88/04* (2013.01); *H04W 92/18* (2013.01)

(58) Field of Classification Search
CPC ...... H04W 12/08; H04W 76/20; H04W 76/14
USPC .............................................................. 726/4
See application file for complete search history.

(56) References Cited

U.S. PATENT DOCUMENTS

| | | | | |
|---|---|---|---|---|
| 2023/0389094 A1* | 11/2023 | Pan | ..................... | H04L 69/324 |
| 2024/0015820 A1* | 1/2024 | Zhang | ................... | H04W 76/19 |
| 2024/0049326 A1* | 2/2024 | Zhang | ................... | H04W 76/19 |
| 2024/0107296 A1* | 3/2024 | Chen | ...................... | H04W 12/04 |
| 2024/0155716 A1* | 5/2024 | Pan | ..................... | H04W 76/11 |
| 2024/0314646 A1* | 9/2024 | Orsino | ................. | H04W 76/27 |
| 2024/0340980 A1* | 10/2024 | Ji | ........................ | H04W 76/10 |

* cited by examiner

*Primary Examiner* — Haresh N Patel
(74) *Attorney, Agent, or Firm* — Blue Capital Law Firm, P.C.

(57) ABSTRACT

A method and device for a relay User Equipment (UE) are disclosed. The relay UE receives a first direct communication request message from a source end UE for establishing a UE-to-UE (U2U) relay communication with a target end UE. The relay UE also sends a second direct communication request message to the target end UE in a direct link establishment procedure used for establishing a direct link for supporting the U2U relay communication. The relay UE further receives a direct communication security request message from the target end UE for triggering the relay UE to perform a key request procedure with a network. In addition, the relay UE sends a direct communication security reject message to the target end UE if the key request procedure with the network fails. Furthermore, the relay UE aborts the direct link establishment procedure after sending the direct communication security reject message.

12 Claims, 23 Drawing Sheets

METHOD AND APPARATUS FOR SUPPORTING NETWORK ASSISTANCE SECURITY ESTABLISHMENT IN UE-TO-UE RELAY IN A WIRELESS COMMUNICATION SYSTEM

CROSS-REFERENCE TO RELATED APPLICATIONS

The present Application claims the benefit of U.S. Provisional Patent Application Ser. No. 63/614,718 filed on Dec. 26, 2023, the entire disclosure of which is incorporated herein in its entirety by reference.

FIELD

This disclosure generally relates to wireless communication networks, and more particularly, to a method and apparatus for supporting network assistance security establishment in UE-to-UE relay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a relay User Equipment (UE) are disclosed. In one embodiment, the relay UE receives a first direct communication request message from a source end UE for establishing a UE-to-UE (U2U) relay communication with a target end UE. The relay UE also sends a second direct communication request message to the target end UE in a direct link establishment procedure used for establishing a direct link for supporting the U2U relay communication. The relay UE further receives a direct communication security request message from the target end UE for triggering the relay UE to perform a key request procedure with a network. In addition, the relay UE sends a direct communication security reject message to the target end UE if the key request procedure with the network fails. Furthermore, the relay UE aborts the direct link establishment procedure after sending the direct communication security reject message.

BRIEF DESCRIPTION OF THE DRAWINGS

FIG. 6 is a reproduction of FIG. 16.12.2.x-2 of 3GPP R2-2314074. FIG. 6.7.1.1-1 of 3GPP TS 23.304 V18.4.0.

FIG. 7.2.2.2.1 of 3GPP TS 24.554 V18.2.0.

FIG. 7.2.2.2.2 of 3GPP TS 24.554 V18.2.0.

FIG. 7.2.10.2.1 of 3GPP TS 24.554 V18.2.0.

FIG. 8.2.10.2.4.2.1 of 3GPP TS 24.554 V18.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V18.4.0, "Proximity based Services (ProSe) in the 5G System (5GS) (Release 18)"; TS 24.554 V18.2.0, "Proximity-services (ProSe) in 5G System (5GS) protocol aspects; Stage 3 (Release 18)"; TS 33.503 V18.0.0, "Security aspects of Proximity based Services (ProSe) in the 5G System (5GS) (Release 18)"; and C1-238124, "5G ProSe UE-to-UE relay direct link security establishment procedure", Xiaomi. The standards and documents listed above are hereby expressly incorporated by reference in their entirety.

Figure 1:
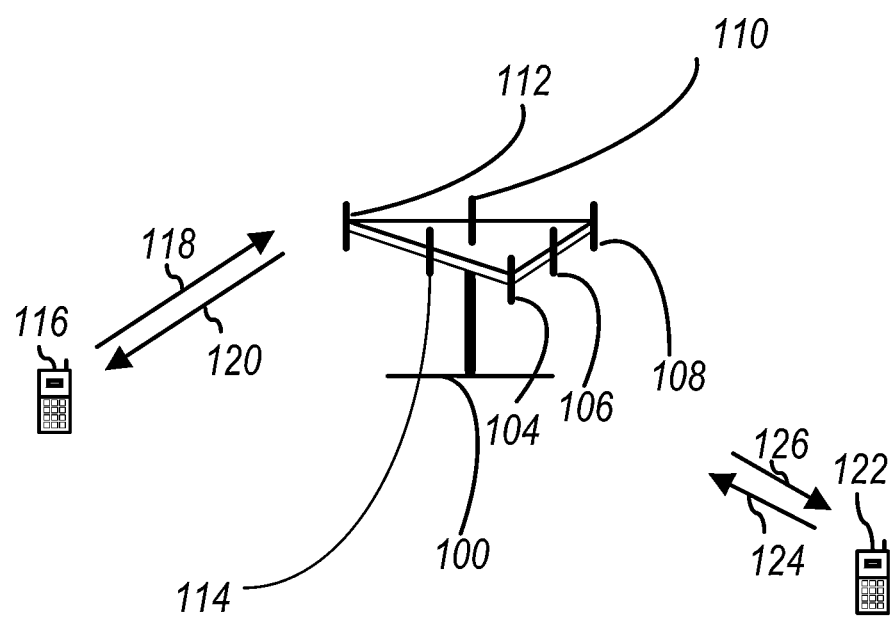
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
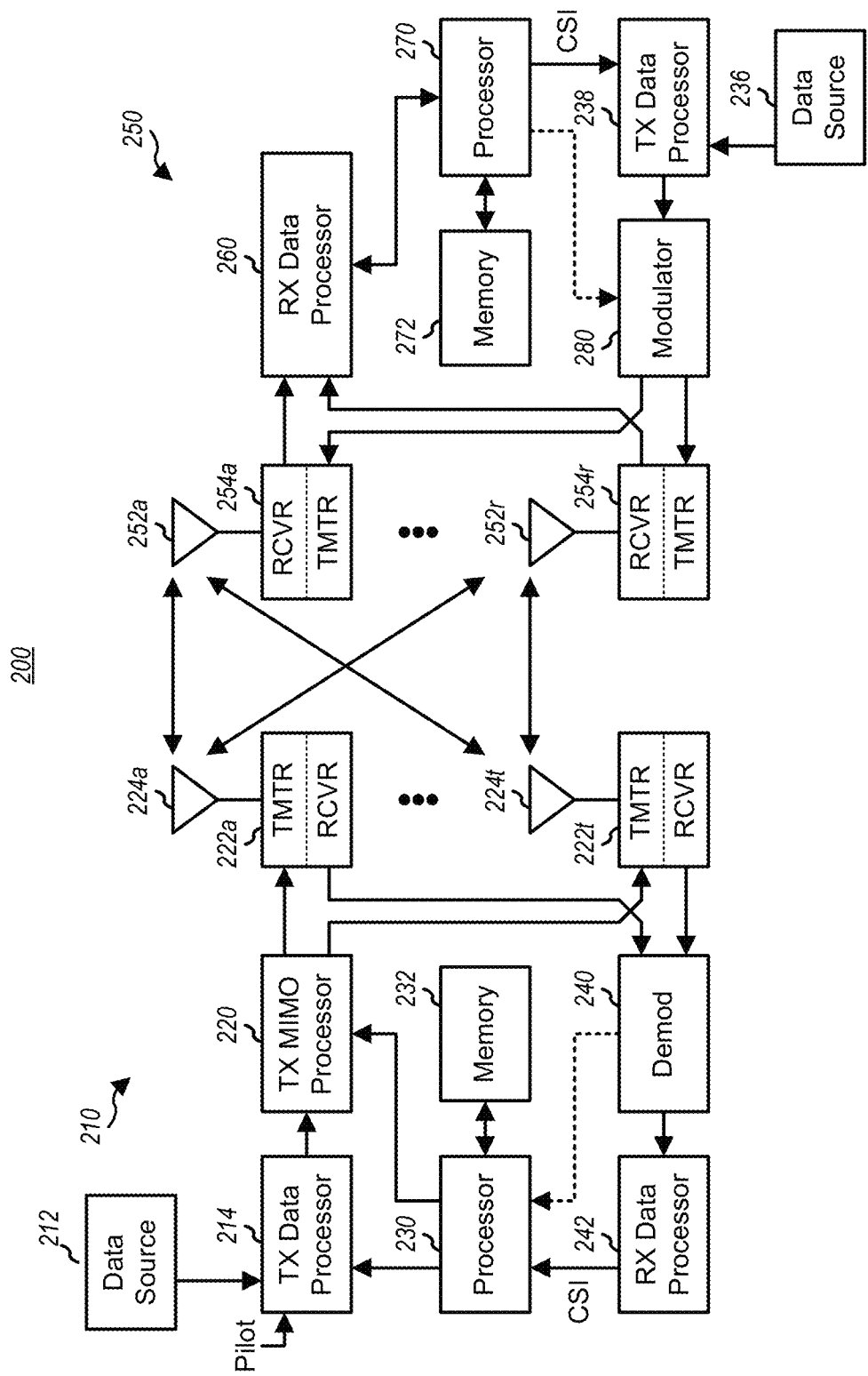
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 then determines which pre-coding matrix to use for determining the beamforming weights then processes the extracted message.

Figure 3:
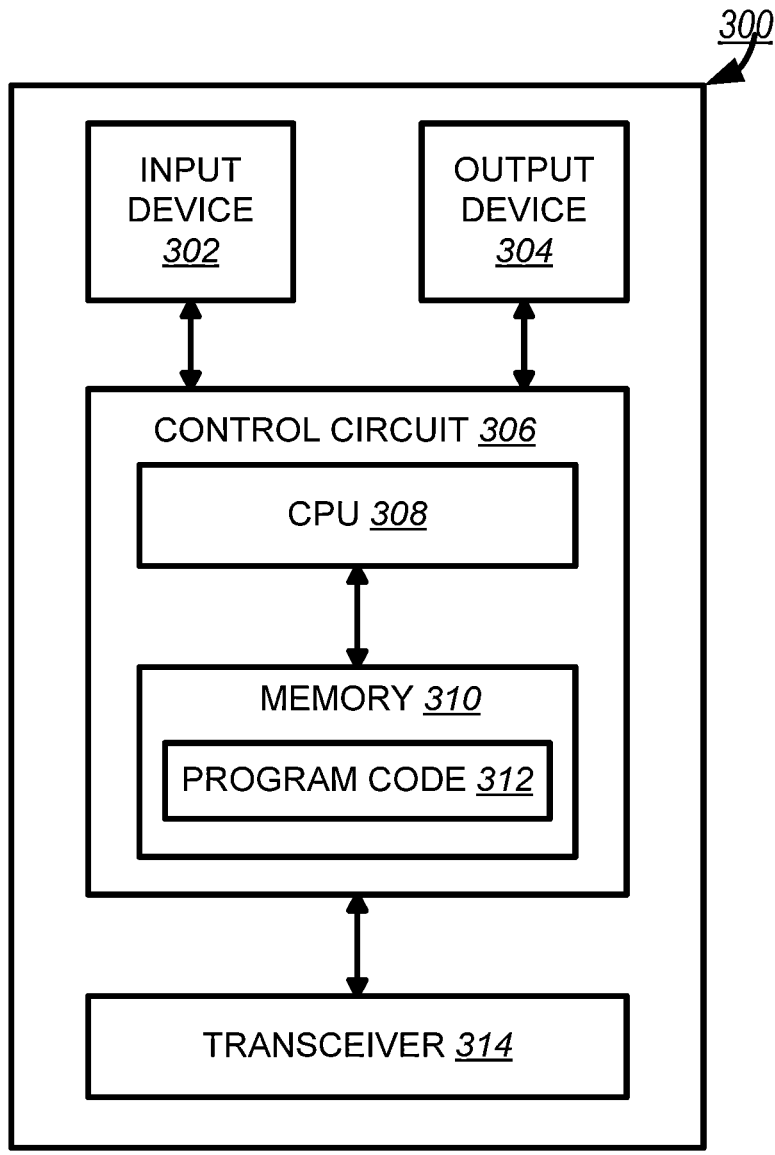
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
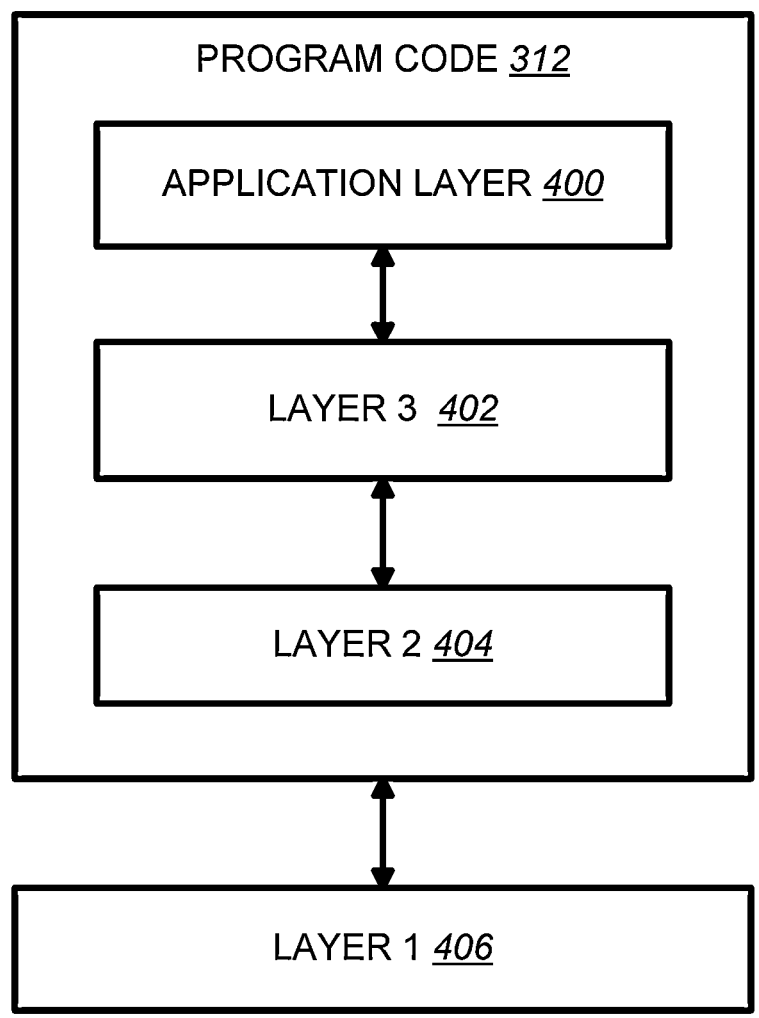
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP 23.304 introduced some procedures related to unicast link communication as follows:

6.4.3.1 Layer-2 Link Establishment Over PC5 Reference Point

To perform unicast mode of ProSe Direct communication over PC5 reference point, the UE is configured with the related information as described in clause 5.1.3.

Figure 6:
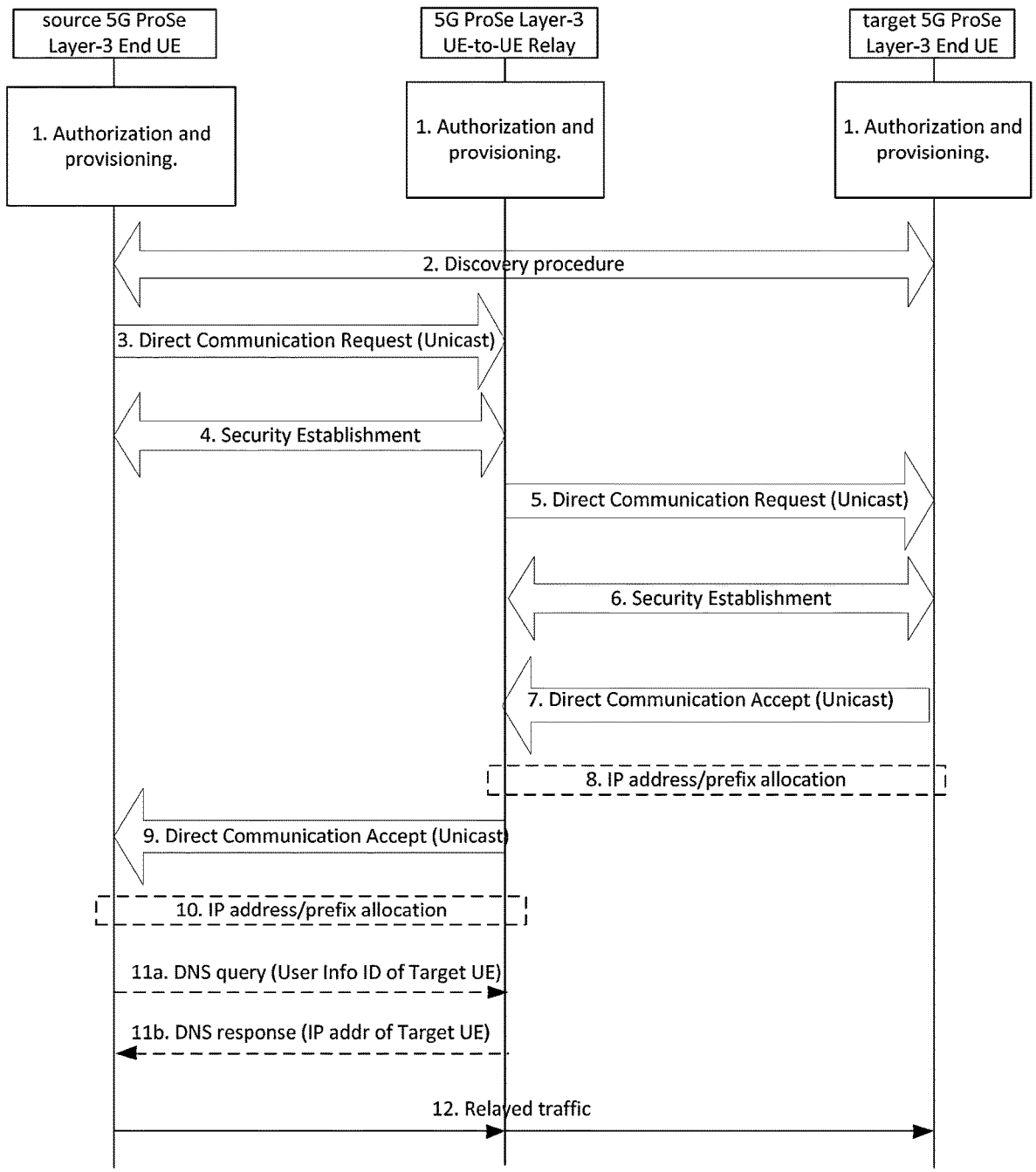
FIG. 6.4.3.1-1 of 3GPP TS 23.304 V18.4.0.

FIG. 6.4.3.1-1 shows the layer-2 link establishment procedure for the unicast mode of ProSe Direct communication over PC5 reference point.

Figure 5:
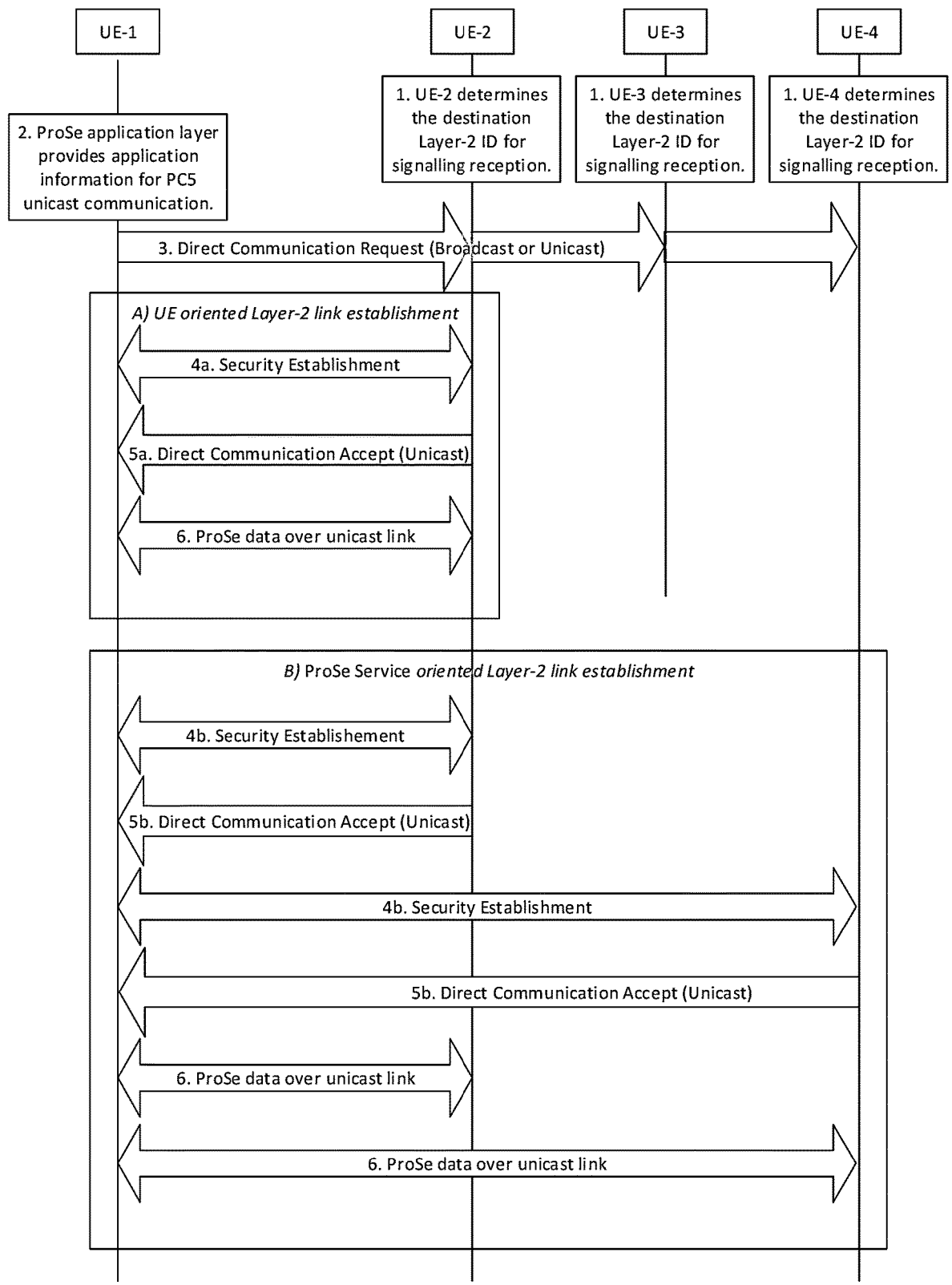
FIG. 5 is a reproduction of FIG. 16.12.2.x-1 of 3GPP R2-2314074.

FIG. 6.4.3.1-1 of 3GPP TS 23.304 V18.4.0,
Entitled "Layer-2 Link Establishment Procedure",
is Reproduced as FIG. 5

1. The UE(s) determine the destination Layer-2 ID for signalling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.
   The ProSe application layer in UE-1 may provide ProSe Application Requirements for this unicast communication. UE-1 determines the PC5 QoS parameters and PFI as specified in clause 5.6.1.
   If UE-1 decides to reuse the existing PC5 unicast link as specified in clause 5.3.4, the UE triggers the Layer-2 link modification procedure as specified in clause 6.4.3.4.
3. UE-1 sends a Direct Communication Request message to initiate the unicast layer-2 link establishment procedure. The Direct Communication Request message includes:
   Source User Info: the initiating UE's Application Layer ID (i.e. UE-1's Application Layer ID).
   If the ProSe application layer provided the target UE's Application Layer ID in step 2, the following information is included:
      Target User Info: the target UE's Application Layer ID (i.e. UE-2's Application Layer ID).
   ProSe Service Info: the information about the ProSe identifier(s) requesting Layer-2 link establishment.
   Security Information: the information for the establishment of security.
   NOTE 1: The Security Information and the necessary protection of the Source User Info and Target User Info are defined in TS 33.503 [29].
      The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.
      UE-1 sends the Direct Communication Request message via PC5 broadcast or unicast using the source Layer-2 ID and the destination Layer-2 ID.
      A default PC5 DRX configuration may be used for transmitting and receiving of this message (see TS 38.300 [12]).
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.
   NOTE 2: The signalling for the Security Procedure is defined in TS 33.503 [29].
   When the security protection is enabled, UE-1 sends the following information to the target UE:
      If IP communication is used:
         IP Address Configuration: For IP communication, IP address configuration is required for this link and indicates one of the following values:
            "DHCPv4 server" if only IPv4 address allocation mechanism is supported by the initiating UE, i.e., acting as a DHCPv4 server; or
            "IPv6 Router" if only IPv6 address allocation mechanism is supported by the initiating UE, i.e., acting as an IPv6 Router; or
            "DHCPv4 server & IPv6 Router" if both IPv4 and IPv6 address allocation mechanism are supported by the initiating UE; or
            "address allocation not supported" if neither IPv4 nor IPv6 address allocation mechanism is supported by the initiating UE.
         Link-Local IPv6 Address: a link-local IPv6 address formed locally based on RFC 4862 [17]

if UE-1 does not support the IPv6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).

Optional PC5 QoS Rule(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 [17] if the target UE does not support the IPv6 IP address allocation mechanism, i.e. the IP Address Configuration indicates "address allocation not supported" and UE-1 included a link-local IPv6 address in the security establishment in step 4. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Two UEs may negotiate the PC5 DRX configuration in the AS layer and the PC5 DRX parameter values can be configured per pair of source and destination Layer-2 IDs in the AS layer.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

[ . . . ]

6.7.1 5G ProSe Communication Via 5G ProSe Layer-3 UE-to-UE Relay 6.7.1.1 Layer-2 Link Establishment for PC5 Communication Via 5G ProSe Layer-3 UE-to-UE Relay FIG. 6.7.1.1-1 shows the procedure for Layer-2 link establishment via 5G ProSe Layer-3 UE-to-UE Relay.

FIG. 6.7.1.1-1 of 3GPP TS 23.304 V18.4.0, Entitled "Layer-2 Link Establishment Via 5G ProSe Layer-3 UE-to-UE Relay", is Reproduced as FIG. 6

1. Service authorization and provisioning are performed for source 5G ProSe Layer-3 End UE, target 5G ProSe Layer-3 End UE and 5G ProSe Layer-3 UE-to-UE Relay as described in clause 6.2.

2. The source 5G ProSe Layer-3 End UE performs discovery of a 5G ProSe Layer-3 UE-to-UE Relay as described in clause 6.3.2.4.

3. The source 5G ProSe Layer-3 End UE sends a Direct Communication Request message to initiate the unicast Layer-2 link establishment procedure with the 5G ProSe Layer-3 UE-to-UE Relay. The parameters included in the Direct Communication Request message are described in clause 6.4.3.7.

The Source Layer-2 ID of the Direct Communication Request message is self-assigned by the source 5G ProSe Layer-3 End UE and the Destination Layer-2 ID is set to the Source Layer-2 ID of the discovery message of the 5G ProSe Layer-3 UE-to-UE Relay.

The source 5G ProSe Layer-3 End UE gets application information and optional ProSe Application Requirements from ProSe application layer, and determines the end-to-end QoS parameters as described in clause 5.6.3.1.

4. If the User Info ID of 5G ProSe Layer-3 UE-to-UE Relay in the Direct Communication Request message matches the 5G ProSe UE-to-UE Relay's User Info ID and the RSC in the Direct Communication Request matches one RSC that the relay is (pre)configured with, as specified in clause 5.1.5.1, the 5G ProSe Layer-3 UE-to-UE Relay responds by establishing the security with the source 5G ProSe Layer-3 End UE. When the security protection is enabled, the source 5G ProSe Layer-3 End UE sends the parameters as described in clause 6.4.3.7 to the 5G ProSe Layer-3 UE-to-UE Relay.

If the Ethernet MAC address of source 5G ProSe Layer-3 End UE is already used by another 5G ProSe Layer-3 End UE, then the 5G ProSe Layer-3 UE-to-UE Relay rejects the direct link establishment indicating that the MAC address is not unique.

The Source Layer-2 ID used for the security establishment procedure is self-assigned by the 5G ProSe Layer-3 UE-to-UE Relay and the Destination Layer-2 ID is set to the Source Layer-2 ID of the received Direct Communication Request message.

The 5G ProSe Layer-3 UE-to-UE Relay shall choose different Source Layer-2 IDs for PC5 links of different types of traffic, i.e., IP traffic, Ethernet traffic and Unstructured traffic. If the PC5 link is used for transferring Unstructured traffic, the 5G ProSe Layer-3 UE-to-UE Relay shall choose different Source Layer-2 IDs for different pair of source and target 5G ProSe Layer-3 End UEs.

Upon receiving the security establishment procedure messages, the source 5G ProSe Layer-3 End UE obtains the 5G ProSe Layer-3 UE-to-UE Relay's Layer-2 ID for future communication, for signalling and data traffic for this unicast link.

5. After the Security Establishment procedure in step 4 is completed, the 5G ProSe Layer-3 UE-to-UE Relay sends a Direct Communication Request message to initiate the unicast Layer-2 link establishment procedure with the target 5G ProSe Layer-3 End UE. The parameters included in the Direct Communication Request message are described in clause 6.4.3.7.

The Source Layer-2 ID of the Direct Communication Request message is self-assigned by the 5G ProSe Layer-3 UE-to-UE Relay and the Destination Layer-2 ID is the unicast Layer-2 ID of target 5G ProSe Layer-3 End UE associated with the User Info ID of target 5G ProSe Layer-3 End UE.

The 5G ProSe Layer-3 UE-to-UE Relay shall choose different Source Layer-2 IDs for PC5 links of different types of traffic, i.e., IP traffic, Ethernet traffic and Unstructured traffic. If the PC5 link is used for transferring Unstructured traffic, the 5G ProSe Layer-3 UE-to-UE Relay shall choose different Source Layer-2 IDs for different pair of source and target 5G ProSe Layer-3 End UEs.

6. If the User Info ID of target 5G ProSe Layer-3 End UE and RSC included in the Direct Communication Request match the target UE's User Info ID and the RSC that the target UE is (pre)configured with as specified in clause 5.1.5.1, the target 5G ProSe Layer-3 End UE responds by establishing the security with the 5G ProSe Layer-3 UE-to-UE Relay. When the security protection is enabled, the 5G ProSe Layer-3 UE-to-UE Relay sends the parameters as described in clause 6.4.3.7 to the target 5G ProSe Layer-3 End UE. The Source Layer-2 ID used for the security establishment procedure is self-assigned by the target 5G ProSe Layer-3 End UE and the Destination Layer-2 ID is set to the Source Layer-2 ID of the received Direct Communication Request message.

Upon receiving the security establishment procedure messages, the 5G ProSe Layer-3 UE-to-UE Relay obtains the target 5G ProSe Layer-3 End UE's Layer-2 ID for future communication, for signalling and data traffic for this unicast link.

7. The target 5G ProSe Layer-3 End UE sends a Direct Communication Accept message to the 5G ProSe Layer-3 UE-to-UE Relay that has successfully established security with. The parameters included in the Direct Communication Accept message are described in clause 6.4.3.7.

NOTE: The 5G ProSe Layer-3 UE-to-UE Relay can detect that the Ethernet MAC address of target 5G ProSe Layer-3 End UE is already used by another 5G ProSe Layer-3 End UE when it receives the Direct Communication Accept message.

8. For IP traffic, IPv6 prefix or IPv4 address is allocated for the target 5G ProSe Layer-3 End UE as defined in clause 5.5.1.4.

9. After receiving the Direct Communication Accept message from the target 5G ProSe Layer-3 End UE, the 5G ProSe Layer-3 UE-to-UE Relay sends a Direct Communication Accept message to the source 5G ProSe Layer-3 End UE that has successfully established security with. The parameters included in the Direct Communication Accept message are described in clause 6.4.3.7.

10. For IP traffic, IPv6 prefix or IPv4 address is allocated for the source 5G ProSe Layer-3 End UE as defined in clause 5.5.1.4.

11. For IP communication, the 5G ProSe Layer-3 UE-to-UE Relay may store an association of User Info ID and the IP address of target 5G ProSe Layer-3 End UE into its DNS entries and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 10 if the IP address of target 5G ProSe Layer-3 End UE is not received in step 9 and the 5G ProSe Layer-3 UE-to-UE Relay returns the IP address of the target 5G ProSe Layer-3 End UE to the source 5G ProSe Layer-3 End UE.

For Ethernet communication, the 5G ProSe Layer-3 UE-to-UE Relay maintains the association between PC5 links and Ethernet MAC addresses received from the 5G ProSe Layer-3 End UE.

For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.

12. The source 5G ProSe Layer-3 End UE communicates with the target 5G ProSe Layer-3 End UE via the 5G ProSe Layer-3 UE-to-UE Relay.

In the case of one source 5G ProSe Layer-3 End UE communicates with multiple target 5G ProSe Layer-3 End UEs, the PC5 link between the source 5G ProSe Layer-3 End UE and the 5G ProSe Layer-3 UE-to-UE Relay can be shared for multiple target 5G ProSe Layer-3 End UEs per RSC while the PC5 links may be established individually between the 5G ProSe Layer-3 UE-to-UE Relay and target 5G ProSe Layer-3 End UEs per RSC. For the shared PC5 link, the Layer-2 link modification procedure shall be used. The parameters used in the Layer-2 link modification procedure are described in clause 6.4.3.7.

In the case of multiple source 5G ProSe Layer-3 End UEs communicate with one target 5G ProSe Layer-3 End UE, the PC5 link between the 5G ProSe Layer-3 UE-to-UE Relay and the target 5G ProSe Layer-3 End UE can be shared per RSC while the PC5 links may be established individually between the source 5G ProSe Layer-3 End UEs and the 5G ProSe Layer-3 UE-to-UE Relay per RSC. For the shared PC5 link, the Layer-2 link modification procedure shall be used. The parameters used in the Layer-2 link modification procedure are described in clause 6.4.3.7.

3GPP 24.554 introduced some procedures related to unicast link communication as follows:

7.2.2 5G ProSe Direct Link Establishment Procedure

7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links between the UE and multiple target UEs. The UE sending the request message is called the "initiating UE" and the other UE is called the "target UE". If the request message does not indicate the specific target UE (i.e., target user info is not included in the request message) and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE 1: The recommended maximum number of established 5G ProSe direct links is 8. When the 5G ProSe direct link establishment procedure for a 5G ProSe layer-3 remote UE completes successfully and if there is a PDU session established for relaying the traffic of the 5G ProSe remote UE, the 5G ProSe layer-3 UE-to-network relay UE shall perform the remote UE report procedure as specified in 3GPP TS 24.501 [11].

NOTE 2: A single PC5 unicast link is established between a 5G ProSe layer-2 UE-to-network relay UE and a 5G ProSe layer-2 remote UE for supporting PDU sessions of the 5G ProSe layer-2 remote UE, as specified in 3GPP TS 38.300 [21].

7.2.2.2 5G ProSe Direct Link Establishment Procedure Initiation by Initiating UE The initiating UE shall meet the following pre-conditions before initiating this procedure:

a) the UE receives a request from upper layers to transmit the packet for ProSe application over PC5, a request from lower layers, or a PROSE DIRECT LINK ESTABLISHMENT REQUEST message or PROSE DIRECT LINK MODIFICATION REQUEST message in case of 5G ProSe UE-to-UE relay, to trigger ProSe direct link establishment;

b) the communication mode is unicast mode (e.g., pre-configured as specified in clause 5.2.4 or indicated by upper layers);

c) the link layer identifier for the initiating UE (i.e., layer-2 ID used for unicast communication) is available (e.g., pre-configured or self-assigned) and is not being used by other existing 5G ProSe direct links within the initiating UE;

d) the link layer identifier for the destination UE (i.e., the unicast layer-2 ID of the target UE or the broadcast layer-2 ID) is available to the initiating UE (e.g., pre-configured, obtained as specified in clause 5.2, known via prior ProSe direct communication or indicated by lower layers);

NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.

e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, is authorized to use a 5G ProSe UE-to-network relay UE, is authorized to use a 5G ProSe UE-to-UE relay UE or is authorized to act as a 5G ProSe UE-to-UE relay UE. The UE considers that it is not served by NG-RAN if the following conditions are met:

1) not served by NG-RAN for ProSe direct communication over PC5;

2) in limited service state as specified in 3GPP TS 23.122 [14], if the reason for the UE being in limited service state is one of the following;

i) the UE is unable to find a suitable cell in the selected PLMN as specified in 3GPP TS 38.304 [15];

ii) the UE received a REGISTRATION REJECT message or a SERVICE REJECT message with the 5GMM cause #11 "PLMN not allowed" as specified in 3GPP TS 24.501 [11]; or iii) the UE received a REGISTRATION REJECT message or a SERVICE REJECT message with the 5GMM cause #7 "5GS services not allowed" as specified in 3GPP TS 24.501 [11]; or 3) in limited service state as specified in 3GPP TS 23.122 [14] for reasons other than i), ii) or iii) above and located in a geographical area for which the UE is provisioned with "non-operator managed" radio parameters as specified in clause 5.2;

Editor's note: The UE behavior in limited service state if the 5G ProSe direct link establishment procedure is for direct communication between the 5G ProSe end UE and the 5G ProSe UE-to-UE relay UE needs to be revisited, which will be determined by SA2.

f) there is no existing 5G ProSe direct link for the pair of peer application layer IDs, or there is an existing 5G ProSe direct link for the pair of peer application layer IDs and:
  1) the network layer protocol of the existing 5G ProSe direct link is not identical to the network layer protocol required by the upper layer in the initiating UE for this ProSe application;
  2) the security policy (either signalling security policy or user plane security policy) corresponding to the ProSe identifier is not compatible with the security policy of the existing 5G ProSe direct link; or
  3) in case of the 5G ProSe direct link establishment procedure is for direct communication between the 5G ProSe layer-3 remote UE and the 5G ProSe layer-3 UE-to-network relay UE, the existing 5G ProSe direct link for the peer UE is established with a different RSC or established not for direct communication between the 5G ProSe layer-3 remote UE and the 5G ProSe layer-3 UE-to-network relay UE;
  4) in case of the 5G ProSe direct link establishment procedure is for direct communication between the 5G ProSe layer-2 remote UE and the 5G ProSe layer-2 UE-to-network relay UE, the existing 5G ProSe direct link for the peer UE is established not for direct communication between the 5G ProSe layer-2 remote UE and the 5G ProSe layer-2 UE-to-network relay UE;
  5) in case of the 5G ProSe direct link establishment procedure is for direct communication between the source 5G ProSe layer-3 end UE and the 5G ProSe layer-3 UE-to-UE relay UE, the initiating UE acts as the source 5G ProSe end UE, the existing 5G ProSe direct link for the peer UE is established with a different RSC or established not for direct communication between the source 5G ProSe layer-3 end UE and the 5G ProSe layer-3 UE-to-UE relay UE;
  6) in case of the 5G ProSe direct link establishment procedure is for direct communication between the 5G ProSe UE-to-UE relay UE and the target 5G ProSe end UE without integrated discovery, the initiating UE acts as the 5G ProSe UE-to-UE relay UE, the 5G ProSe direct link security mode control procedure between the source 5G ProSe end UE and the initiating UE has been sucessfully completed, and there is no 5G ProSe direct link established between the initiating UE and the target 5G ProSe end UE with the RSC received in PROSE DIRECT LINK ESTABLISHMENT REQUEST message for 5G ProSe UE-to-UE relay;
  7) in case of the 5G ProSe direct link establishment procedure is for direct communication between the 5G ProSe layer-3 UE-to-UE relay UE and the target 5G ProSe layer-3 end UE, the initiating UE acting as the 5G ProSe layer-3 UE-to-UE relay UE receives a PROSE DIRECT LINK ESTABLISHMENT REQUEST message including the relay indication, and there is no 5G ProSe direct link established between the initiating UE and the target 5G ProSe end UE with the RSC received in PROSE DIRECT LINK ESTABLISHMENT REQUEST message for 5G ProSe UE-to-UE relay; or
  8) in case of the 5G ProSe direct link establishment procedure is for direct communication between the 5G ProSe layer-3 UE-to-UE relay UE and the target 5G ProSe layer-3 end UE, the initiating UE acting as the 5G ProSe layer-3 UE-to-UE relay UE receives a PROSE DIRECT LINK MODIFICATION REQUEST message to establish 5G ProSe UE-to-UE relay communication with an additional 5G ProSe layer-3 end UE as specified in clause 7.2.3.2, and there is no 5G ProSe direct link established between the initiating UE and the additional target 5G ProSe end UE with the RSC received in PROSE DIRECT LINK MODIFICATION REQUEST message for 5G ProSe UE-to-UE relay;

g) the number of established 5G ProSe direct links is less than the implementation-specific maximum number of established 5G ProSe direct links allowed in the UE at a time; and h) timer T5088 is not associated with the link layer identifier for the destination UE or timer T5088 associated with the link layer identifier for the destination UE has already expired or stopped.

After receiving the service data or request from the upper layers, the initiating UE shall derive the PC5 QoS parameters and assign the PQFI(s) for the PC5 QoS flows(s) to be established as specified in clause 7.2.7.

If the 5G ProSe direct link establishment procedure is for direct communication between the 5G ProSe remote UE and the 5G ProSe UE-to-network relay UE, then the UE shall apply the DUCK or DUSK used for UE-to-network relay discovery along with the UTC-based counter for encrypting:
  a) the relay service code; and
  b) the UP-PRUK ID or CP-PRUK ID, if available,
as specified in clause 6.3.5.2 of 3GPP TS 33.503 [34], and the UE shall use the security protected relay service code and the security protected UP-PRUK ID or security protected CP-PRUK ID for creating a PROSE DIRECT LINK ESTABLISHMENT REQUEST message.

NOTE 2: If the UE is neither configured with DUCK nor DUSK, the relay service code and the UP-PRUK ID or CP-PRUK ID are not encrypted.

In order to initiate the 5G ProSe direct link establishment procedure, the initiating UE shall create a PROSE DIRECT LINK ESTABLISHMENT REQUEST message. The initiating UE:
  a) shall include the source user info set to the initiating UE's application layer ID received from upper layers, or set to the user info ID of the source 5G ProSe end UE if the 5G ProSe direct link establishment procedure is for 5G ProSe direct communication between the 5G ProSe end UE and the 5G ProSe UE-to-UE relay UE;
  b) shall include the ProSe identifier(s) received from upper layer if the 5G ProSe direct link establishment procedure is not for 5G ProSe direct communication between the 5G ProSe remote UE and the 5G ProSe UE-to-network relay UE;
  c) shall include the target user info set to the target UE's application layer ID if received from upper layers or if known based on the unicast layer-2 ID of target UE (i.e. destination layer-2 ID) as described in clause 5.8.2.4 of 3GPP TS 23.304 [3], to the user info ID of the 5G ProSe UE-to-network relay UE obtained during the 5G ProSe UE-to-network relay discovery procedure, or to the user info ID of the target 5G ProSe end UE if:
    1) the initiating UE is acting as the source 5G ProSe end UE and the user info ID of the target 5G ProSe end UE is obtained during the 5G ProSe UE-to-UE relay discovery procedure; or
2) the initiating UE is acting as the 5G ProSe UE-to-UE relay UE and the user info ID of the target 5G ProSe end UE is obtained in the PROSE DIRECT LINK ESTABLISHMENT REQUEST message or PROSE DIRECT LINK MODIFICATION REQUEST message from the source 5G ProSe end UE;

ca) shall include the UE-to-UE relay UE user info set to the user info ID of the 5G ProSe UE-to-UE relay UE:
1) if obtained during the 5G ProSe UE-to-UE relay discovery procedure and the 5G ProSe direct link establishment procedure is for 5G ProSe direct communication between the source 5G ProSe end UE and the 5G ProSe UE-to-UE relay UE; or
2) if the initiating UE is acting as the 5G ProSe UE-to-UE relay UE and user info ID is configured at configuration parameters for 5G ProSe UE-to-UE relay as specified in clause 5.2.7;

cb) shall include the target end UE layer-2 ID set to the layer-2 ID of the target 5G ProSe end UE, if the initiating UE is acting as the source 5G ProSe end UE and the layer-2 ID of the target 5G ProSe end UE is available in the source 5G ProSe end UE via the previous direct communication;

d) if the 5G ProSe direct link is not for direct communication between the 5G ProSe remote UE and the 5G ProSe UE-to-network relay UE:
1) shall include the key establishment information container if the UE PC5 unicast signalling integrity protection policy is set to "Signalling integrity protection required" or "Signalling integrity protection preferred" and may include the key establishment information container if the UE PC5 unicast signalling integrity protection policy is set to "Signalling integrity protection not needed";

NOTE 3: The key establishment information container is provided by upper layers.

e) shall include:
1) a Nonce_1, if the direct communication is not between the 5G ProSe remote UE and the 5G ProSe UE-to-network relay UE, or if the direct communication is between the 5G ProSe remote UE and the 5G ProSe UE-to-network relay UE and the security procedure over control plane is used as specified in 3GPP TS 33.503 [34]; or
2) a $K_{NRP}$ freshness parameter 1, if the direct communication is between the 5G ProSe remote UE and the 5G ProSe UE-to-network relay UE and the security procedure over user plane is used as specified in 3GPP TS 33.503 [34];
set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";

NOTE 4: The Nonce_1 IE in the PROSE DIRECT LINK ESTABLISHMENT REQUEST message is used to hold the value of Nonce_1 or $K_{NRP}$ freshness parameter 1.

f) shall include its UE security capabilities indicating the list of algorithms that the initiating UE supports for the security establishment of this 5G ProSe direct link;

g) shall include the MSB of $K_{NRP\text{-}sess}$ ID chosen by the initiating UE as specified in 3GPP TS 33.503 [34] if the UE PC5 unicast signalling integrity protection policy is set to "Signalling integrity protection required" or "Signalling integrity protection preferred";

NOTE 5: If the direct communication is not between the 5G ProSe remote UE and the 5G ProSe UE-to-network relay UE, the $K_{NRP\text{-}sess}$ ID holds the ID that corresponds to $K_{NRP\text{-}sess}$. If the direct communication is between the 5G ProSe remote UE and the 5G ProSe UE-to-network relay UE, the $K_{NRP\text{-}sess}$ ID holds the ID that corresponds to $K_{NRP\text{-}sess}$ (if security procedure over user plane is used) or $K_{relay\text{-}sess}$ (if security procedure over control plane is used).

h) may include a $K_{NRP}$ ID if the initiating UE has an existing $K_{NRP}$ for the target UE and the direct communication is not between the 5G ProSe remote UE and the 5G ProSe UE-to-network relay UE;

i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., "Signalling integrity protection not needed" and "Signalling integrity protection required" are not compatible. In case the 5G ProSe direct link establishment procedure is for direct communication between 5G ProSe remote UE and 5G ProSe UE-to-network relay UE, the Signalling integrity protection policy shall be set to "Signalling integrity protection required";

j) shall include the Relay service code IE set to the relay service code of the target relay UE if the 5G ProSe direct link establishment procedure is for direct communication between the 5G ProSe remote UE and the 5G ProSe UE-to-network relay UE, or to the relay service code indicating the connectivity service requested by the source 5G ProSe end UE if the 5G ProSe direct link establishment procedure is for direct communication between the (source or target) 5G ProSe end UE and the 5G ProSe UE-to-UE relay UE;

k) shall include the UTC-based counter LSB set to the four least significant bits of the UTC-based counter if the 5G ProSe direct link establishment procedure is for direct communication between the 5G ProSe remote UE and the 5G ProSe UE-to-network relay UE;

l) shall include the UE identity IE set to the SUCI of the initiating UE if:
1) the 5G ProSe direct link establishment procedure is for direct communication between the 5G ProSe remote UE and the 5G ProSe UE-to-network relay UE; and
2) the security for 5G ProSe UE-to-network relay uses the security procedure over control plane and the initiating UE does not have a valid CP-PRUK as specified in 3GPP TS 33.503 [34], or, the security for 5G ProSe UE-to-network relay uses the security procedure over user plane and the initiating UE does not have a valid UP-PRUK as specified in 3GPP TS 33.503 [34];

m) shall include the User security key ID IE set to:
1) UP-PRUK ID of the initiating UE if:
i) the 5G ProSe direct link establishment procedure is for direct communication between the 5G ProSe remote UE and the 5G ProSe UE-to-network relay UE;
ii) the initiating UE has a valid UP-PRUK; and iii) the security for 5G ProSe UE-to-network relay uses the security procedure over user plane as specified in 3GPP TS 33.503 [34]; or 2) CP-PRUK ID of the initiating UE that is associated with the relay service code of the target UE if:
   i) the 5G ProSe direct link establishment procedure is for direct communication between the 5G ProSe remote UE and the 5G ProSe UE-to-network relay UE;
   ii) the initiating UE has a valid CP-PRUK is associated with the relay service code of the target UE; and
   iii) the security for 5G ProSe UE-to-network relay uses the security procedure over control plane as specified in 3GPP TS 33.503 [34];

n) shall include the HPLMN ID of the initiating UE, if the UP-PRUK ID of the initiating UE is included and is not in NAI format (see 3GPP TS 33.503 [34]);

o) shall include the MIC IE set to the calculated MIC value as specified in clause 6.3.5.3 of 3GPP TS 33.503 [34] if the 5G ProSe direct link establishment procedure is for direct communication between the 5G ProSe remote UE and the 5G ProSe UE-to-network relay UE and the UE has the DUIK; and p) shall include the relay indication which indicates that the PROSE DIRECT LINK ESTABLISHMENT REQUEST message can be forwarded by a 5G ProSe UE-to-UE relay UE, if the 5G ProSe direct link establishment procedure is for direct communication between the source 5G ProSe end UE and 5G ProSe UE-to-UE relay UE with intergrated discovery;

Editor's note: The security parameters for 5G ProSe UE-to-UE relay and the parameters for 5G ProSe layer-2 UE-to-UE relay are FFS.

After the PROSE DIRECT LINK ESTABLISHMENT REQUEST message is generated, the initiating UE shall pass this message to the lower layers for transmission along with the source layer-2 ID and destination layer-2 ID as follows:

a) if the 5G ProSe direct communication is in a consequence of 5G ProSe direct discovery as defined in clause 6.2.14, clause 6.2.15, clause 8.2.1, and clause 8a.2.1:
   self-assign a source layer-2 ID, and
   1) the destination layer-2 ID set to the received target end UE layer-2 ID in the PROSE DIRECT LINK ESTABLISHMENT REQUEST message or PROSE DIRECT LINK MODIFICATION REQUEST message from the source 5G ProSe end UE if the initiating UE is acting as the 5G ProSe UE-to-UE relay UE;
   2) otherwise, the destination layer-2 ID set to the source layer-2 ID in the received PROSE PC5 DISCOVERY message for discovery procedure;

b) if the initiating UE is acting as the source 5G ProSe end UE and the 5G ProSe direct link establishment procedure is for direct communication between the source 5G ProSe end UE and 5G ProSe UE-to-UE relay UE with integrated discovery:
   self-assign a source layer-2 ID, and set the destination layer-2 ID to the broadcast destination layer-2 ID configured as specified in clause 5.2.4; or c) if the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery:
   self-assign a source layer-2 ID, and set the destination layer-2 ID to:
   1) the target end UE layer-2 ID, if received in the PROSE DIRECT LINK ESTABLISHMENT REQUEST message from the source 5G ProSe end UE; otherwise
   2) the broadcast destination layer-2 ID configured as specified in clause 5.2.4; or d) otherwise:
   self-assign a source layer-2 ID, and the destination layer-2 ID set to the destination layer-2 ID used for unicast initial signalling as specified in clause 5.2.4, NOTE 6: The UE implementation ensures that any value of the self-assigned source layer-2 ID in a) and b) is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.

NOTE 6A: The UE implementation ensures that any value of the self-assigned source layer-2 ID in a) and b) is different from any self-assigned source layer-2 ID(s) in use for 5G ProSe direct communication of a data unit type different from the data unit type of the 5G ProSe direct link being established, if the 5G ProSe direct link establishment procedure is for 5G ProSe direct communication between the 5G ProSe layer-3 UE-to-UE relay UE and the target 5G ProSe layer-3 end UE.

NOTE 6B: The UE implementation ensures that any value of the self-assigned source layer-2 ID in a) and b) is different from any other self-assigned source layer-2 ID(s) in use for 5G ProSe direct communication for Unstructured traffic and a different pair of the user info ID of the source 5G ProSe end UE and the user info ID of the target 5G ProSe end UE, if the 5G ProSe direct link establishment procedure is for 5G ProSe direct communication between the 5G ProSe layer-3 UE-to-UE relay UE and the target 5G ProSe layer-3 end UE and for Unstructured traffic.

NOTE 7: It is possible for the initiating UE to reuse the initiating UE's layer-2 ID used in previous 5G ProSe direct link with the same peer UE, except when the 5G ProSe direct link establishment procedure is for 5G ProSe direct communication between the 5G ProSe layer-3 UE-to-UE relay UE and the target 5G ProSe layer-3 end UE for Unstructured traffic and a different pair of the user info ID of the source 5G ProSe end UE and the user info ID of the target 5G ProSe end UE, and except when the 5G ProSe direct link establishment procedure is for 5G ProSe direct communication between the 5G ProSe layer-3 UE-to-UE relay UE and the target 5G ProSe layer-3 end UE for a data unit type different than the data unit type of the previous 5G ProSe direct link.

and start timer T5080.

NOTE 8: A default PC5 DRX configuration is used for transmitting the PROSE DIRECT LINK ESTABLISHMENT REQUEST message as specified in 3GPP TS 38.300 [21].

The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISH- MENT ACCEPT messages, if any, received from different target UEs for the establishment of multiple 5G ProSe direct links before the expiry of timer T5080.

NOTE 9: In order to ensure successful 5G ProSe direct link establishment, T5080 should be set to a value larger than the sum of T5089 and T5092.

Figure 7:
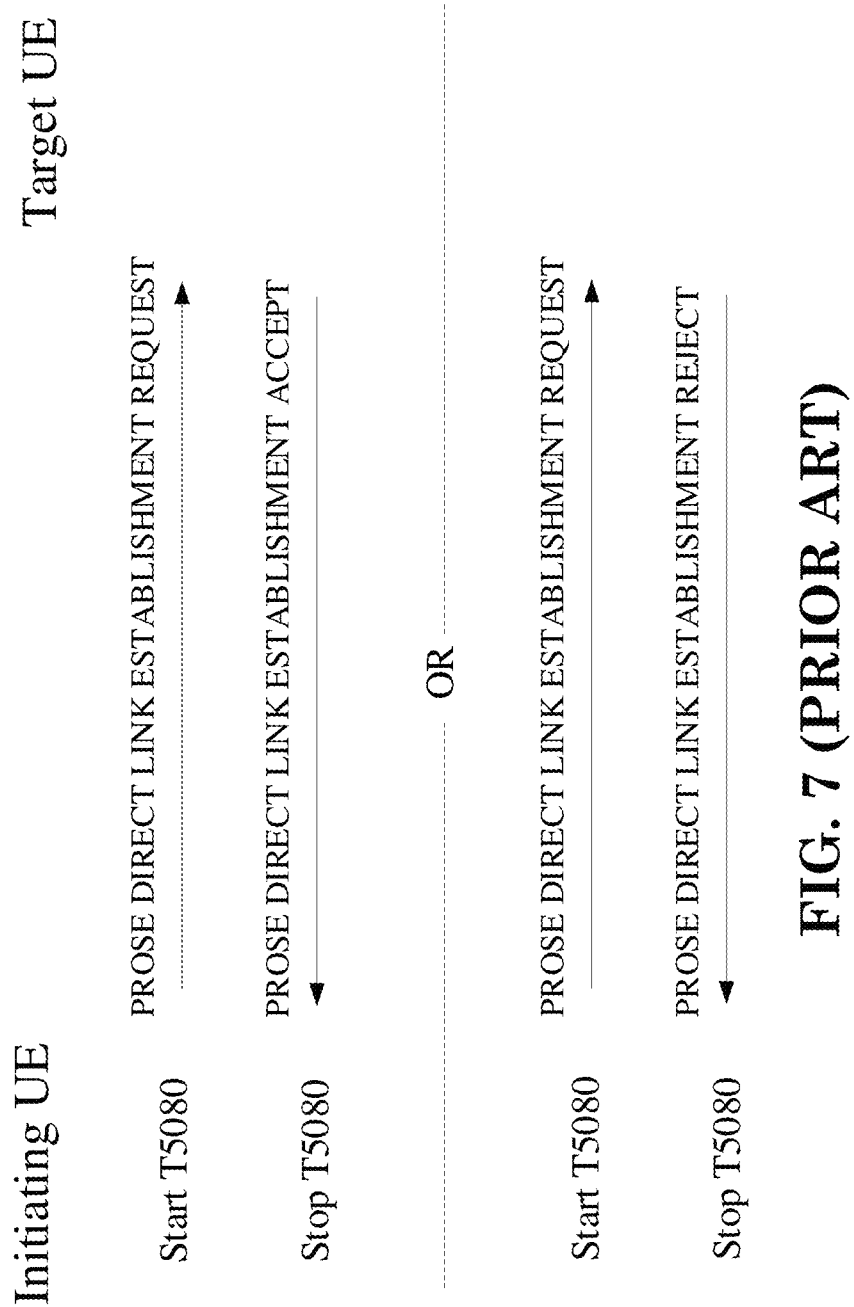
FIG. 7 is a reproduction of FIG. 16.12.x-1 of 3GPP R2-2314074.

FIG. 7.2.2.2.1 of 3GPP TS 24.554 V18.2.0, Entitled "UE Oriented 5G ProSe Direct Link Establishment Procedure", is Reproduced as FIG. 7

Figure 8:
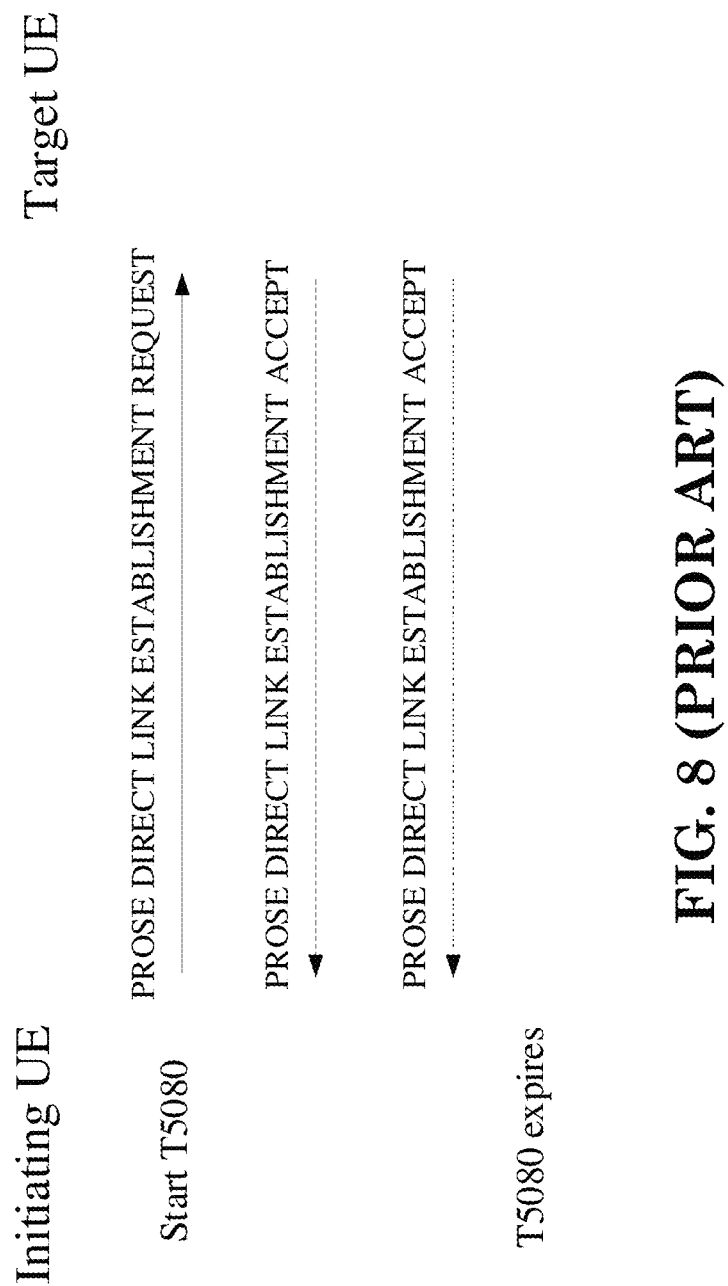
FIG. 8 is a reproduction of FIG. 5.8.9.1.1-1 of 3GPP R2-2314014.

FIG. 7.2.2.2.2 of 3GPP TS 24.554 V18.2.0, Entitled "ProSe Service Oriented 5G ProSe Direct Link Establishment Procedure", is Reproduced as FIG. 8

7.2.2.3 5G ProSe Direct Link Establishment Procedure Accepted by the Target UE Upon receipt of a PROSE DIRECT LINK ESTABLISHMENT REQUEST message, if the target UE accepts this request, the target UE shall uniquely assign a PC5 link identifier, create a 5G ProSe direct link context.

NOTE 1: A default PC5 DRX configuration is used for receiving the PROSE DIRECT LINK ESTABLISHMENT REQUEST message as specified in 3GPP TS 38.300 [21].

If the PROSE DIRECT LINK ESTABLISHMENT REQUEST message is for 5G ProSe direct communication between the 5G ProSe remote UE and the 5G ProSe UE-to-network relay UE, the target UE shall verify the MIC field in the received PROSE DIRECT LINK ESTABLISHMENT REQUEST with the DUIK, if any, and decrypts the encrypted:

a) relay service code; and
    b) UP-PRUK ID or CP-PRUK ID, if received, using the DUCK or DUSK used for 5G ProSe UE-to-network relay discovery (see clause 6.3.5.2 of 3GPP TS 33.503 [34]), and verifies if the relay service code matches with the one that the target UE has sent during 5G ProSe UE-to-network relay discovery procedure.

NOTE 2: If the UE is neither configured with DUCK nor DUSK, the relay service code and the UP-PRUK ID or CP-PRUK ID are not encrypted.

If the target UE is acting as the target 5G ProSe end UE and the 5G ProSe direct link establishment procedure is for direct communication between the 5G ProSe UE-to-UE relay UE and target 5G ProSe end UE with integrated discovery, the target UE upon reception of the PROSE DIRECT LINK ESTABLISHMENT REQUEST messages which contain the same source user info, ProSe identifier(s) and relay service code as received from multiple 5G ProSe UE-to-UE relay UEs, selects one of the 5G ProSe UE-to-UE relay UEs via which to communicate with the source 5G ProSe end UE as specified in TS 23.304, clause 6.7.3.2.

If the 5G ProSe direct link establishment procedure is not for direct communication between the 5G ProSe remote UE and the 5G ProSe UE-to-network relay UE, the target UE may initiate 5G ProSe direct link authentication procedure as specified in clause 7.2.12 and shall initiate 5G ProSe direct link security mode control procedure as specified in clause 7.2.10.

If the 5G ProSe direct link establishment procedure is for direct communication between the 5G ProSe remote UE and the 5G ProSe UE-to-network relay UE, the target UE shall proceed with either:

a) the authentication and key agreement procedure as specified in clause 5.5.4 of 3GPP TS 24.501 [11] if the security procedure over control plane as specified in 3GPP TS 33.503 [34] is used; or
    b) the key request procedure as specified in clause 8.2.10.2.4 if the security procedure over user plane as specified in 3GPP TS 33.503 [34] is used;

and shall initiate 5G ProSe direct link security mode control procedure as specified in clause 7.2.10.

The target UE shall set the source layer-2 ID and the destination layer-2 ID as specified in clause 7.2.12 and clause 7.2.10, and store the corresponding source layer-2 ID for unicast communication and the destination layer-2 ID for unicast communication in the 5G ProSe direct link context. If:

a) the target user info IE is included in the PROSE DIRECT LINK ESTABLISHMENT REQUEST message and this IE includes the target UE's application layer ID; or
    b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;

then the target UE shall:

a) if the direct communication is not between the 5G ProSe remote UE and the 5G ProSe UE-to-network relay UE:
      1) identify an existing $K_{NRP}$ based on the $K_{NRP}$ ID included in the PROSE DIRECT LINK ESTABLISHMENT REQUEST message; or
      2) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12;
    b) if the direct communication is between the 5G ProSe remote UE and the 5G ProSe UE-to-network relay UE and the security procedure over control plane as specified in 3GPP TS 33.503 [34] is used, request a new $K_{NR\_ProSe}$ according to the security procedure over user plane as specified in 3GPP TS 33.503 [34]; or
    c) if the direct communication is between the 5G ProSe remote UE and the 5G ProSe UE-to-network relay UE and the security procedure over user plane as specified in 3GPP TS 33.503 [34] is used, request a new $K_{NRP}$ according to the security procedure over user plane.

NOTE 3: How many times the 5G ProSe direct link authentication procedure needs to be performed to derive a new $K_{NRP}$ depends on the authentication method used.

After an existing $K_{NRP}$ was identified or a new $K_{NRP}$ was derived, or after a new $K_{NRP}$ or $K_{NR\_ProSe}$ is received, the target UE shall initiate a 5G ProSe direct link security mode control procedure as specified in clause 7.2.10.

Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.

Before sending the PROSE DIRECT LINK ESTABLISHMENT ACCEPT message to the 5G ProSe remote UE, the target UE acting as a 5G ProSe layer-3 UE-to-network relay UE initiates the UE requested PDU session establishment procedure as specified in 3GPP TS 24.501 [11] if:
1) the PDU session for relaying the service associated with the RSC has not been established yet; or
2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:
 a) shall include the source user info set to the target UE's application layer ID received from upper layers, or set to the user info ID of the target 5G ProSe end UE if the 5G ProSe direct link establishment procedure is for 5G ProSe direct communication between the 5G ProSe end UE and the 5G ProSe UE-to-UE relay UE;
 aa) shall include the UE-to-UE relay UE user info set to the user info ID of the 5G ProSe UE-to-UE relay UE if the 5G ProSe direct link establishment procedure is for 5G ProSe direct communication between the source 5G ProSe end UE and the 5G ProSe UE-to-UE relay UE;
 b) shall include PQFI(s), the corresponding PC5 QoS parameters and optionally the ProSe identifier(s) that the target UE accepts, if the target UE is not acting as a 5G ProSe layer-2 UE-to-network relay UE and the 5G ProSe direct link establishment procedure is not with integrated discovery;
 c) may include the PC5 QoS rule(s) if the target UE is not acting as a 5G ProSe layer-2 UE-to-network relay UE and the 5G ProSe direct link establishment procedure is not with integrated discovery;
 d) shall include an IP address configuration IE set to one of the following values if IP communication is used and the target UE is not acting as a 5G ProSe layer-2 UE-to-network relay UE:
  1) "DHCPv4 server" if only IPv4 address allocation mechanism is supported by the target UE, i.e., acting as a DHCPv4 server;
  2) "IPv6 router" if only IPv6 address allocation mechanism is supported by the target UE, i.e., acting as an IPv6 router;
  3) "DHCPv4 server & IPv6 Router" if both IPv4 and IPv6 address allocation mechanism are supported by the target UE; or
  4) "address allocation not supported" if neither IPv4 nor IPv6 address allocation mechanism is supported by the target UE and the target UE is not acting as a 5G ProSe layer-3 UE-to-network relay UE;
 NOTE 4: The UE doesn't include an IP address configuration IE nor a link local IPv6 address IE if Ethernet or Unstructured data unit type is used for communication.
 e) shall include a link local IPv6 address IE formed locally based on IETF RFC 4862 [25] if IP address configuration IE is set to "address allocation not supported", the received PROSE DIRECT LINK SECURITY MODE COMPLETE message included a link local IPv6 address IE and the target UE is neither acting as a 5G ProSe layer-2 UE-to-network relay UE nor acting as a 5G ProSe layer-3 relay UE;
 f) shall include the configuration of UE PC5 unicast user plane security protection based on the agreed user plane security policy, as specified in 3GPP TS 33.503 [34];

Editor's note: The security parameters for 5G ProSe UE-to-UE relay and the parameters for 5G ProSe layer-2 UE-to-UE relay are FFS.
 g) if the 5G ProSe direct link establishment procedure is for 5G ProSe direct communication between the source or target 5G ProSe layer-3 end UE and the 5G ProSe layer-3 UE-to-UE relay UE, and for Ethernet traffic, shall include the MAC address of the target 5G ProSe layer-3 end UE; and
 h) may include a target 5G ProSe layer-3 end UE IP address IE set to the IP address of the target 5G ProSe layer-3 end UE, if the 5G ProSe direct link establishment procedure is for 5G ProSe direct communication between the source 5G ProSe layer-3 end UE and the 5G ProSe layer-3 UE-to-UE relay UE, and the data unit type for the communication is IP.
Editor's note: The security parameters for 5G ProSe UE-to-UE relay and the parameters for 5G ProSe layer-2 UE-to-UE relay are FFS.

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication and shall start timer T5090 if:
 a) at least one of ProSe identifiers for the 5G ProSe direct links satisfies the privacy requirements as specified in clause 5.2.4; or
 b) T5090 is configured as specified in clause 5.2.5.
 NOTE 5: Two UEs negotiate the PC5 DRX configuration in the AS layer, and the PC5 DRX parameter values are configured per pair of source and destination Layer-2 IDs in the AS layer, as specified in 3GPP TS 38.300 [21].

After sending the PROSE DIRECT LINK ESTABLISHMENT ACCEPT message, the target UE shall provide the following information along with the layer-2 IDs to the lower layer, which enables the lower layer to handle the coming PC5 signalling or traffic data:
 a) the PC5 link identifier self-assigned for this 5G ProSe direct link;
 b) PQFI(s) and its corresponding PC5 QoS parameters, if available; and
 c) an indication of activation of the PC5 unicast user plane security protection for the 5G ProSe direct link, if applicable.

If the target UE accepts the 5G ProSe direct link establishment request and the 5G ProSe direct link is established not for 5G ProSe direct communication between the 5G ProSe remote UE and the 5G ProSe UE-to-network relay UE and not for 5G ProSe direct communication between the 5G ProSe end UE and the 5G ProSe UE-to-UE relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6. If the 5G ProSe direct link is established for 5G ProSe direct communication between the 5G ProSe layer-3 end UE and the 5G ProSe layer-3 UE-to-UE relay UE, then the target UE may perform the PC5 QoS flow establishment over 5G ProSe direct link as specified in clause 8a.2.7.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISHMENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISHMENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

If the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery, the initiating UE upon receipt of the PROSE DIRECT LINK ESTABLISHMENT ACCEPT message from the target 5G ProSe end UE, shall initiate the 5G ProSe direct link security mode control procedure with the source 5G ProSe end UE, and the initiating UE upon successful completion of the 5G ProSe direct link security mode control procedure with the source 5G ProSe end UE, shall create a PROSE DIRECT LINK ESTABLISHMENT ACCEPT message as specified in clause 7.2.2.3 to send to the source 5G ProSe end UE.

After receiving the PROSE DIRECT LINK ESTABLISHMENT ACCEPT message, the initiating UE shall provide the following information along with the layer-2 IDs to the lower layer, which enables the lower layer to handle the coming PC5 signalling or traffic data:
  a) the PC5 link identifier self-assigned for this 5G ProSe direct link;
  b) PQFI(s) and its corresponding PC5 QoS parameters, if available; and
  c) an indication of activation of the PC5 unicast user plane security protection for the 5G ProSe direct link, if applicable.
The initiating UE shall start timer T5090 if:
  a) at least one of ProSe identifiers for the 5G ProSe direct links satisfies the privacy requirements as specified in clause 5.2.4; or
  b) T5090 is configured as specified in clause 5.2.5.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE and the initiating UE received at least one PROSE DIRECT LINK ESTABLISHMENT ACCEPT message, it is up to the UE implementation to consider the 5G ProSe direct link establishment procedure as complete or to restart the timer T5080.

If the 5G ProSe direct link establishment procedure is triggered by a PROSE DIRECT LINK MODIFICATION REQUEST message from the source 5G ProSe layer-3 end UE as specified in clause 7.2.3.2, upon receipt of the PROSE DIRECT LINK ESTABLISHMENT ACCEPT message, the initiating UE shall send a PROSE DIRECT LINK MODIFICATION ACCEPT message to the source 5G ProSe layer-3 end UE as specified in clause 7.2.3.3, if the initiating UE acts as the 5G ProSe layer-3 UE-to-UE relay UE.

7.2.2.5 5G ProSe Direct Link Establishment Procedure not Accepted by the Target UE If the PROSE DIRECT LINK ESTABLISHMENT REQUEST message cannot be accepted, the target UE shall send a PROSE DIRECT LINK ESTABLISHMENT REJECT message. The PROSE DIRECT LINK ESTABLISHMENT REJECT message contains a PC5 signalling protocol cause IE set to one of the following cause values:
  #1 direct communication to the target UE not allowed;
  #3 conflict of layer-2 ID for unicast communication is detected;
  #5 lack of resources for 5G ProSe direct link;
  #13 congestion situation;
  #15 security procedure failure of 5G ProSe UE-to-network relay;
  #20 Failure from 5G ProSe end UE;
  #yy 5G ProSe direct link already exists; or
  #111 protocol error, unspecified.

If the target UE is not allowed to accept the PROSE DIRECT LINK ESTABLISHMENT REQUEST message, e.g., based on operator policy or configuration parameters for ProSe direct communication over PC5 as specified in clause 5.2, or the target UE is acting as a 5G ProSe layer-3 UE-to-network relay UE, is in non-allowed area of its serving PLMN and the corresponding relay service code is not associated with high priority access as defined in clause 5.3.5 of 3GPP TS 24.501 [11], the target UE shall send a PROSE DIRECT LINK ESTABLISHMENT REJECT message containing PC5 signalling protocol cause value #1 "direct communication to the target UE not allowed".
  NOTE 1: When the target UE acting as a 5G ProSe layer-3 UE-to-network relay UE is involved into its own emergency services as specified in 3GPP TS 24.501 [11] or is handling an emergency services of another 5G ProSe layer-3 remote UE, and receives PROSE DIRECT LINK ESTABLISHMENT REQUEST message with an RSC that is specific for emergency services, the target UE is allowed to ignore the PROSE DIRECT LINK ESTABLISHMENT REQUEST message if the target UE decides to prioritize its own ongoing emergency services or prioritize the handling of the emergency services of the other 5G ProSe layer-3 remote UE, due to local regulations or implementation specific requirements.

For a received PROSE DIRECT LINK ESTABLISHMENT REQUEST message from a layer-2 ID (for unicast communication), if the target UE already has an existing link established to a UE using this layer-2 ID or is currently processing a PROSE DIRECT LINK ESTABLISHMENT REQUEST message from the same layer-2 ID and with one of following parameters different from the existing link or the link for which the link establishment is in progress:
  a) the source user info;
  b) type of data (e.g., IP, Ethernet or Unstructured); or
  c) security policy,
the target UE shall send a PROSE DIRECT LINK ESTABLISHMENT REJECT message containing PC5 signalling protocol cause value #3 "conflict of layer-2 ID for unicast communication is detected".
  NOTE 2: If the UE is processing a PROSE DIRECT DISCOVERY message from the same source layer-2 ID of the received PROSE DIRECT LINK ESTAB- LISHMENT REQUEST message, it depends on UE implementation to avoid the conflict of destination layer-2 ID (e.g. send a PROSE DIRECT LINK ESTABLISHMENT REJECT message containing PC5 signalling protocol cause value #3 "conflict of layer-2 ID for unicast communication is detected", or ignore the PROSE DIRECT DISCOVERY message).

NOTE 3: The type of data (e.g., IP, Ethernet or Unstructured) is indicated by the optional IP address configuration IE included in the corresponding DIRECT LINK SECURITY MODE COMPLETE message, i.e., the type of data for the requested link is IP type if this IE is included and the type of data for the requested link is Ethernet or Unstructured if this IE is not included.

If the 5G ProSe direct link establishment fails due to the implementation-specific maximum number of established 5G ProSe direct links has been reached, or other temporary lower layer problems causing resource constraints, the target UE shall send a PROSE DIRECT LINK ESTABLISHMENT REJECT message containing PC5 signalling protocol cause value #5 "lack of resources for 5G ProSe direct link".

If the 5G ProSe direct link establishment request is for 5G ProSe UE-to-network relaying and:

a) the NAS level mobility management congestion control as specified in clause 5.3.9 of TS 24.501 [11] is activated at the target UE acting as the 5G ProSe UE-to-network relay UE; or b) the target UE acting as the 5G ProSe UE-to-network relay UE is under congestion;

the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message. The target UE shall not accept any 5G ProSe direct link establishment request for relaying if the back-off timer for NAS level mobility management congestion control is running.

If the 5G ProSe direct link establishment request is for 5G ProSe UE-to-network relaying, the NAS level session management congestion as specified in clause 6.2.7 and in clause 6.2.8 of TS 24.501 [11] is activated at the target UE which is acting as a 5G ProSe layer-3 UE-to-network relay UE, and the relay service code used in the 5G ProSe direct link establishment corresponds to a DNN and/or S-NSSAI for which the NAS level session management congestion is activated, and the target UE needs to perform the PDU session establishment procedure for the DNN and/or S-NSSAI or the PDU session modification procedure for the DNN and/or S-NSSAI, then the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message.

NOTE 4: How the target UE determines that it is under congestion is implementation specific (e.g., any relaying related operational overhead, etc).

NOTE 5: In case the target UE is under the NAS level mobility management congestion control, it is an implementation option that the provided back-off timer value to the initiating UE is set to the remaining time of the mobility management back-off timer T3346 or with an additional offset value.

If the 5G ProSe direct link establishment request is for 5G ProSe layer-3 UE-to-network relaying, the PDU session for relaying the service is an LADN PDU session, and the target UE acting as a 5G ProSe layer-3 UE-to-network relay UE is outside the LADN service area, the target UE shall send a PROSE DIRECT LINK ESTABLISHMENT REJECT message containing PC5 signalling protocol cause value #111 "protocol error, unspecified".

If the 5G ProSe direct link establishment request is for 5G ProSe layer-3 UE-to-network relaying, the request required the establishment of a PDU session by the 5G ProSe layer-3 UE-to-network relay UE which is a target UE, and the PDU session establishment was unsuccessful due to the reception of 5GSM cause #8 "maximum number of PDU sessions reached", #27 "Missing or unknown DNN", #28 "Unknown PDU session type", #29 "user authentication or authorization failed", #31 "request rejected, unspecified", #32 "service option not supported", #33 "requested service option not subscribed", #46 "out of LADN service area", or #65 "maximum number of PDU sessions reached" as specified in 3GPP TS 24.501 [11], the target UE shall send a PROSE DIRECT LINK ESTABLISHMENT REJECT message containing PC5 signalling protocol cause value #111 "protocol error, unspecified".

If the 5G ProSe direct link establishment request is for 5G ProSe UE-to-UE relay and:

a) the target UE acting as a target 5G ProSe end UE is under congestion;

the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message. The initiating UE, acting as a 5G ProSe UE-to-UE relay UE, upon reception of PROSE DIRECT LINK ESTABLISHMENT REJECT message from the target 5G ProSe end UE, and the 5G ProSe direct link establishment procedure is for direct communication between the source 5G ProSe end UE and the 5G ProSe UE-to-UE relay UE, the target 5G ProSe end UE has rejected the 5G ProSe direct link establishment procedure or the 5G ProSe direct link modification procedure, the reject message contains a backoff value, and the initiating UE has not reached the maximum number of allowed retransmissions, the initiating UE shall inform (message TBD) the source 5G ProSe end UE that target 5G ProSe end UE has rejected the link establishment or link modification request and shall provide the cause value from the target 5G ProSe end UE.

Editor's note: How the target 5G ProSe end UE informs the 5G ProSe UE-to-UE relay UE that has rejected the link establishment or link modification request is for FFS.

The initiating UE, acting as a 5G ProSe UE-to-UE relay UE, upon reception of PROSE DIRECT LINK ESTABLISHMENT REJECT message from the target 5G ProSe end UE, the 5G ProSe direct link establishment procedure is for direct communication between the source 5G ProSe end UE and the 5G ProSe UE-to-UE relay UE, the target 5G ProSe end UE has rejected the 5G ProSe direct link establishment procedure or the 5G ProSe direct link modification procedure, the reject message contains a backoff value, and the initiating UE has reached the maximum number of allowed retransmissions, the initiating UE may send a PROSE DIRECT LINK ESTABLISHMENT REJECT message with the appropriate PC5 signalling protocol cause value to the source 5G ProSe end UE. The initiaing UE shall include in the PROSE DIRECT LINK ESTABLISHMENT REJECT message PC5 protocol cause value #20 "Failure from 5G ProSe end UE" and include the PC5 end UE failure cause IE set to #13 "congestion situation" received from the target 5G ProSe end UE that has rejected the 5G ProSe direct link establishment or 5G ProSe direct link modification procedure. The initiating UE may include the target end UE info IE set to the user info ID of the target 5G ProSe end UE in the PROSE DIRECT LINK ESTABLISHMENT REJECT message.

If the 5G ProSe direct link establishment request is for 5G ProSe UE-to-UE relay and:
 a) the target UE acting as a 5G ProSe UE-to-UE relay UE is under congestion;
the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message. If the 5G ProSe direct link establishment procedure is for direct communication between the 5G ProSe remote UE and the 5G ProSe UE-to-network relay UE and it fails due to a failure in the security procedure over control plane or security procedure over user plane as specified in 3GPP TS 33.503 [34], the target UE shall send a PROSE DIRECT LINK ESTABLISHMENT REJECT message containing PC5 signalling protocol cause value #15 "security procedure failure of 5G ProSe UE-to-network relay". The target UE shall provide the EAP message if received from the network according to the security procedure over control plane as specified in 3GPP TS 33.503 [34].

If the 5G ProSe direct link establishment procedure is for direct communication between the 5G ProSe UE-to-UE relay UE and target 5G ProSe end UE with integrated discovery and a 5G ProSe direct link for the pair of initiating UE user info ID and target UE user info ID already exists and the data type unit is IP or Ethernet, the target UE shall send a PROSE DIRECT LINK ESTABLISHMENT REJECT message to the 5G ProSe UE-to-UE relay UE containing PC5 signalling protocol cause value #yy "5G ProSe direct link already exists".

If the target UE is acting as a target 5G ProSe end UE and the 5G ProSe direct link establishment procedure is between the 5G ProSe UE-to-UE relay UE and the target 5G ProSe end UE, the target 5G ProSe end UE may include in the PROSE DIRECT LINK ESTABLISHMENT REJECT message:
 a) the source end UE info IE set to the user info ID of the source 5G ProSe end UE;
 b) the target end UE info IE set to the user info ID of the target 5G ProSe end UE; and
 c) the UE-to-UE relay UE info IE set to the user info ID of the 5G ProSe UE-to-UE relay UE.

If the target UE is acting as a 5G ProSe UE-to-UE relay UE, the 5G ProSe direct link establishment procedure is between the source 5G ProSe end UE and the 5G ProSe UE-to-UE relay UE, and the target 5G ProSe end UE has rejected the 5G ProSe direct link establishment procedure or the 5G ProSe direct link modification procedure, then the 5G ProSe UE-to-UE relay UE shall send a PROSE DIRECT LINK ESTABLISHMENT REJECT message with PC5 signalling protocol cause value #20 "Failure from 5G ProSe end UE" to the source 5G ProSe end UE. The 5G ProSe UE-to-UE relay UE may include in the PROSE DIRECT LINK ESTABLISHMENT REJECT message the PC5 end UE failure cause IE set to the PC5 signalling protocol cause received from the target 5G ProSe end UE that has rejected the 5G ProSe direct link establishment procedure. The 5G ProSe UE-to-UE relay UE may include in the PROSE DIRECT LINK ESTABLISHMENT REJECT message:
 a) the source end UE info IE set to the user info ID of the source 5G ProSe end UE;
 b) the target end UE info IE set to the user info ID of the target 5G ProSe end UE; and
 c) the UE-to-UE relay UE info IE set to the user info ID of the 5G ProSe UE-to-UE relay UE.

NOTE 6: The cause value #15 "security procedure failure of 5G ProSe UE-to-network relay" is also used when the CP-PRUK or the UP-PRUK is not found in the network.

If the 5G ProSe direct link establishment fails due to other reasons, the target UE shall send a PROSE DIRECT LINK ESTABLISHMENT REJECT message containing PC5 signalling protocol cause value #111 "protocol error, unspecified".

After sending the PROSE DIRECT LINK ESTABLISHMENT REJECT message, the target UE shall provide the following information along with the initiating UE's layer-2 ID for unicast communication and the target UE's layer-2 ID for unicast communication to the lower layer:
 a) an indication of deactivation of the PC5 unicast security protection and deletion of security context for the 5G ProSe direct link, if applicable.

Upon receipt of the PROSE DIRECT LINK ESTABLISHMENT REJECT message, the initiating UE shall stop timer T5080 and abort the 5G ProSe direct link establishment procedure. If the PC5 signalling protocol cause value in the PROSE DIRECT LINK ESTABLISHMENT REJECT message is #1 "direct communication to the target UE not allowed" or #5 "lack of resources for 5G ProSe direct link", then the initiating UE shall not attempt to start the 5G ProSe direct link establishment procedure with the same target UE at least for a time period T. If the PC5 signalling protocol cause value in the PROSE DIRECT LINK ESTABLISHMENT REJECT message is #13 "congestion situation" and a back-off timer value is provided in the PROSE DIRECT LINK ESTABLISHMENT REJECT message, the initiating UE shall start timerT5088 associated with the layer-2 ID of the target UE and set its value to the provided timer value. If the PC5 signalling protocol cause value in the PROSE DIRECT LINK ESTABLISHMENT REJECT message is #15 "security procedure failure of 5G ProSe UE-to-network relay", and initiating UE has included the UE identity IE set to SUCI in the PROSE DIRECT LINK ESTABLISHMENT REQUEST message, then the initiating UE shall initiate the UE-to-network relay reselection procedure as specified in clause 8.2.3. If the PC5 signalling protocol cause value in the PROSE DIRECT LINK ESTABLISHMENT REJECT message is #15 "security procedure failure of 5G ProSe UE-to-network relay" and the initiating UE has included the User security key ID IE set to UP-PRUK ID or CP-PRUK ID in the PROSE DIRECT LINK ESTABLISHMENT REQUEST message, then the initiating UE may initiate the UE-to-network relay reselection procedure as specified in clause 8.2.3 and the UE shall further:
 a) if the same 5G ProSe UE-to-network relay UE is selected, discard the previously used CP-PRUK and associated CP-PRUK ID, or the UP-PRUK and associated UP-PRUK ID, if any, and include the UE identity IE set to SUCI in the PROSE DIRECT LINK ESTABLISHMENT REQUEST when initiating the subsequent 5G ProSe direct link establishment procedure as specified in clause 7.2.2.2; or
 b) if a different 5G ProSe UE-to-network relay UE is selected, include the User security key ID IE set to the previously used UP-PRUK ID or CP-PRUK ID in the PROSE DIRECT LINK ESTABLISHMENT REQUEST message.

NOTE 7: The length of time period T is UE implementation specific and can be different for the case when the UE receives PC5 signalling protocol cause value #1 "direct communication to the target UE not allowed" or when the UE receives PC5 signalling protocol cause value #5 "lack of resources for 5G ProSe direct link".

Editor's note: The security related contents are FFS and depend on SA3 requirements.

If the 5G ProSe direct link establishment procedure is for direct communication between the 5G ProSe UE-to-UE relay UE and target 5G ProSe end UE and the PC5 signalling protocol cause value in the PROSE DIRECT LINK ESTABLISHMENT REJECT message is #yy "5G ProSe direct link already exists", then the initiating UE acting as the 5G ProSe UE-to-UE relay UE may initiate the 5G ProSe direct link modification procedure with the target UE to associate the source 5G ProSe end UE user info ID and the ProSe identifiers, as specified in the rejected PROSE DIRECT LINK ESTABLISHMENT REQUEST message, to the existing 5G ProSe direct link.

After receiving the PROSE DIRECT LINK ESTABLISHMENT REJECT message, the initiating UE shall provide the following information along with the initiating UE's layer-2 ID for unicast communication and the target UE's layer-2 ID for unicast communication to the lower layer:

a) an indication of deactivation of the PC5 unicast security protection and deletion of security context for the 5G ProSe direct link, if applicable.

7.2.2.6 Abnormal Cases 7.2.2.6.1 Abnormal Cases at the Initiating UE

If timer T5080 expires and the Target user info IE is included in the PROSE DIRECT LINK ESTABLISHMENT REQUEST message, the initiating UE shall retransmit the PROSE DIRECT LINK ESTABLISHMENT REQUEST message and restart timer T5080. After reaching the maximum number of allowed retransmissions, the initiating UE shall abort the 5G ProSe direct link establishment procedure and may notify the upper layer that the target UE is unreachable. Upon expiry of the timer T5080, if the PROSE DIRECT LINK ESTABLISHMENT REQUEST message did not include the Target user info IE and the initiating UE did not receive any PROSE DIRECT LINK ESTABLISHMENT ACCEPT message, the initiating UE may retransmit the PROSE DIRECT LINK ESTABLISHMENT REQUEST message and restart timer T5080. If the PROSE DIRECT LINK ESTABLISHMENT REQUEST message did not include the Target user info IE and the initiating UE did not receive any PROSE DIRECT LINK ESTABLISHMENT ACCEPT message, then after reaching the maximum number of allowed retransmissions, the initiating UE shall abort the 5G ProSe direct link establishment procedure and may notify the upper layer that no target UE is available.

NOTE: The maximum number of allowed retransmissions is UE implementation specific. If the need to establish a link no longer exists before the procedure is completed, the initiating UE shall abort the procedure.

When the initiating UE aborts the 5G ProSe direct link establishment procedure, the initiating UE shall provide the following information along with the initiating UE's layer-2 ID for unicast communication and the target UE's layer-2 ID for unicast communication to the lower layer:

a) an indication of deactivation of the PC5 unicast security protection and deletion of security context for the 5G ProSe direct link, if applicable.

7.2.2.6.2 Abnormal Cases at the Target UE

For a received PROSE DIRECT LINK ESTABLISHMENT REQUEST message from a source layer-2 ID (for unicast communication), if the target UE already has an existing link established to the UE known to use the same source layer-2 ID, the same source user info, the same type of data (IP, Ethernet or Unstructured) and the same security policy, the UE shall process the new request. However, the target UE shall only delete the existing 5G ProSe direct link context after the new link establishment procedure succeeds.

NOTE: The type of data (e.g., IP, Ethernet or Unstructured) is indicated by the optional IP address configuration IE included in the corresponding PROSE DIRECT LINK SECURITY MODE COMPLETE message, i.e., the type of data for the requested link is IP type if this IE is included and the type of data for the requested link is Ethernet or Unstructured if this IE is not included.

If the PROSE DIRECT LINK ESTABLISHMENT REQUEST message is for 5G ProSe direct communication between the 5G ProSe remote UE and the 5G ProSe UE-to-network relay UE, after the target UE decrypts the encrypted relay service code using the DUSK or DUCK used for 5G ProSe UE-to-network relay discovery, if the relay service code does not match with the one that the target UE has sent during 5G ProSe UE-to-network relay discovery procedure, then the target UE shall abort the 5G ProSe direct link establishment procedure.

If the PROSE DIRECT LINK ESTABLISHMENT REQUEST message is for 5G ProSe direct communication between the 5G ProSe remote UE and the 5G ProSe UE-to-network relay UE, the message is integrity protected and the integrity verification of the message fails at the target UE, then the target UE shall abort the 5G ProSe direct link establishment procedure.

[ . . . ]

7.2.10 5G ProSe Direct Link Security Mode Control Procedure 7.2.10.1 General

The 5G ProSe direct link security mode control procedure is used to establish security between two UEs during a 5G ProSe direct link establishment procedure or a 5G ProSe direct link re-keying procedure. Security is not established if the UE PC5 signalling integrity protection is not activated. After successful completion of the 5G ProSe direct link security mode control procedure, the selected security algorithms and their non-null associate keys are used to integrity protect and cipher all PC5 signalling messages exchanged over this 5G ProSe direct link between the UEs and the security context can be used to protect all PC5 user plane data exchanged over this 5G ProSe direct link between the UEs. The UE sending the PROSE DIRECT LINK SECURITY MODE COMMAND message is called the "initiating UE" and the other UE is called the "target UE".

7.2.10.2 5G ProSe Direct Link Security Mode Control Procedure Initiation by the Initiating UE The initiating UE shall meet the following pre-conditions before initiating the 5G ProSe direct link security mode control procedure:

a) the target UE has initiated a 5G ProSe direct link establishment procedure toward the initiating UE by sending a PROSE DIRECT LINK ESTABLISHMENT REQUEST message and:
  1) the PROSE DIRECT LINK ESTABLISHMENT REQUEST message:
    i) includes a target user info IE which includes the application layer ID of the initiating UE; or
    ii) does not include a target user info IE and the initiating UE is interested in the ProSe service identified by the ProSe identifier in the PROSE DIRECT LINK ESTABLISHMENT REQUEST message; and
  2) the initiating UE:
    i) if the direct communication is not between the 5G ProSe remote UE and the 5G ProSe UE-to-network relay UE has either identified an existing $K_{NRP}$ based on the $K_{NRP}$ ID included in the PROSE DIRECT LINK ESTABLISHMENT REQUEST message or derived a new $K_NRP$;
    ii) if the direct communication is between the 5G ProSe remote UE and the 5G ProSe UE-to-network relay UE with the security procedure over user plane being used, has received a new $K_{NRP}$ according to the security procedure over user plane as specified in 3GPP TS 33.503 [34];
    iii) if the direct communication is between the 5G ProSe remote UE and the 5G ProSe UE-to-network relay UE with the security procedure over control plane being used, has received a new $K_{NR\_ProSe}$ according to the security procedure over control plane as specified in 3GPP TS 33.503 [34]; or
    iv) has decided not to activate security protection based on its UE 5G ProSe direct signalling security policy and the target UE's 5G ProSe direct signalling security policy; or
b) the target UE has initiated a 5G ProSe direct link re-keying procedure toward the initiating UE by sending a PROSE DIRECT LINK REKEYING REQUEST message and:
  1) if the target UE has included a Re-authentication indication in the PROSE DIRECT LINK REKEYING REQUEST message, the initiating UE has derived a new $K_{NRP}$.
When:
a) the direct communication is not between the 5G ProSe remote UE and the 5G ProSe UE-to-network relay UE, if a new $K_{NRP}$ has been derived by the initiating UE; or
b) the direct communication is between the 5G ProSe remote UE and the 5G ProSe UE-to-network relay UE, if a new $K_{NRP}$ or $K_{NR\_ProSe}$ has been received by the initiating UE according to the security procedure over user plane or the security procedure over control plane, respectively, as specified in 3GPP TS 33.503 [34];
the initiating UE shall generate the 2 MSBs of $K_{NRP}$ ID to ensure that the resultant $K_{NRP}$ ID will be unique in the initiating UE.
  NOTE 1: If the direct communication is not between the 5G ProSe remote UE and the 5G ProSe UE-to-network relay UE, the $K_{NRP}$ ID holds the ID that corresponds to $K_{NRP}$. If the direct communication is between the 5G ProSe remote UE and the 5G ProSe UE-to-network relay UE, the $K_{NRP}$ ID holds the ID that corresponds to $K_{NRP}$ (if security procedure over user plane is used) or $K_{NR\_ProSe}$ (if security procedure over control plane is used).

The initiating UE shall select security algorithms in accordance with its UE 5G ProSe direct signalling security policy and the target UE's 5G ProSe direct signalling security policy. If the 5G ProSe direct link security mode control procedure was triggered during a 5G ProSe direct link establishment procedure, the initiating UE shall not select the null integrity protection algorithm if the initiating UE or the target UE's 5G ProSe direct signalling integrity protection policy is set to "Signalling integrity protection required". If the 5G ProSe direct link security mode control procedure was triggered during a 5G ProSe direct link re-keying procedure, the initiating UE:
  a) shall not select the null integrity protection algorithm if the integrity protection algorithm currently in use for the 5G ProSe direct link is different from the null integrity protection algorithm;
  b) shall not select the null ciphering protection algorithm if the ciphering protection algorithm currently in use for the 5G ProSe direct link is different from the null ciphering protection algorithm;
  c) shall select the null integrity protection algorithm if the integrity protection algorithm currently in use is the null integrity protection algorithm; and
  d) shall select the null ciphering protection algorithm if the ciphering protection algorithm currently in use is the null ciphering protection algorithm.
Then the initiating UE shall:
  a) if the direct communication is not between the 5G ProSe remote UE and the 5G ProSe UE-to-network relay UE:
    1) generate a 128-bit Nonce_2 value;
    2) derive $K_{NRP-sess}$ from Nonce_1 received in the PROSE DIRECT LINK ESTABLISHMENT REQUEST message, $K_{NR}P$ and Nonce_2, as specified in 3GPP TS 33.536 [37]; and 3) derive the NR PC5 encryption key NRPEK and the NR PC5 integrity key NRPIK from $K_{NRP-sess}$ and the selected security algorithms as specified in 3GPP TS 33.536 [37];
  b) if the direct communication is between the 5G ProSe remote UE and the 5G ProSe UE-to-network relay UE and the security procedure over control plane as specified in 3GPP TS 33.503 [34] is used:
    1) derive $K_{relay-sess}$ from $K_{NR\_ProSe}$, Nonce_2 and Nonce_1 received in the PROSE DIRECT LINK ESTABLISHMENT REQUEST message as specified in 3GPP TS 33.503 [34]; and
    2) derive the NR PC5 encryption key $K_{relay-enc}$ and the NR PC5 integrity key $K_{relay-int}$ from $K_{relay-sess}$ and the selected security algorithms as specified in 3GPP TS 33.503 [34]; or
  c) if the direct communication is between the 5G ProSe remote UE and the 5G ProSe UE-to-network relay UE and the security procedure over user plane as specified in 3GPP TS 33.503 [34] is used:
    1) derive $K_{NRP-sess}$ from $K_{NRP}$, $K_{NRP}$ freshness parameter 2 and $K_{NRP}$ freshness parameter 1 received in the PROSE DIRECT LINK ESTABLISHMENT REQUEST message as specified in 3GPP TS 33.503 [34]; and
    2) derive the NR PC5 encryption key NRPEK and the NR PC5 integrity key NRPIK from $K_{NRP-sess}$ and the selected security algorithms as specified in 3GPP TS 33.503 [34]; and
  d) create a PROSE DIRECT LINK SECURITY MODE COMMAND message. In this message, the initiating UE:

1) shall include the key establishment information container IE if the 5G ProSe direct link is not for direct communication between the 5G ProSe remote UE and the 5G ProSe UE-to-network relay UE and a new $K_{NRP}$ has been derived at the initiating UE and the authentication method used to generate $K_{NRP}$ requires sending information to complete the 5G ProSe direct link authentication procedure;

NOTE 2: The key establishment information container is provided by upper layers.

2) shall include the MSBs of $K_{NRP}$ ID IE if a new $K_{NRP}$ has been derived or a new $K_{NRP}$ or $K_{NR\_ProSe}$ has been received at the initiating UE;
3) shall include a Nonce_2 IE set to:
   i) the 128-bit nonce value generated by the initiating UE when the direct communication is not between the 5G ProSe remote UE and the 5G ProSe UE-to-network relay UE;
   ii) the $K_{NRP}$ freshness parameter 2 value received by the initiating UE when the direct communication is between the 5G ProSe remote UE and the 5G ProSe UE-to-network relay UE with the security procedure over user plane as specified in 3GPP TS 33.503 [34] being used; or
   iii) the Nonce_2 value received by the initiating UE when the direct communication is between the 5G ProSe remote UE and the 5G ProSe UE-to-network relay UE with the security procedure over control plane as specified in 3GPP TS 33.503 [34] being used;
   for the purpose of session key establishment over this 5G ProSe direct link if the selected integrity protection algorithm is not the null integrity protection algorithm;
4) shall include the selected security algorithms;
5) shall include the UE security capabilities received from the target UE in the PROSE DIRECT LINK ESTABLISHMENT REQUEST message or PROSE DIRECT LINK REKEYING REQUEST message;
6) shall include the UE 5G ProSe direct signalling security policy received from the target UE in the PROSE DIRECT LINK ESTABLISHMENT REQUEST message;
7) shall include the LSB of $K_{NRP-sess}$ ID chosen by the initiating UE as specified in 3GPP TS 33.536 [37] if the selected integrity protection algorithm is not the null integrity protection algorithm;

NOTE 3: If the direct communication is not between the 5G ProSe remote UE and the 5G ProSe UE-to-network relay UE, the $K_{NRP-sess}$ ID holds the ID that corresponds to $K_{NRP-sess}$. If the direct communication is between the 5G ProSe remote UE and the 5G ProSe UE-to-network relay UE, the $K_{NRP-sess}$ ID holds the ID that corresponds to $K_{NRP}$-sess (if security procedure over user plane is used) or $K_{relay-sess}$ (if security procedure over control plane is used).

8) shall include the GPI if received from the 5G PKMF according to the security procedure over user plane as specified in 3GPP TS 33.503 [34], when the direct communication is between the 5G ProSe remote UE and the 5G ProSe UE-to-network relay UE; and
9) shall include the EAP message if received from the network according to the security procedure over control plane as specified in 3GPP TS 33.503 [34], when the direct communication is between the 5G ProSe remote UE and the 5G ProSe UE-to-network relay UE.

If the security protection of this 5G ProSe direct link is activated by using non-null integrity protection algorithm or non-null ciphering protection algorithm, the initiating UE shall form the $K_{NRP-sess}$ ID from the MSB of $K_{NRP-sess}$ ID received in the PROSE DIRECT LINK ESTABLISHMENT REQUEST message or PROSE DIRECT LINK REKEYING REQUEST message and the LSB of $K_{NRP-sess}$ ID included in the PROSE DIRECT LINK SECURITY MODE COMMAND message. The initiating UE shall use the $K_{NRP-sess}$ ID to identify the new security context.

The initiating UE shall set the source layer-2 ID and destination layer-2 ID as follows:
1) if the initiating UE is acting as a 5G ProSe layer-3 UE-to-network relay UE, and the EAP-AKA' based authentication method is used as specified in clause 6.3.3.3 of 3GPP TS 33.503 [34],
   the source layer-2 ID set to the source layer-2 ID used in PROSE AA MESSAGE TRANSPORT REQUEST message, and the destination layer-2 ID set to the the destination layer-2 ID used in PROSE AA MESSAGE TRANSPORT REQUEST message;
2) if the initiating UE is not acting as a 5G ProSe UE-to-network relay UE, and a 5G ProSe direct link authentication procedure has been initiated:
   the source layer-2 ID set to the source layer-2 ID used in PROSE DIRECT LINK AUTHENTICATION REQUEST message, and the destination layer-2 ID set to the the destination layer-2 ID used in PROSE DIRECT LINK AUTHENTICATION REQUEST message;
3) otherwise, self-assign a source layer-2 ID, and the destination layer-2 ID set to the source layer-2 ID in the PROSE DIRECT LINK ESTABLISHMENT REQUEST message.

NOTE 4: The UE implementation ensures that any value of the self-assigned source layer-2 ID is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.

NOTE 5: It is possible for the target UE to reuse the target UE's layer-2 ID used in previous 5G ProSe direct link with the same peer UE.

After the PROSE DIRECT LINK SECURITY MODE COMMAND message is generated, the initiating UE shall pass this message to the lower layers for transmission along with the source layer-2 ID and the destination layer-2 ID, NRPIK (or $K_{relay-int}$ when applicable), NRPEK (or $K_{relay-enc}$ when applicable) if applicable, $K_{NRP-sess}$ ID, the selected security algorithm as specified in TS 33.536 [37]; an indication of activation of the 5G ProSe direct signalling security protection for the 5G ProSe direct link with the new security context, if applicable and start timer T5089. The initiating UE shall not send a new PROSE DIRECT LINK SECURITY MODE COMMAND message to the same target UE while timer T5089 is running.

NOTE 6: The PROSE DIRECT LINK SECURITY MODE COMMAND message is integrity protected (and not ciphered) at the lower layer using the new security context.

If the 5G ProSe direct link security mode control procedure was triggered during a 5G ProSe direct link re-keying procedure, the initiating UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

Figure 9:
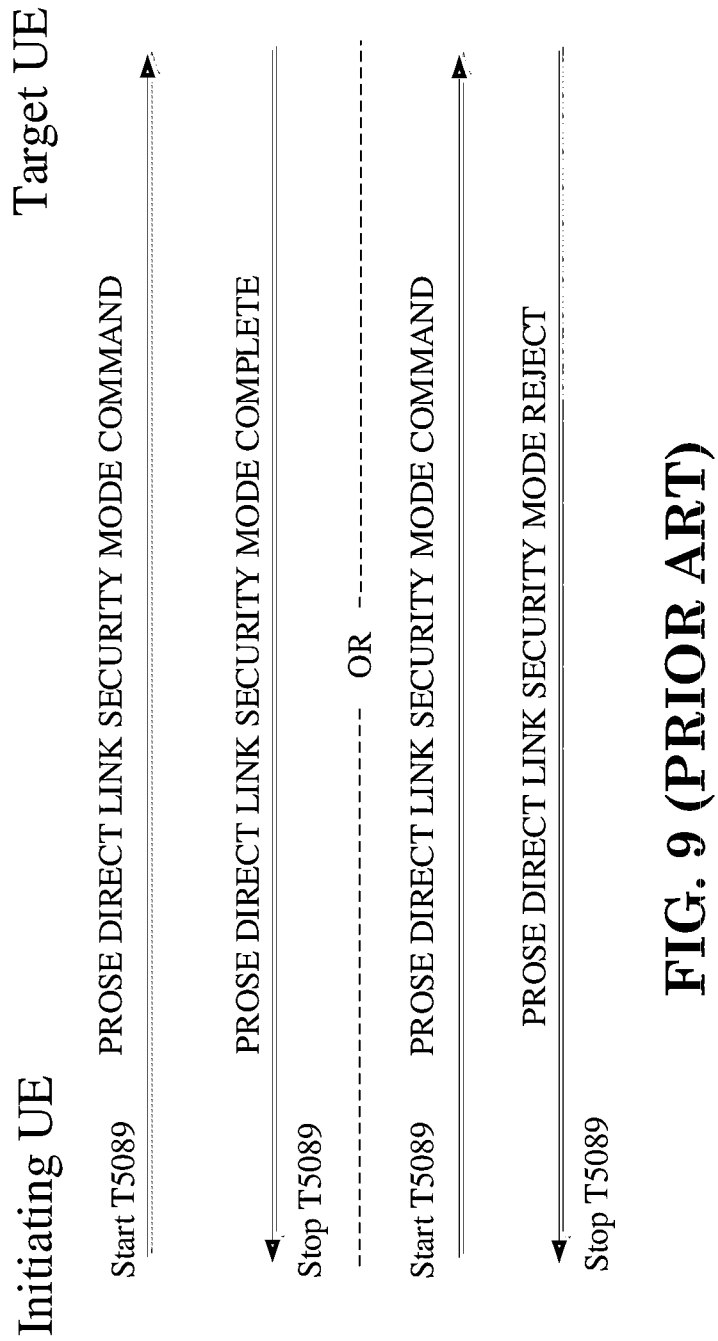
FIG. 9 is a reproduction of FIG. 5.8.9.1.1-2 of 3GPP R2-2314014.

[FIG. 7.2.10.2.1 of 3GPP TS 24.554 V18.2.0, Entitled "5G ProSe Direct Link Security Mode Control Procedure", is Reproduced as FIG. 9]

7.2.10.3 5G ProSe Direct Link Security Mode Control Procedure Accepted by the Target UE Upon receipt of a PROSE DIRECT LINK SECURITY MODE COMMAND message, if a new assigned initiating UE's layer-2 ID is included and if the 5G ProSe direct link authentication procedure has not been executed, the target UE shall replace the original initiating UE's layer-2 ID with the new assigned initiating UE's layer-2 ID for 5G ProSe direct communication. The target UE shall check the selected security algorithms IE included in the PROSE DIRECT LINK SECURITY MODE COMMAND message. If "null integrity algorithm" is included in the selected security algorithms IE, the integrity protection is not offered for this 5G ProSe direct link and the signalling messages are transmitted unprotected. If "null ciphering algorithm" and an integrity algorithm other than "null integrity algorithm" are included in the selected algorithms IE, the ciphering protection is not offered for this 5G ProSe direct link and the signalling messages are transmitted unprotected. If the target UE's 5G ProSe direct signalling integrity protection policy is set to "Signalling integrity protection required", the target UE shall check the selected security algorithms IE in the PROSE DIRECT LINK SECURITY MODE COMMAND message does not include the null integrity protection algorithm. If the selected integrity protection algorithm is not the null integrity protection algorithm, the target UE shall:

a) if the direct communication is not between the 5G ProSe remote UE and the 5G ProSe UE-to-network relay UE:
1) derive $K_{NRP-sess}$ from $K_{NRP}$, Nonce_1 and Nonce_2 received in the PROSE DIRECT LINK SECURITY MODE COMMAND message as specified in 3GPP TS 33.536 [37];
2) derive NRPIK from $K_{NRP-sess}$ and the selected integrity algorithm as specified in 3GPP TS 33.536 [37]; and
3) if the $K_{NRP-sess}$ is derived and the selected ciphering protection algorithm is not the null ciphering protection algorithm, then the target UE shall derive NRPEK from $K_{NRP-sess}$ and the selected ciphering algorithm as specified in 3GPP TS 33.536 [37]; or b) if the direct communication is between the 5G ProSe remote UE and the 5G ProSe UE-to-network relay UE:
1) if the security procedure over control plane as specified in 3GPP TS 33.503 [34] is used, derive $K_{relay-sess}$ according to the security procedure over control plane, and derive $K_{relay-int}$ from $K_{relay-sess}$ and the selected integrity algorithm as specified in 3GPP TS 33.503 [34]. If the $K_{relay-sess}$ is derived and the selected ciphering protection algorithm is not the null ciphering protection algorithm, then the target UE shall derive $K_{relay-enc}$ from $K_{relay-sess}$ and the selected ciphering algorithm as specified in 3GPP TS 33.503 [34]; or
2) if security procedure over user plane as specified in 3GPP TS 33.503 [34] is used, derive $K_{NRP-sess}$ according to the security procedure over user plane, and derive NRPIK from $K_{NRP-sess}$ and the selected integrity algorithm as specified in 3GPP TS 33.503 [34]. If the $K_{NRP-sess}$ is derived and the selected ciphering protection algorithm is not the null ciphering protection algorithm, then the target UE shall derive NRPEK from $K_{NRP-sess}$ and the selected ciphering algorithm as specified in 3GPP TS 33.503 [34].

The target UE shall determine whether or not the PROSE DIRECT LINK SECURITY MODE COMMAND message can be accepted by:
a) checking that the selected security algorithms IE in the PROSE DIRECT LINK SECURITY MODE COMMAND message does not include the null integrity protection algorithm if the target UE's 5G ProSe direct signalling integrity protection policy is set to "Signalling integrity protection required";
b) asking the lower layers to check the integrity of the PROSE DIRECT LINK SECURITY MODE COMMAND message using NRPIK (or $K_{relay-int}$ when applicable) and the selected integrity protection algorithm, if the selected integrity protection algorithm is not the null integrity protection algorithm;
c) checking that the received UE security capabilities have not been altered compared to the values that the target UE sent to the initiating UE in the PROSE DIRECT LINK ESTABLISHMENT REQUEST message or PROSE DIRECT LINK REKEYING REQUEST message;
d) if the 5G ProSe direct link security mode control procedure was triggered during a 5G ProSe direct link establishment procedure,
1) checking that the received UE 5G ProSe direct signalling security policy has not been altered compared to the values that the target UE sent to the initiating UE in the PROSE DIRECT LINK ESTABLISHMENT REQUEST message; and
2) checking that the LSB of $K_{NRP-sess}$ ID included in the PROSE DIRECT LINK SECURITY MODE COMMAND message are not set to the same value as those received from another UE in response to the target UE's PROSE DIRECT LINK ESTABLISHMENT REQUEST message; and
e) if the 5G ProSe direct link security mode control procedure was triggered during a 5G ProSe direct link re-keying procedure and the integrity protection algorithm currently in use for the 5G ProSe direct link is different from the null integrity protection algorithm, checking that the selected security algorithms IE in the PROSE DIRECT LINK SECURITY MODE COMMAND message do not include the null integrity protection algorithm.

If the target UE did not include a $K_{NRP}$ ID in the PROSE DIRECT LINK ESTABLISHMENT REQUEST message, the target UE included a Re-authentication indication in the PROSE DIRECT LINK REKEYING REQUEST message or the initiating UE has chosen to derive:
a) a new $K_{NRP}$ if the direct communication is not between the 5G ProSe remote UE and the 5G ProSe UE-to-network relay UE; the target UE shall derive $K_{NRP}$ as specified in 3GPP TS 33.536 [37];
b) a new $K_{NRP}$, if the direct communication is between the 5G ProSe remote UE and the 5G ProSe UE-to-network relay UE and the security procedure over user plane as specified in 3GPP TS 33.503 [34] is used, the target UE shall derive $K_{NRP}$ as specified in 3GPP TS 33.536 [37]; or
c) a new $K_{NR\_ProSe}$, if the direct communication is between the 5G ProSe remote UE and the 5G ProSe UE-to-network relay UE and the security procedure over control plane as specified in 3GPP TS 33.503 [34]

is used, the target UE shall derive $K_{NR\_ProSe}$ as specified in 3GPP TS 33.536 [37]; and the target UE shall choose the 2 LSBs of $K_{NRP}$ ID to ensure that the resultant $K_{NRP}$ ID will be unique in the target UE. The target UE shall form $K_{NRP}$ ID from the received MSB of $K_{NRP}$ ID and its chosen 2 LSBs of $K_{NRP}$ ID and shall store the complete $K_{NRP}$ ID with $K_{NRP}/K_{NR\_ProSe}$.

NOTE 1: If the direct communication is not between the 5G ProSe remote UE and the 5G ProSe UE-to-network relay UE, the $K_{NRP}$ ID holds the ID that corresponds to $K_{NRP}$. If the direct communication is between the 5G ProSe remote UE and the 5G ProSe UE-to-network relay UE, the $K_{NRP}$ ID holds the ID that corresponds to $K_{NRP}$ (if security procedure over user plane is used) or $K_{NR\_ProSe}$ (if security procedure over control plane is used).

If the GPI is included in the PROSE DIRECT LINK SECURITY MODE COMMAND message and the direct communication is between the 5G ProSe remote UE and the 5G ProSe UE-to-network relay UE, the target UE shall derive the UP-PRUK and obtain the UP-PRUK ID from the GPI, and use the UP-PRUK in deriving the $K_{NRP}$, according to the security procedure over user plane as specified in 3GPP TS 33.503 [34].

If the target UE accepts the PROSE DIRECT LINK SECURITY MODE COMMAND message, the target UE shall create a PROSE DIRECT LINK SECURITY MODE COMPLETE message. In this message, the target UE:

a) if the 5G ProSe direct link security mode control procedure was triggered during a 5G ProSe direct link establishment procedure:
  1) shall include the PQFI and the corresponding PC5 QoS parameters if the 5G ProSe direct link is not for 5G ProSe direct communication between the 5G ProSe remote UE and the 5G ProSe UE-to-network relay UE; or
  2) may include the PQFI and the corresponding PC5 QoS parameters if the 5G ProSe direct link is for 5G ProSe direct communication between 5G ProSe layer-3 remote UE and 5G ProSe layer-3 UE-to-network relay UE;
  NOTE 2: The PQFI and the corresponding PC5 QoS parameters are not included if the 5G ProSe direct link is for 5G ProSe direct communication between 5G ProSe layer-2 remote UE and 5G ProSe layer-2 UE-to-network relay UE.
b) if IP communication is used and the 5G ProSe direct link security mode control procedure was triggered during a 5G ProSe direct link establishment procedure, shall include an IP address configuration IE set to one of the following values:
  1) "IPv6 router" if only IPv6 address allocation mechanism is supported by the target UE, i.e., acting as an IPv6 router;
  2) "DHCPv4 server" if only IPv4 address allocation mechanism is supported by the target UE, i.e., acting as a DHCPv4 server;
  3) "DHCPv4 server & IPv6 Router" if both IPv4 and IPv6 address allocation mechanism are supported by the target UE; or
  4) "address allocation not supported" if neither IPv4 nor IPv6 address allocation
mechanism is not supported by the target UE; NOTE 3: The UE doesn't include an IP address configuration IE nor a link local IPv6 address IE if Ethernet or Unstructured data unit type is used for communication.

c) if IP communication is used, the IP address configuration IE is set to "address allocation not supported" and the 5G ProSe direct link security mode control procedure was triggered during a 5G ProSe direct link establishment procedure, shall include a link local IPv6 address IE formed locally based on IETF RFC 4862 [25];

d) if a new $K_{NRP}$ was derived or a new $K_{NRP}$ or $K_{NR\_ProSe}$ was received, shall include the 2 LSBs of $K_{NRP}$ ID; and e) if the 5G ProSe direct link security mode control procedure was triggered during a 5G ProSe direct link establishment procedure, shall include its UE 5G ProSe direct user plane security policy for this 5G ProSe direct link. In the case where the different ProSe services are mapped to the different 5G ProSe direct user plane security policies, when more than one ProSe identifier is included in the PROSE DIRECT LINK ESTABLISHMENT REQUEST message, each of the user plane security polices of those ProSe services shall be compatible, e.g., "user plane integrity protection not needed" and "user plane integrity protection required" are not compatible.

If the selected integrity protection algorithm is not the null integrity protection algorithm, the target UE shall form the $K_{NRP\text{-}sess}$ ID from the MSB of $K_{NRP\text{-}sess}$ ID it had sent in the PROSE DIRECT LINK ESTABLISHMENT REQUEST message or PROSE DIRECT LINK REKEYING REQUEST message and the LSB of $K_{NRP\text{-}sess}$ ID received in the PROSE DIRECT LINK SECURITY MODE COMMAND message. The target UE shall use the $K_{NRP\text{-}sess}$ ID to identify the new security context. After the PROSE DIRECT LINK SECURITY MODE COMPLETE message is generated, the target UE shall pass this message to the lower layers for transmission along with the target UE's layer-2 ID for 5G ProSe direct communication and the initiating UE's layer-2 ID for 5G ProSe direct communication, NRPIK (or $K_{relay\text{-}int}$ when applicable), NRPEK (or $K_{relay\text{-}enc}$ when applicable) if applicable, $K_{NRP\text{-}sess}$ ID, the selected security algorithm as specified in 3GPP TS 33.536 [37] and an indication of activation of the 5G ProSe direct signalling security protection for the 5G ProSe direct link with the new security context, if applicable.

NOTE 4: The PROSE DIRECT LINK SECURITY MODE COMPLETE message and further 5G ProSe direct signalling messages are integrity protected and ciphered (if applicable) at the lower layer using the new security context.

If the 5G ProSe direct link security mode control procedure was triggered during a 5G ProSe direct link re-keying procedure, the target UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

7.2.10.4 5G ProSe Direct Link Security Mode Control Procedure Completion by the Initiating UE Upon receiving a PROSE DIRECT LINK SECURITY MODE COMPLETE message, the initiating UE shall stop timer T5089. If the selected integrity protection algorithm is not the null integrity protection algorithm, the UE checks the integrity of the PROSE DIRECT LINK SECURITY MODE COMPLETE message. If the integrity check passes, the initiating UE shall then continue the procedure which triggered the 5G ProSe direct link security mode control procedure. If the selected integrity protection algorithm is the null integrity protection algorithm, the UE continues the procedure without checking the integrity protection.

After receiving the PROSE DIRECT LINK SECURITY MODE COMPLETE message, the initiating UE shall delete the old security context it has for the target UE, if any.

7.2.10.5 5G ProSe Direct Link Security Mode Control Procedure not Accepted by the Target UE If the PROSE DIRECT LINK SECURITY MODE COMMAND message cannot be accepted, the target UE shall send a PROSE DIRECT LINK SECURITY MODE REJECT message and the target UE shall abort the ongoing procedure that triggered the initiation of the 5G ProSe direct link security mode control procedure unless the ongoing procedure is a 5G ProSe direct link establishment procedure and the Target user info is not included in the PROSE DIRECT LINK ESTABLISHMENT REQUEST message. The PROSE DIRECT LINK SECURITY MODE REJECT message contains a PC5 signalling protocol cause IE indicating one of the following cause values:
- #5: lack of resources for 5G ProSe direct link;
- #7: integrity failure;
- #8: UE security capabilities mismatch;
- #9: LSB of $K_{NRP\text{-}sess}$ ID conflict;
- #10: UE PC5 unicast signalling security policy mismatch;
- #14: Authentication synchronisation error; or
- #111: protocol error, unspecified.

If this 5G ProSe direct link security mode control procedure is triggered during the 5G ProSe direct link establishment procedure and the implementation-specific maximum number of established NR 5G ProSe direct links has been reached, then the target UE shall send a PROSE DIRECT LINK SECURITY MODE REJECT message containing PC5 signalling protocol cause value #5 "lack of resources for 5G ProSe direct link".

If the PROSE DIRECT LINK SECURITY MODE COMMAND message cannot be accepted because the 5G ProSe direct link security mode control procedure was triggered during a 5G ProSe direct link establishment procedure, that the selected security algorithms IE in the PROSE DIRECT LINK SECURITY MODE COMMAND message included the null integrity protection algorithm and the target UE's 5G ProSe direct signalling integrity protection policy is set to "Signalling integrity protection required", the target UE shall include PC5 signalling protocol cause #10 "UE PC5 unicast signalling security policy mismatch" in the PROSE DIRECT LINK SECURITY MODE REJECT message.

If the PROSE DIRECT LINK SECURITY MODE COMMAND message cannot be accepted because the 5G ProSe direct link security mode control procedure was triggered during a 5G ProSe direct link re-keying procedure, the integrity protection algorithm currently in use for the 5G ProSe direct link is different from the null integrity protection algorithm and the selected security algorithms IE in the PROSE DIRECT LINK SECURITY MODE COMMAND message include the null integrity protection algorithm, the target UE, the target UE shall include PC5 signalling protocol cause #10 "UE PC5 unicast signalling security policy mismatch" in the PROSE DIRECT LINK SECURITY MODE REJECT message.

If the target UE detects that the received UE security capabilities IE in the PROSE DIRECT LINK SECURITY MODE COMMAND message has been altered compared to the latest values that the target UE sent to the initiating UE in the PROSE DIRECT LINK ESTABLISHMENT REQUEST message or PROSE DIRECT LINK REKEYING REQUEST message, the target UE shall include PC5 signalling protocol cause #8 "UE security capabilities mismatch" in the PROSE DIRECT LINK SECURITY MODE REJECT message.

If the target UE detects that the LSB of $K_{NRP\text{-}sess}$ ID included in the PROSE DIRECT LINK SECURITY MODE COMMAND message are set to the same value as those received from another UE in response to the target UE's PROSE DIRECT LINK ESTABLISHMENT REQUEST message, the target UE shall include PC5 signalling protocol cause #9 "LSB of $K_{NRP\text{-}sess}$ ID conflict" in the PROSE DIRECT LINK SECURITY MODE REJECT message.

If the 5G ProSe direct link security mode control procedure is for direct communication between the 5G ProSe remote UE and the 5G ProSe UE-to-network relay UE, and the PROSE DIRECT LINK SECURITY MODE COMMAND message cannot be accepted due to a synchronisation error when processing the authentication vector contained in the GPI sent by the 5G ProSe UE-to-network relay UE to the 5G ProSe remote UE, if any, the target UE shall include PC5 signalling protocol cause #14 "Authentication synchronisation error" in the PROSE DIRECT LINK SECURITY MODE REJECT message and shall include the RAND and AUTS parameters in the PROSE DIRECT LINK SECURITY MODE REJECT message.

After the PROSE DIRECT LINK SECURITY MODE REJECT message is generated, the target UE shall pass this message to the lower layers for transmission along with the initiating UE's layer-2 ID for 5G ProSe direct communication and the target UE's layer-2 ID for 5G ProSe direct communication.

Upon receipt of the PROSE DIRECT LINK SECURITY MODE REJECT message, the initiating UE shall stop timer T5089, provide an indication to the lower layer of deactivation of the 5G ProSe direct security protection and deletion of security context for the 5G ProSe direct link, if applicable and:

a) if the PC5 signalling protocol cause IE in the PROSE DIRECT LINK SECURITY MODE REJECT message is set to #9 "LSB of $K_{NRP\text{-}sess}$ ID conflict", retransmit the PROSE DIRECT LINK SECURITY MODE COMMAND message with a different value for the LSB of $K_{NRP\text{-}sess}$ ID and restart timer T5089;

b) if the PC5 signalling protocol cause IE in the PROSE DIRECT LINK SECURITY MODE REJECT message is set to #14 "Authentication synchronisation error", the message contained a RAND and an AUTS, and the 5G ProSe direct link security mode control procedure is for direct communication between the 5G ProSe remote UE and the 5G ProSe UE-to-network relay UE, may fetch a fresh GPI from the PKMF by sending a Key Request message including RAND and AUTS as specified in 3GPP TS 33.503 [34]; or c) if the PC5 signalling protocol cause IE is set to the value other than #9 "LSB of $K_{NRP\text{-}sess}$ ID conflict" and other than #14 "Authentication synchronisation error", abort the ongoing procedure that triggered the initiation of the 5G ProSe direct link security mode control procedure.

[ . . . ]

8.2.10.2.3 5G ProSe Remote User Key Request Procedure

8.2.10.2.3.1 General

The purpose of the 5G ProSe remote user key request procedure is for the UE authorized to act as a 5G ProSe remote UE to obtain a UP-PRUK and a UP-PRUK ID.
[ . . . ]

8.2.10.2.4 Key Request Procedure

8.2.10.2.4.1 General

The purpose of the key request procedure is for a UE acting as a 5G ProSe UE-to-network relay to obtain security parameter needed for establishment of 5G ProSe direct link with a 5G ProSe remote UE.

8.2.10.2.4.2 Key Request Procedure Initiation

The UE shall initiate the key request procedure:
a) when the UE acting as a 5G ProSe UE-to-network relay for a relay service code receives a request to establish a 5G ProSe direct link from a 5G ProSe remote UE; and
b) when a 5G ProSe direct link security mode control procedure is rejected by the 5G ProSe remote UE due to the authentication synchronisation error.

The UE shall initiate the key request procedure by sending a PROSE_KEY_REQUEST message with the <key-request> element. In the <key-request> element, the UE:
a) shall include a new transaction ID;
b) shall include the relay service code for which the 5G ProSe direct link is requested to be established;
c) shall include the SUCI or the UP-PRUK ID of the 5G ProSe remote UE, received from the 5G ProSe remote UE;
d) shall include the $K_{NRP}$ freshness parameter 1, received from the 5G ProSe remote UE;
e) shall include the PLMN identity of the HPLMN of the 5G ProSe remote UE, if received from the 5G ProSe remote UE; and
f) if the key request procedure is initiated upon a 5G ProSe direct link security mode control procedure being rejected by the 5G ProSe remote UE due to the authentication synchronisation error, shall include the AUTS and the RAND, received from the 5G ProSe remote UE.

FIG. 8.2.10.2.4.2.1 illustrates the interaction of the UE and the 5G PKMF in the Key request procedure.

Figure 10:
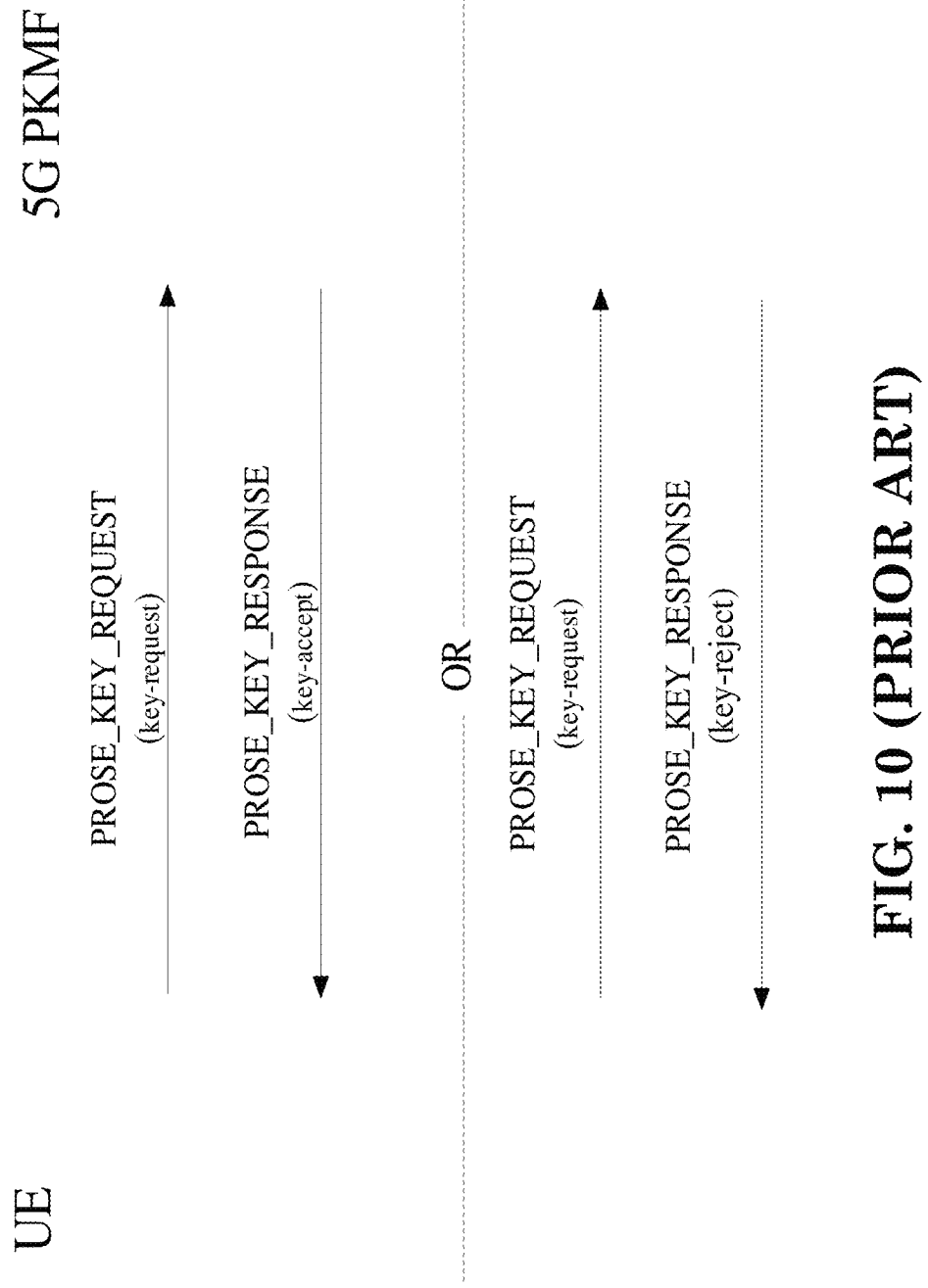
FIG. 10 is a reproduction of FIG. 5.8.9.8.1-1 of 3GPP R2-2314014.

FIG. 8.2.10.2.4.2.1 of 3GPP TS 24.554 V18.2.0, Entitled "Key Request Procedure", is Reproduced as FIG. 10

8.2.10.2.4.3 Key Request Procedure Accepted by the 5G PKMF

Upon receiving a PROSE_KEY_REQUEST message with the <key-request> element, if:
a) the PROSE_KEY_REQUEST message is received over a TLS tunnel established by a UE authorized to act as a 5G ProSe UE-to-network relay for the relay service code indicated in the PROSE_KEY_REQUEST message; and
b) the 5G ProSe remote UE identified by the SUCI, the UP-PRUK ID or the AUTS provided by the 5G ProSe remote UE and the PLMN identity of the HPLMN of the 5G ProSe remote UE, if any, indicated in the PROSE_KEY_REQUEST message is authorized to act as a 5G ProSe remote UE for the relay service code indicated in the PROSE_KEY_REQUEST message;

the 5G PKMF shall send a PROSE_KEY_RESPONSE message containing a <key-accept> element. In the <key-accept> element, the 5G PKMF:
a) shall include the transaction ID set to the value of the transaction ID received in the PROSE_KEY_REQUEST message;
b) shall include the UP-PRUK ID of the 5G ProSe remote UE;
c) shall include the $K_{NRP}$;
d) shall include the $K_{NRP}$ freshness parameter 2; and
e) if the AUTS and the RAND are included in the PROSE_KEY_REQUEST message or a new UP-PRUK is required, then shall include the GBA push information (GPI).

If the 5G ProSe remote UE is served by another 5G PKMF, the 5G PKMF of the 5G ProSe UE-to-network relay requests the 5G PKMF of the 5G ProSe remote UE to check that the 5G ProSe remote UE identified by the SUCI, the UP-PRUK ID or the AUTS provided by the 5G ProSe remote UE and the PLMN identity of the HPLMN of the 5G ProSe remote UE, if any, indicated in the PROSE_KEY_REQUEST message, is authorized to act a 5G ProSe remote UE for the relay service code indicated in the PROSE_KEY_REQUEST message and to provide the UP-PRUK ID of the 5G ProSe remote UE, the $K_{NRP}$, the $K_{NRP}$ freshness parameter 2, and optionally the GBA push information (GPI).

8.2.10.2.4.4 Key Request Procedure Completion by the UE

Upon receipt of the PROSE_KEY_RESPONSE message with the <key-accept> element, if the transaction ID contained in the <key-accept> element matches the value sent by the UE in a PROSE_KEY_REQUEST message with the <key-request> element, the UE shall use the UP-PRUK ID of the 5G ProSe remote UE, the $K_{NRP}$, the $K_{NRP}$ freshness parameter 2 and the GBA push information (GPI), if received, in the 5G ProSe direct link establishment.

8.2.10.2.4.5 Key Request Procedure not Accepted by the 5G PKMF

If the PROSE_KEY_REQUEST message with <key-request> element cannot be accepted by the 5G PKMF, the 5G PKMF shall send a PROSE_KEY_RESPONSE message containing a <key-reject> element. In the <key-reject> element, the 5G PKMF shall include the transaction ID set to the value of the transaction ID received in the PROSE_KEY_REQUEST message and shall include an appropriate PC8 control protocol cause value.

NOTE: The 5G PKMF decides to reject the PROSE_KEY_REQUEST message when e.g. the UP-PRUK is not found in the network.

Upon receipt of the PROSE_KEY_RESPONSE message with the <key-reject> element, if the transaction ID contained in the <key-reject> element matches the value sent by the UE in a PROSE_KEY_REQUEST message with the <key-request> element, the UE shall consider the key request procedure as rejected.

8.2.10.2.4.6 Abnormal Cases in the UE

The following abnormal cases can be identified:
a) Indication from the transport layer of transmission failure of PROSE_KEY_REQUEST message (e.g., after TCP retransmission timeout) The UE shall close the existing secure connection to the 5G PKMF, establish a new secure connection and then restart the key request procedure.
b) No response from the 5G PKMF after the PROSE_KEY_REQUEST message has been successfully delivered (e.g. TCP ACK has been received for the PROSE_KEY_REQUEST message)

The UE shall retransmit the PROSE_KEY_REQUEST message.

NOTE: The timer to trigger retransmission and the maximum number of allowed retransmissions are UE implementation specific.

8.2.10.2.4.7 Abnormal Cases in the 5G PKMF

The following abnormal cases can be identified:
a) Indication from the lower layer of transmission failure of PROSE_KEY_RESPONSE message After receiving an indication from lower layer that the PROSE_KEY_RESPONSE message has not been successfully acknowledged (e.g., TCP ACK is not received), the 5G PKMF shall abort the procedure.

Figure 11:
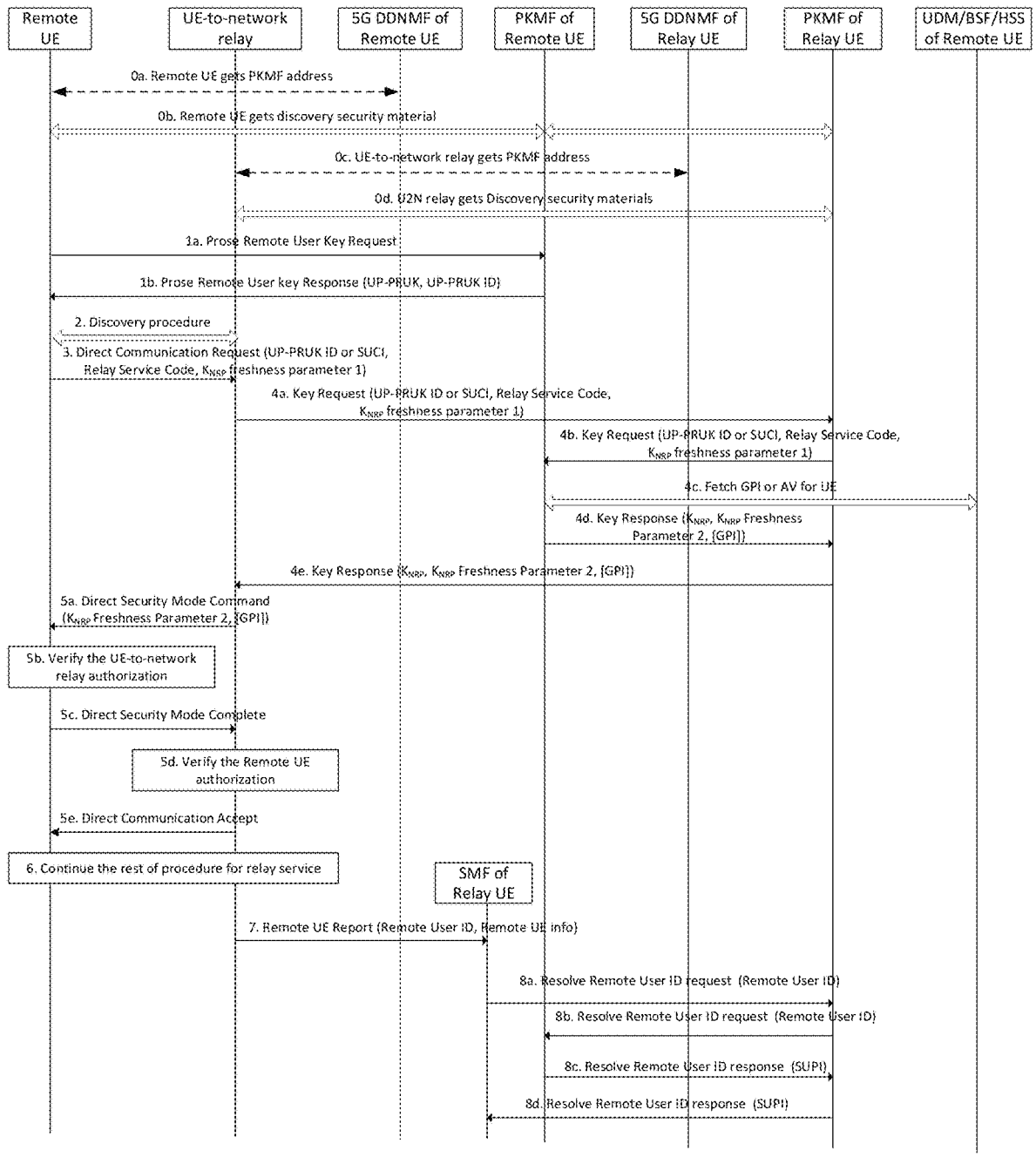
FIG. 11 is a reproduction of FIG. 6.3.3.2.2-1 of 3GPP TS 33.503 V18.0.0.

3GPP TS 33.503 introduced the following concepts:

6.3.3.2.2 PC5 Security Establishment for 5G ProSe UE-to-Network Relay Communication Over User Plane FIG. 6.3.3.2.2-1 of 3GPP TS 33.503 V18.0.0, Entitled "PC5 Security Establishment Procedure for 5G ProSe UE-to-Network Relay Communication Over User Plane", is Reproduced as FIG. 11

[ . . . ]

4a. The 5G ProSe UE-to-Network Relay sends a Key Request message that contains UP-PRUK ID or SUCI, RSC and $K_{NRP}$ freshness parameter 1 to its 5G PKMF. The Key Request message shall also include the HPLMN ID of the 5G ProSe Remote UE if it is included in the DCR.

[ . . . ]

4e. The 5G PKMF of the 5G ProSe UE-to-Network Relay sends the Key Response message to the 5G ProSe UE-to-Network Relay, which includes Remote User ID, $K_{NRP}$, $K_{NRP}$ freshness parameter 2, the GPI if used to calculate a fresh UP-PRUK to the UE-to-Network Relay.

5a. The 5G ProSe UE-to-Network Relay shall derive the session key ($K_{NRP\text{-}sess}$) from $K_{NRP}$ and then derive the confidentiality key (NRPEK) (if applicable) and integrity key (NRPIK) based on the PC5 security policies as specified in TS 33.536 [6]. The 5G ProSe UE-to-Network Relay shall store the Remote User ID received in step 4d. The establishment of KNRP ID and KNRP-sess ID are specified in TS 33.536 [6]. The 5G ProSe UE-to-Network Relay sends a Direct Security Mode Command message to the 5G ProSe Remote UE. This message shall also include the $K_{NRP}$ Freshness Parameter 2 in addition to the parameters specified in TS 33.536 [6] and shall be protected as specified in TS 33.536 [6].

[ . . . ]

5c. The 5G ProSe Remote UE responds with a Direct Security Mode Complete message to the 5G ProSe UE-to-Network Relay as specified in TS 33.536 [6].

[ . . . ]

6.6.3.1 Security of 5G ProSe PC5 Communication for 5G ProSe Layer-3 UE-to-UE Relay with Network Assistance The User Plane (UP) based procedures as specified in clause 6.3.3.2 and the Control Plane (CP) based procedures as specified in clause 6.3.3.3 are used to provide authentication, authorisation and security establishment between the 5G ProSe Layer-3 UE-to-UE Relay and Source End UE with the following modification:

The Remote UE is replaced by the Source End UE.

The UE-to-Network Relay is replaced by the UE-to-UE Relay.

The User Plane (UP) based procedures as specified in clause 6.3.3.2 and the Control Plane (CP) based procedures as specified in clause 6.3.3.3 are used to provide authentication, authorisation and security establishment between the 5G ProSe Layer-3 UE-to-UE Relay and the Target End UE with the following modification:

The Remote UE is replaced by the Target End UE.

The UE-to-Network Relay is replaced by the UE-to-UE Relay.

The procedure is initiated after security establishment between the 5G ProSe Layer-3 UE-to-UE Relay and the Source End UE is successfully completed, as specified in clause 6.7 of TS 23.304 [8].

The steps 4-5d in clause 6.3.3.2.2 and the steps 3-16 in clause 6.3.3.3.2 are not triggered by the Direct Communication Request (DCR) message sent by the UE-to-UE Relay. Upon receiving the DCR message from the UE-to-UE Relay which includes an RSC and if the Network Assistance Security Indicator associated with the RSC indicates the security procedures with network assistance are required which triggers the second hop PC5 link security establishment, the Target End UE shall inform the UE-to-UE Relay to initiate the above steps with the message pair Direct Communication Security Request and Direct Communication Security Accept. The Direct Communication Security Request message shall include the SUCI or UP-/CP-PRUK ID of Target End UE, Relay Service Code and freshness_parameter_1. Upon receiving the Direct Communication Security Request message, the UE-to-UE Relay needs to make sure it is inside network coverage prior to initiating the security procedures.

The Direct Communication Request sent by UE-to-UE relay to target End UE does not include a PRUK-ID, and thus, the security mechanism in clause 6.3.5 is modified to only protect the RSC by modifying Annex A.7 to generate a keystream of the length of the RSC.

The Direct Communication Security Request message is protected by reusing the protection method defined in clause 6.3.5.

FIG. 6.6.3.1-1 shows the high level flow for the second hop PC5 link security between the 5G ProSe Layer-3 UE-to-UE Relay and the Target End UE.

Figure 12:
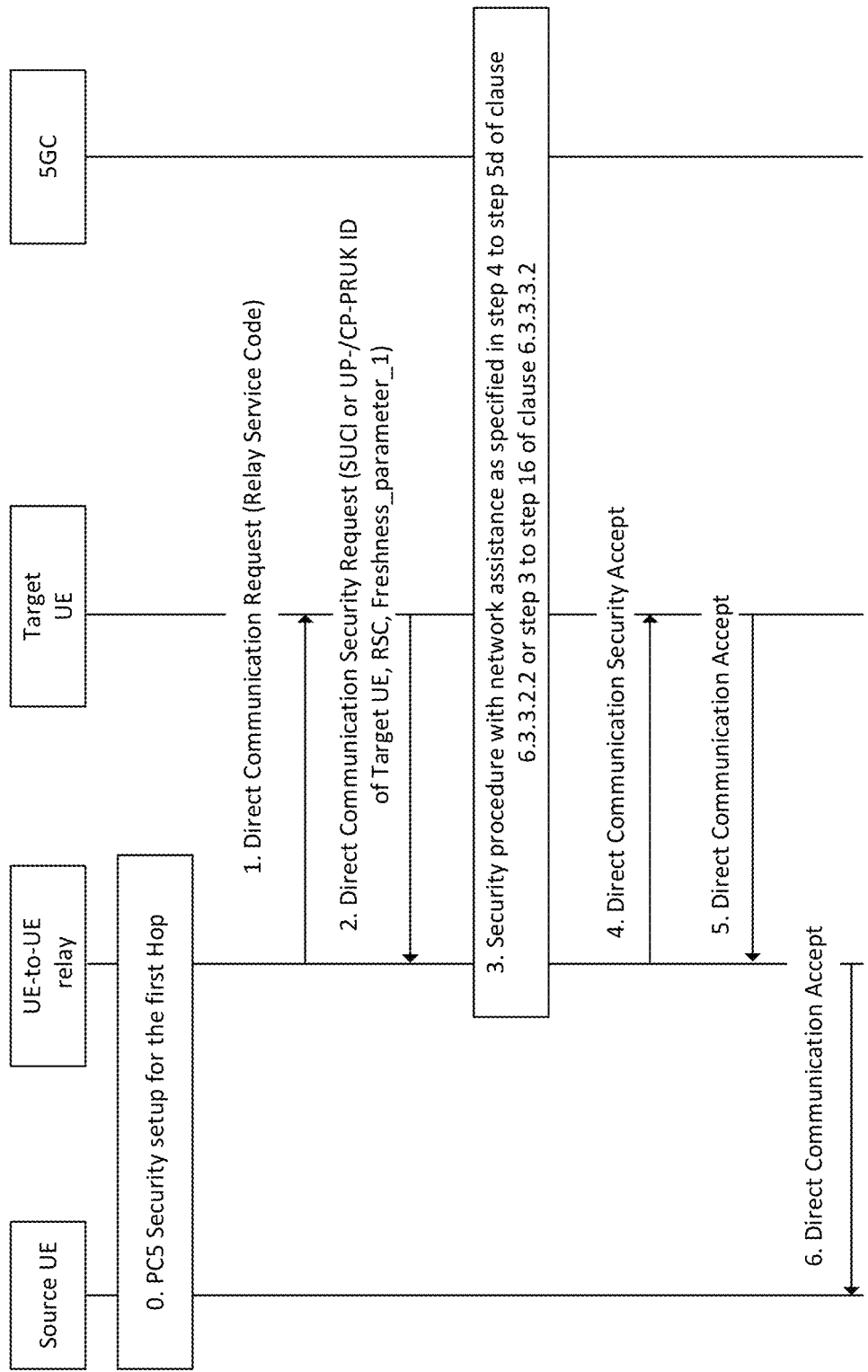
FIG. 12 is a reproduction of FIG. 6.6.3.1-1 of 3GPP TS 33.503 V18.0.0.

FIG. 6.6.3.1-1 of 3GPP TS 33.503 V18.0.0, Entitled "PC5 Security Establishment Procedure Between 5G ProSe UE-to-UE Relay and the Target 5G ProSe End UE", is Reproduced as FIG. 12

3GPP C1-238124 introduced the following concepts:

8a.2.x 5G ProSe UE-to-UE Relay Direct Link Security Establishment Procedure 8a.2.x.1 General The purpose of the 5G ProSe UE-to-UE relay direct link security establishment procedure is for the target 5G ProSe end UE to establish the security between the 5G ProSe UE-to-UE relay UE and the target 5G ProSe end UE.

This procedure is triggered when the target 5G ProSe end UE receives the PROSE DIRECT LINK ESTABLISHMENT REQUEST message from the 5G ProSe UE-to-UE relay UE and the Network Assistance Security Indicator associated with the received relay service code indicates the security procedures with network assistance are required.

8a.2.x.2 5G ProSe UE-to-UE Relay Direct Link Security Establishment Procedure Initiation by Initiating UE The initiating UE shall meet the following pre-conditions before initiating this procedure:
a) the PROSE DIRECT LINK ESTABLISHMENT REQUEST message is received;
b) the initiating UE acting as the target 5G ProSe end UE is authorized to use a 5G ProSe UE-to-UE relay UE in the registered PLMN or local PLMN;
c) the Network Assistance Security Indicator associated with the received relay service code indicates the security procedures with network assistance are required.

The UE shall initiate the 5G ProSe UE-to-UE relay direct link security establishment procedure by sending the PROSE DIRECT LINK SECURITY ESTABLISHMENT REQUEST message. The initiating UE:
a) shall include:
  1) a Nonce_1, if the security procedure over control plane is used as specified in 3GPP TS 33.503 [34]; or
  2) a $K_{NRP}$ freshness parameter 1, if the security procedure over user plane is used as specified in 3GPP TS 33.503 [34];
  set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";
b) shall include its UE security capabilities indicating the list of algorithms that the initiating UE supports for the security establishment of this 5G ProSe direct link;
c) shall include the MSB of $K_{NRP\text{-}sess}$ ID chosen by the initiating UE as specified in 3GPP TS 33.503 [34] if the UE PC5 unicast signalling integrity protection policy is set to "Signalling integrity protection required" or "Signalling integrity protection preferred";
d) shall include its UE PC5 unicast signalling security policy. The Signalling integrity protection policy shall be set to "Signalling integrity protection required";
e) shall include the Relay service code IE set to the relay service code indicating the connectivity service requested by the source 5G ProSe end UE;
f) shall include the UTC-based counter LSB set to the four least significant bits of the UTC-based counter;
g) shall include the UE identity IE set to the SUCI of the initiating UE if:
  1) the 5G ProSe direct link establishment procedure is for direct communication between the target 5G ProSe end UE and the 5G ProSe UE-to-UE relay UE; and
  2) the security for 5G ProSe UE-to-UE relay uses the security procedure over control plane and the initiating UE does not have a valid CP-PRUK as specified in 3GPP TS 33.503 [34], or, the security for 5G ProSe UE-to-UE relay uses the security procedure over user plane and the initiating UE does not have a valid UP-PRUK as specified in 3GPP TS 33.503 [34];
h) shall include the User security key ID IE set to:
  1) UP-PRUK ID of the initiating UE if:
    i) the 5G ProSe direct link establishment procedure is for direct communication between the target 5G ProSe end UE and the 5G ProSe UE-to-UE relay UE;
    ii) the initiating UE has a valid UP-PRUK; and
    iii) the security for 5G ProSe UE-to-UE relay uses the security procedure over user plane as specified in 3GPP TS 33.503 [34]; or
  2) CP-PRUK ID of the initiating UE that is associated with the relay service code of the target UE if:
    i) the 5G ProSe direct link establishment procedure is for direct communication between the target 5G ProSe end UE and the 5G ProSe UE-to-UE relay UE;
    ii) the initiating UE has a valid CP-PRUK is associated with the relay service code of the target UE; and
    iii) the security for 5G ProSe UE-to-UE relay uses the security procedure over control plane as specified in 3GPP TS 33.503 [34];
i) shall include the HPLMN ID of the initiating UE, if the UP-PRUK ID of the initiating UE is included and is not in NAI format (see 3GPP TS 33.503 [34]);
j) shall include the MIC IE set to the calculated MIC value as specified in 3GPP TS 33.503 [34] if the 5G ProSe UE-to-UE relay UE and the target 5G ProSe end UE has the DUIK.

Editor's note: How to set the layer-2 ID of the PROSE DIRECT LINK SECURITY ESTABLISHMENT REQUEST message is FFS.

Editor's note: The retransmission timer of PROSE DIRECT LINK SECURITY ESTABLISHMENT REQUEST message is FFS.

Figure 13:
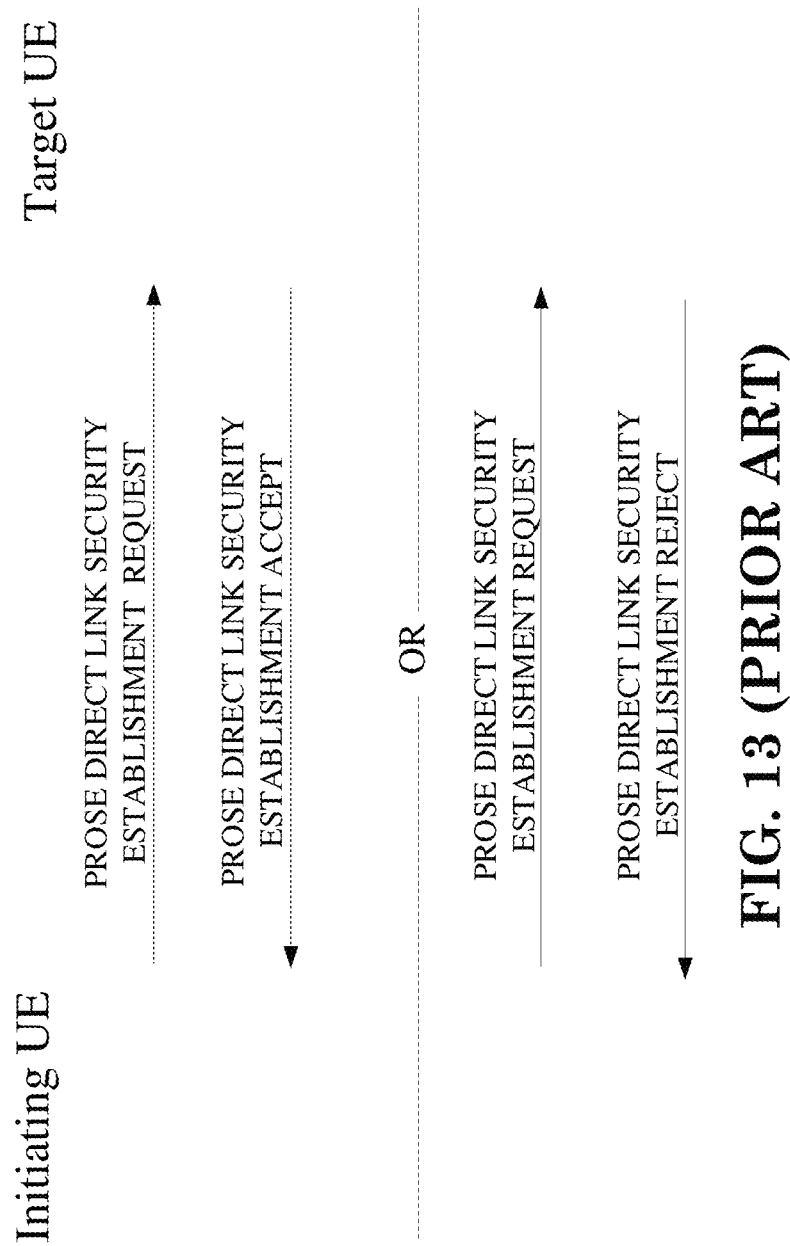
FIG. 13 is a reproduction of FIG. 8a.2.x.2.1 of 3GPP C1-238124.

FIG. 8a.2.x.2.1 of 3GPP C1-238124, Entitled "5G ProSe Direct Link Security Establishment Procedure", is Reproduced as FIG. 13

8a.2.x.3 5G ProSe UE-to-UE Relay Direct Link Security Establishment Procedure Accepted by the Target UE Upon receipt of a PROSE DIRECT LINK SECURITY ESTABLISHMENT REQUEST message, the target UE shall verify the MIC field in the received PROSE DIRECT LINK SECURITY ESTABLISHMENT REQUEST with the DUIK, if any, and decrypts the encrypted:
 a) relay service code; and
 b) UP-PRUK ID or CP-PRUK ID, if received,
using the DUCK, or DUSK with the associated encrypted bitmask used for 5G ProSe UE-to-UE relay discovery (see clause 6.6.3.1 of 3GPP TS 33.503 [34]) and verifies if the relay service code matches with the one that the target UE has sent in the PROSE DIRECT LINK ESTABLISHMENT REQUEST message.
 NOTE 1: If the UE is neither configured with DUCK nor DUSK, the relay service code and the UP-PRUK ID or CP-PRUK ID are not encrypted.

If the target UE is authorized to act as the 5G ProSe UE-to-UE relay UE and is in NG-RAN coverage, the target UE shall proceed with either:
 a) the authentication and key agreement procedure as specified in clause 5.5.4 of 3GPP TS 24.501 [11] if the security procedure over control plane as specified in 3GPP TS 33.503 [34] is used; or
 b) the key request procedure as specified in clause 8.2.10.2.4 if the security procedure over user plane as specified in 3GPP TS 33.503 [34] is used;
and shall initiate 5G ProSe direct link security mode control procedure as specified in clause 7.2.10.

The target UE shall:
 a) if the security procedure over control plane as specified in 3GPP TS 33.503 [34] is used, request a new $K_{NR\_ProSe}$ according to the security procedure over user plane as specified in 3GPP TS 33.503 [34]; or
 b) if the security procedure over user plane as specified in 3GPP TS 33.503 [34] is used, request a new $K_{NRP}$ according to the security procedure over user plane.
 NOTE 2: How many times the 5G ProSe direct link authentication procedure needs to be performed to derive a new $K_{NRP}$ depends on the authentication method used.

After a new $K_{NRP}$ was derived or after a new $K_{NRP}$ or $K_{NR\_ProSe}$ is received, the target UE shall initiate a 5G ProSe direct link security mode control procedure as specified in clause 7.2.10. The target UE determines whether the PROSE DIRECT LINK SECURITY ESTABLISHMENT REQUEST message can be accepted or not based on the result of the 5G ProSe direct link security mode control procedure.

If the target UE accepts the 5G ProSe direct link security establishment procedure, the target UE shall create a PROSE DIRECT LINK SECURITY ESTABLISHMENT ACCEPT message and pass the message to the lower layers for transmission along with the initiating UE's layer-2 ID for unicast communication and the target UE's layer-2 ID for unicast communication.
 Editor's note: The content of PROSE DIRECT LINK SECURITY ESTABLISHMENT ACCEPT message is FFS.

8a.2.x.4 5G ProSe UE-to-UE Relay Direct Link Security Establishment Procedure Completion by the Initiating UE For each of the PROSE DIRECT LINK SECURITY ESTABLISHMENT ACCEPT message received, the initiating UE shall create a PROSE DIRECT LINK ESTABLISHMENT ACCEPT message as specified in clause 7.2.2.4.

8a.2.x.5 5G ProSe UE-to-UE Relay Direct Link Security Establishment Procedure not Accepted by the Target UE If the PROSE DIRECT LINK SECURITY ESTABLISHMENT REQUEST message cannot be accepted, the target UE shall send a PROSE DIRECT LINK SECURITY ESTABLISHMENT REJECT message. The PROSE DIRECT LINK SECURITY ESTABLISHMENT REJECT message contains a PC5 signalling protocol cause IE set to one of the following cause values:
 #6 Authentication failure
 #7 Integrity failure
 #13 congestion situation;
 #15 security procedure failure of 5G ProSe UE-to-UE relay;
 #111 protocol error, unspecified. If the target UE acting as the 5G ProSe UE-to-UE relay UE is under congestion, the target UE shall send a PROSE DIRECT LINK SECURITY ESTABLISHMENT REJECT message containing PC5 signalling protocol cause value #13 "congestion situation". The target UE may provide a back-off timer value to the initiating UE in the PROSE DIRECT LINK SECURITY ESTABLISHMENT REJECT message.

If the 5G ProSe direct link security establishment procedure fails due to a failure in the security procedure over control plane or security procedure over user plane as specified in 3GPP TS 33.503 [34], the target UE shall send a PROSE DIRECT LINK SECURITY ESTABLISHMENT REJECT message containing PC5 signalling protocol cause value #15 "security procedure failure of 5G ProSe UE-to-UE relay". The target UE shall provide the EAP message if received from the network according to the security procedure over control plane as specified in 3GPP TS 33.503 [34].

If the 5G ProSe direct link security establishment procedure fails due to other reasons, the target UE shall send a PROSE DIRECT LINK SECURITY ESTABLISHMENT REJECT message containing PC5 signalling protocol cause value #111 "protocol error, unspecified".

After sending the PROSE DIRECT LINK SECURITY ESTABLISHMENT REJECT message, the target UE shall provide the following information along with the initiating UE's layer-2 ID for unicast communication and the target UE's layer-2 ID for unicast communication to the lower layer:
 a) an indication of deactivation of the PC5 unicast security protection and deletion of security context for the 5G ProSe direct link, if applicable.

After receiving the PROSE DIRECT LINK SECURITY ESTABLISHMENT REJECT message, the initiating UE shall provide the following information along with the initiating UE's layer-2 ID for unicast communication and the target UE's layer-2 ID for unicast communication to the lower layer:
 a) an indication of deactivation of the PC5 unicast security protection and deletion of security context for the 5G ProSe direct link, if applicable.

[ . . . ]

According to 3GPP TS 23.304, a UE may perform a PC5 unicast link establishment procedure (e.g. Layer-2 link establishment) with a peer UE for establishing a layer-2 link or a unicast link between these two UEs. Basically, the Layer-2 Identity/Identifier (ID) of the peer UE, identified by the Application Layer ID of the peer UE, may be discovered via discovery messages, during the establishment of the PC5 unicast link, or known to the UE via prior sidelink communications, e.g. existing or prior unicast link to the same Application Layer ID, or obtained from application layer service announcements. The initial signaling for the establishment of the PC5 unicast link (i.e. Direct Communication Request) may use the known Layer-2 ID of the peer UE, or a default destination Layer-2 ID associated with the Proximity-based Services (ProSe) service/application configured for PC5 unicast link establishment. During the PC5 unicast link establishment procedure, Layer-2 IDs of the two UEs are exchanged and used for future communication between the two UEs. In addition, according to 3GPP TS 24.554, the two UEs would exchange security information to each other during the PC5 unicast link establishment so that the two UEs use the negotiated security context (including e.g. security algorithm and/or key(s)) for protection of the content of traffic (including e.g. PC5-S signaling, PC5-RRC signaling and/or PC5 user plane data) sent over the PC5 unicast link.

According to 3GPP TS 23.304, UE-to-UE Relay is supported in sidelink communication, which means a relay UE may be used to support data communication between two UEs (e.g. Source End UE/UE1 and Target End UE/UE2) in case these two UEs cannot communicate with each other directly. UE-to-UE relay communication could contain a first-hop direct link established between UE1 and a relay UE and a second-hop direct link established between the relay UE and UE2.

Figure 14:
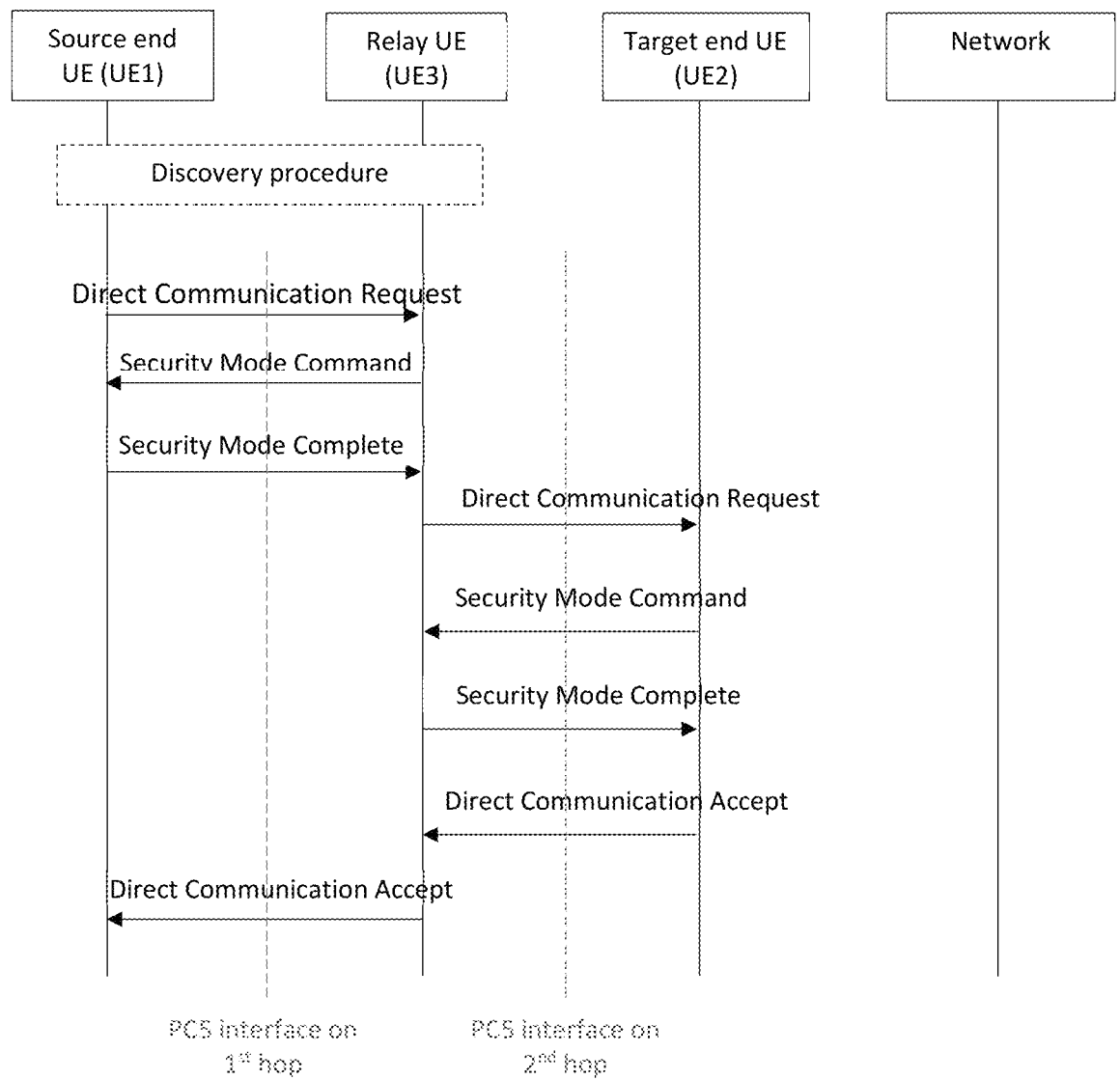
FIG. 14 illustrates an example of a step flow of PC5 security establishment for U2U relay communication without network assistance based on related standards according to one exemplary embodiment.

For supporting security in UE-to-UE (U2U) relay communication, security of 5G ProSe PC5 Communication for 5G ProSe Layer-3 UE-to-UE Relay with network assistance is introduced in clause 6.6.3.1 of 3GPP TS 33.503, and security of 5G ProSe PC5 Communication for 5G ProSe Layer-3 UE-to-UE Relay without network assistance is introduced in clause 6.6.3.2 of 3GPP TS 33.503. It is noted that the service flow in case of without network assistance takes clause 6.7.1.1 of 3GPP TS 23.304 and clauses 7.2.2 and 7.2.10 of 3GPP TS 24.554 into account, and it could be illustrated in FIG. 14. In particular, FIG. 14 illustrates an exemplary step flow of PC5 security establishment for U2U relay communication without network assistance based on related standards.

Figure 15A:
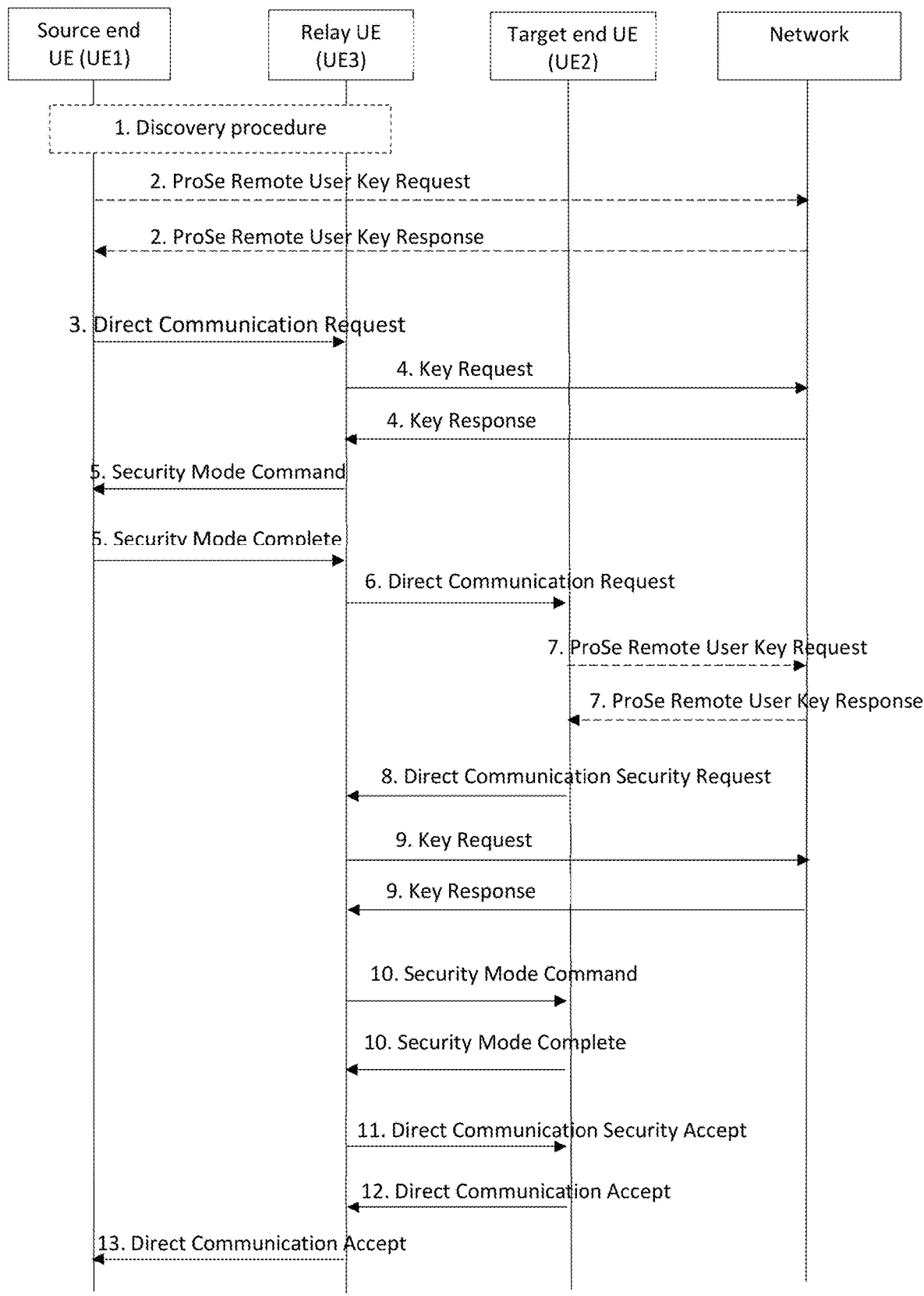
FIG. 15A illustrates an example of a step flow of successful PC5 security establishment for U2U relay communication with network assistance based on related standards according to one exemplary embodiment.

Regarding the service flow in case of security in U2U relay communication with network assistance, it takes at least clauses 7.2.2, 7.2.10, 8.2.10.2.3 and 8.2.10.2.4 of TS 3GPP 24.554 and clauses 6.6.3.1 and 6.3.3.2.2 of 3GPP TS 33.503 into account, and it could be illustrated in FIG. 15A as PC5 security establishment for U2U relay communication with network assistance is successfully completed.

The details of each step in the service flow shown in FIG. 15A are as follows:

1. The source end UE (i.e. UE1) may perform discovery procedure and then find a relay UE which can support U2U relay communication.
2. UE1 could send a message to a network for requesting root security key(s) for the U2U relay communication with the relay UE. This message may be a ProSe Remote User Key Request message. UE1 may send this message to the network if UE1 is within network/cell coverage. If UE1 has a valid root security key (i.e. UP-PRUK), UE1 may include an identifier of the valid root security key (i.e. UP-PRUK ID) in this message.
   UE1 could receive a response message from the network (if UE1 is within network/cell coverage). This message may be a ProSe Remote User Key Response message. This response message may include the requested root security key and a root security key ID (i.e. UP-PRUK ID).
   This message and the corresponding response message may be sent by using IP transport (i.e. sent by using IP packet).
3. UE1 could send a PC5-S message to the relay UE for establishing a $1^{st}$ hop direct link with the relay UE for the U2U relay communication. This PC5-S message may be a direct communication request message. This PC5-S message may include the root security key ID if UE1 has the valid root security key. This PC5-S message may include SUCI of UE1 instead if UE1 has no valid root security key. The other parameters in this PC5-S message could refer to related standards. This PC5-S message may trigger the relay UE to perform a key request procedure with the network (if a relay service code included in this PC5-S message is associated with information (e.g. Network Assistance Security Indicator) indicating the security establishment with network assistance is required).
   This PC5-S message may be sent on PC5 interface, i.e. this PC5-S message may be sent by using a layer-2 ID of UE1 as Source Layer-2 ID and a layer-2 ID of the relay UE as Destination Layer-2 ID. It is noted that the layer-2 ID of the relay UE may be learned by receiving a discovery message from the relay UE during the discovery procedure.
4. In the key request procedure, the relay UE could send a message to the network for requesting middle security key(es) for the U2U relay communication with UE1. This message may be a Key Request message. If the PC5-S message in step 3 includes the root security key ID, the root security key ID may be included in this message. If the PC5-S message in step 3 includes the Subscription Concealed Identifier (SUCI), the SUCI may be included in this message. The other parameters in this message could refer to related standards.
   The relay UE could receive a response message from the network. This response message may include a middle security key (i.e. $K_{NRP}$) and other parameters as specified in the related standards. If the message sent from the relay UE to the network includes the SUCI, this response message may further include information (e.g. GPI) for UE1 to derive/determine/calculate the middle security key. This information for UE1 to derive/determine/calculate the middle security key may be forwarded to UE1.
   This message and the corresponding response message may be sent by using IP transport.
5. The relay UE could send a PC5-S message to UE1 for establish a security context on the $1^{st}$ hop direct link. This PC5-S message may be a security mode command message. This PC5-S message may include the information (e.g. GPI) for UE1 to derive/determine/calculate the security key (if the SUCI is included in the PC5-S message in step 3).
   The relay UE could receive a response PC5-S message from UE1 for completing establishment of the security context. This response PC5-S message may be a security mode complete message.
   This PC5-S message and the corresponding response PC5-S message may be sent on PC5 interface. This PC5-S message may be sent by using the layer-2 ID of UE1 as Destination Layer-2 ID and a layer-2 ID of the relay UE as Source Layer-2 ID. This response PC5-S message may be sent by using the layer-2 ID of UE1 as Source Layer-2 ID and the layer-2 ID of the relay UE as Destination Layer-2 ID.

6. The relay UE could then send a PC5-S message to UE2 for establish a $2^{nd}$ hop direct link for the U2U relay communication. This PC5-S message may be a direct communication request message. A relay service code may be included in this PC5-S message and may be associated with information (e.g. Network Assistance Security Indicator) indicating the security establishment with network assistance is required.

This PC5-S message may be sent on PC5 interface. This PC5-S message may be sent by using a layer-2 ID of UE2 or a broadcast layer-2 ID as Destination Layer-2 ID and a layer-2 ID of the relay UE as Source Layer-2 ID.

7. UE2 could send a message to the network for requesting root security key(es) for the U2U relay communication with the relay UE. This message may be a ProSe Remote User Key Request message. UE2 may send this message to the network if UE2 is within network/cell coverage. If UE2 has a valid root security key (i.e. UP-PRUK), UE2 may include an identifier of the valid root security key (i.e. UP-PRUK ID) in this message.

UE2 could receive a response message from the network (if UE2 is within network/cell coverage). This response message may include the requested root security key and a root security key ID (i.e. UP-PRUK ID). It is noted that the root security key of UE1 and the root security key of UE2 may be the same or different.

This message and the corresponding response message may be sent by using IP transport (i.e. sent by using IP packet).

8. UE2 could send a PC5-S message to the relay UE for triggering the relay UE to perform a key request procedure with the network. This PC5-S message may be a direct communication security request message. If UE2 has a valid root security key (i.e. UP-PRUK), UE2 may include an identifier of the valid root security key (i.e. UP-PRUK ID) in this message; otherwise, UE2 may include a SUCI of UE2 in this message.

This PC5-S message may be sent on PC5 interface. This PC5-S message may be sent by using the layer-2 ID of UE2 as Source Layer-2 ID and the layer-2 ID of the relay UE as Destination Layer-2 ID.

9. In the key request procedure, the relay UE could send a message to the network for requesting middle security key(es) for the U2U relay communication with UE2. This message may be a Key Request message. If the PC5-S message in step 8 includes the root security key ID (i.e. UP-PRUK ID), the root security key ID may be included in this message. If the PC5-S message in step 8 includes the SUCI, the SUCI may be included in this message. The other parameters in this message could refer to related standards.

The relay UE could receive a response message from the network. This response message may include a middle security key (i.e. $K_{NRP}$) used in the $2^{nd}$ hop direct link and other parameters as specified in the related standards. If the message sent from the relay UE to the network includes the SUCI, this response message may further include information (e.g. GPI) for UE2 to derive/determine/calculate the middle security key. This information for UE2 to derive/determine/calculate the middle security key may be forwarded to UE2. It is noted that the middle security key used in the $1^{st}$ hop direct link and the middle security key used in the $2^{nd}$ hop direct link may be the same or different.

This message and the corresponding response message may be sent by using IP transport.

10. The relay UE could send a PC5-S message to UE2 for establish a security context on the $2^{nd}$ hop direct link. This PC5-S message may be a security mode command message. This PC5-S message may include the information for UE2 to derive/determine/calculate the middle security key (if the SUCI is included in the PC5-S message in step 8).

The relay UE could receive a response PC5-S message from UE1 for completing establishment of the security context. This response PC5-S message may be a security mode complete message.

This PC5-S message and the corresponding response PC5-S message may be sent on PC5 interface. This PC5-S message may be sent by using the layer-2 ID of UE2 as Destination Layer-2 ID and the layer-2 ID of the relay UE as Source Layer-2 ID. This response PC5-S message may be sent by using the layer-2 ID of UE2 as Source Layer-2 ID and the layer-2 ID of the relay UE as Destination Layer-2 ID.

11. The relay UE could send a response PC5-S message corresponding to the PC5-S message in step 8 to UE2. This response PC5-S message may be a direct communication security accept message.

This response PC5-S message may be sent on PC5 interface. This response PC5-S message may be sent by using the layer-2 ID of UE2 as Destination Layer-2 ID and the layer-2 ID of the relay UE as Source Layer-2 ID.

12. UE2 could send a PC5-S message to the relay UE for completing establishment of the $2^{nd}$ hop direct link. This PC5-S message may be a direct communication accept message.

This PC5-S message may be sent on PC5 interface. This PC5-S message may be sent by using the layer-2 ID of UE2 as Source Layer-2 ID and the layer-2 ID of the relay UE as Destination Layer-2 ID.

13. The relay UE could send a PC5-S message to UE1 for completing establishment of the $1^{st}$ hop direct link. This PC5-S message may be a direct communication accept message.

This PC5-S message may be sent on PC5 interface. This PC5-S message may be sent by using the layer-2 ID of UE1 as Destination Layer-2 ID and the layer-2 ID of the relay UE as Source Layer-2 ID.

During the key request procedure between the relay UE and the network for requesting the middle security key used in the $2^{nd}$ hop direct link, it is possible that the time to receive the key response message may exceed a period expected by the relay UE (due to e.g. bad network throughput). Thus, the key request procedure may be considered as failed. In this situation, the relay UE may send a PC5-S reject message corresponding to the PC5-S message used for triggering the relay UE to perform the key request procedure. This PC5-S reject message may be a direct communication security reject message.

Figure 15B:
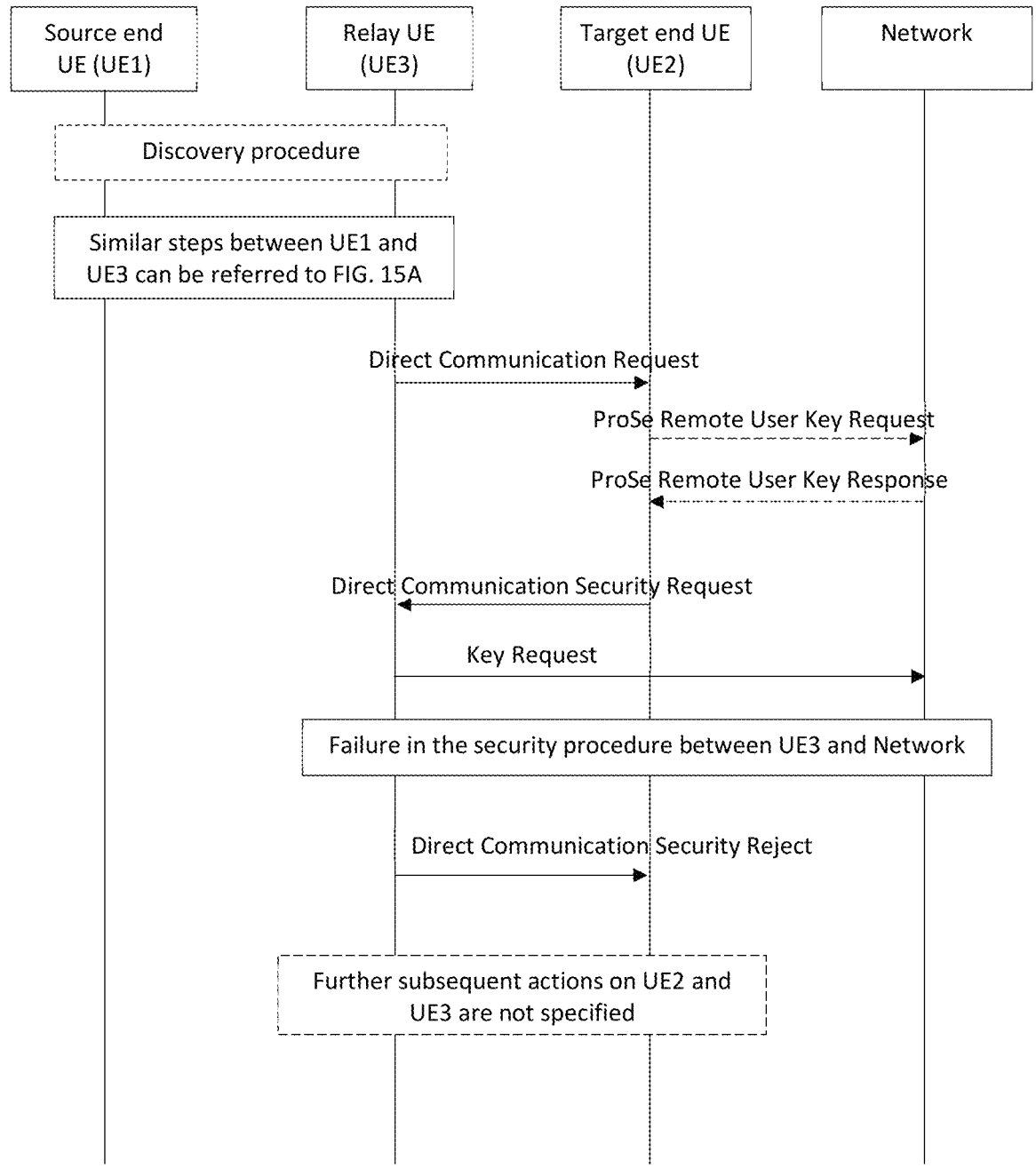
FIG. 15B illustrates an example of a step flow of unsuccessful PC5 security establishment for U2U relay communication with network assistance based on related standards according to one exemplary embodiment.

According to 3GPP TS 33.503, after sending the direct communication security reject message, the relay UE just provides the indication of deactivation of the PC5 unicast security protection and deletion of security context for the 5G ProSe direct link to lower layer. Similarly, after receiving the direct communication security reject message, UE2 does the same action as the relay UE. It is not clear the following actions on the relay UE and UE2. This situation could be illustrated in FIG. 15B. If the relay UE is implemented based on 3GPP TS 33.503, since the relay UE may start a timer T5080 when sending the direct communication request message to UE2, the timer T5080 may expire and thus the relay UE may resend the direct communication request message to UE2 that would be unnecessary.

To avoid above uncertainty, it may be better for UE2 to respond the relay UE with a response message in response to reception of the direct communication security reject message so that the relay UE could stop the timer T5080 (to avoid further retransmission of the direct communication request message). This response message may be a direct communication reject message. This response message may correspond to the direct communication request message sent from the relay UE to UE2. In response to reception of the direct communication reject message from UE2, it seems also feasible for the relay UE to send a direct communication reject message (corresponding to the direct communication request message sent from UE1 to the relay UE) to UE1 since the security establishment with network assistance cannot be satisfied. This concept could be illustrated as Option 1 in FIG. 16, which shows an example of step flow of unsuccessful PC5 security establishment for U2U relay communication with network assistance based on related standards.

Alternatively, in term of signaling overhead reduction, it would be also feasible for the relay UE and UE2 to locally abort the 2$^{nd}$ hop direct link establishment procedure since the direct communication security reject message implies the security establishment with network assistance cannot be satisfied and thus the U2U relay communication cannot be established. By this way, UE2 may not need to send the direct communication reject message to the relay UE. This concept could be illustrated as Option 2 in FIG. 16.

Figure 17:
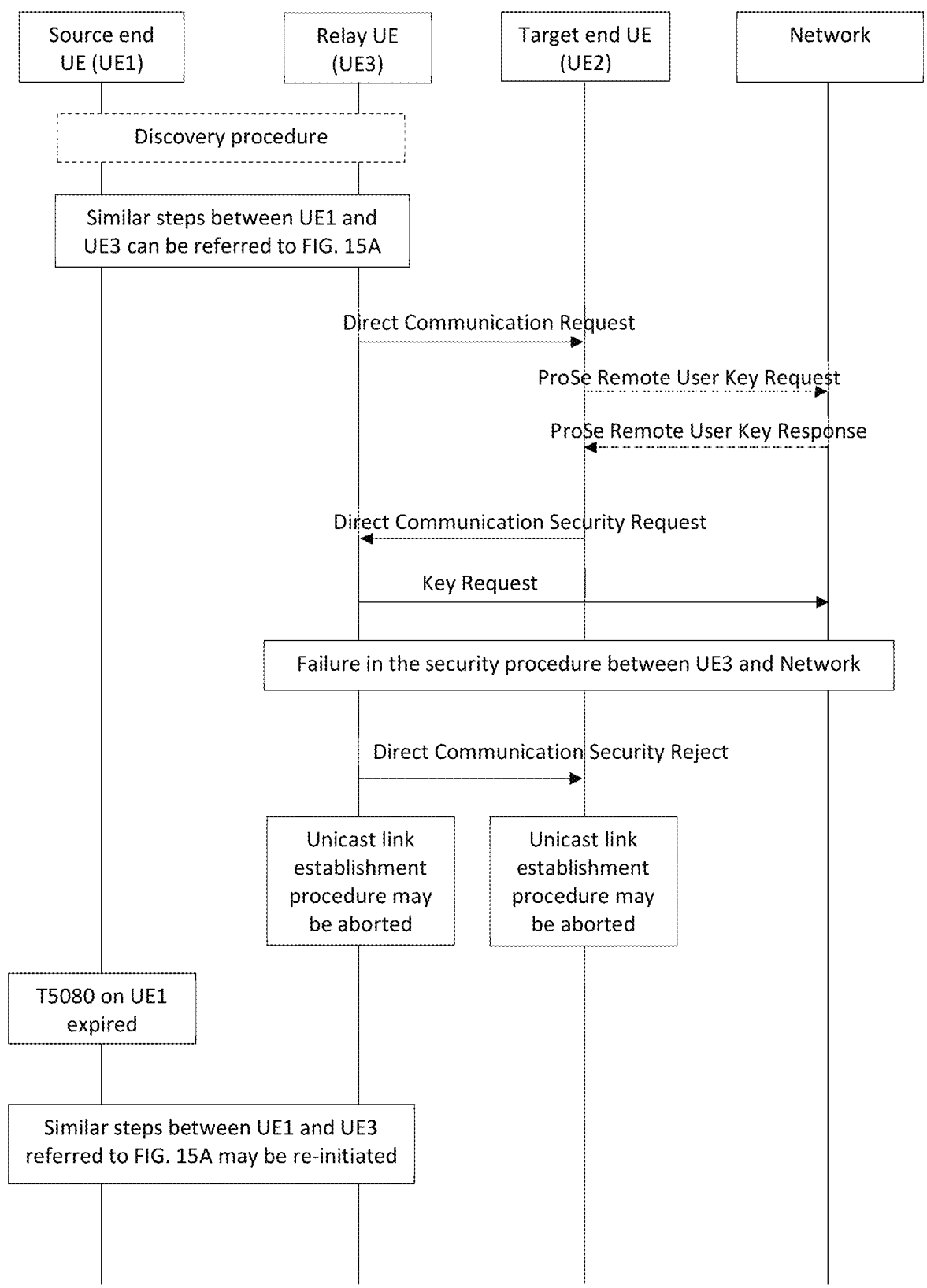
FIG. 17 illustrates an example of a potential issue according to one exemplary embodiment.

If Option 2 is followed, it is noted that there is no action on the relay UE toward UE1 specified in 3GPP TS 24.554. If this is the case, since UE1 may start a timer T5080 when sending the direct communication request message to the relay UE, the timer T5080 may expire and thus UE1 may resend the direct communication request message to the relay UE that would be unnecessary. This situation (or issue) could be illustrated in FIG. 17.

Thus, it would be better for the relay UE to send a direct communication reject message (corresponding to the direct communication request message sent from UE1 to the relay UE) to UE1 in response to aborting the 2$^{nd}$ hop direct link establishment procedure (due to e.g. unsatisfied security establishment with network assistance). It could be illustrated in FIG. 18, which shows an exemplary solution to address the situation (or issue) illustrated in FIG. 17.

The direct communication reject message (sent from UE2 to the relay UE and/or sent from the relay UE to UE1) may include a cause value or an information indicating the security establishment with network assistance cannot be satisfied (for the relay service code as indicated in the direct communication request message).

Figure 16:
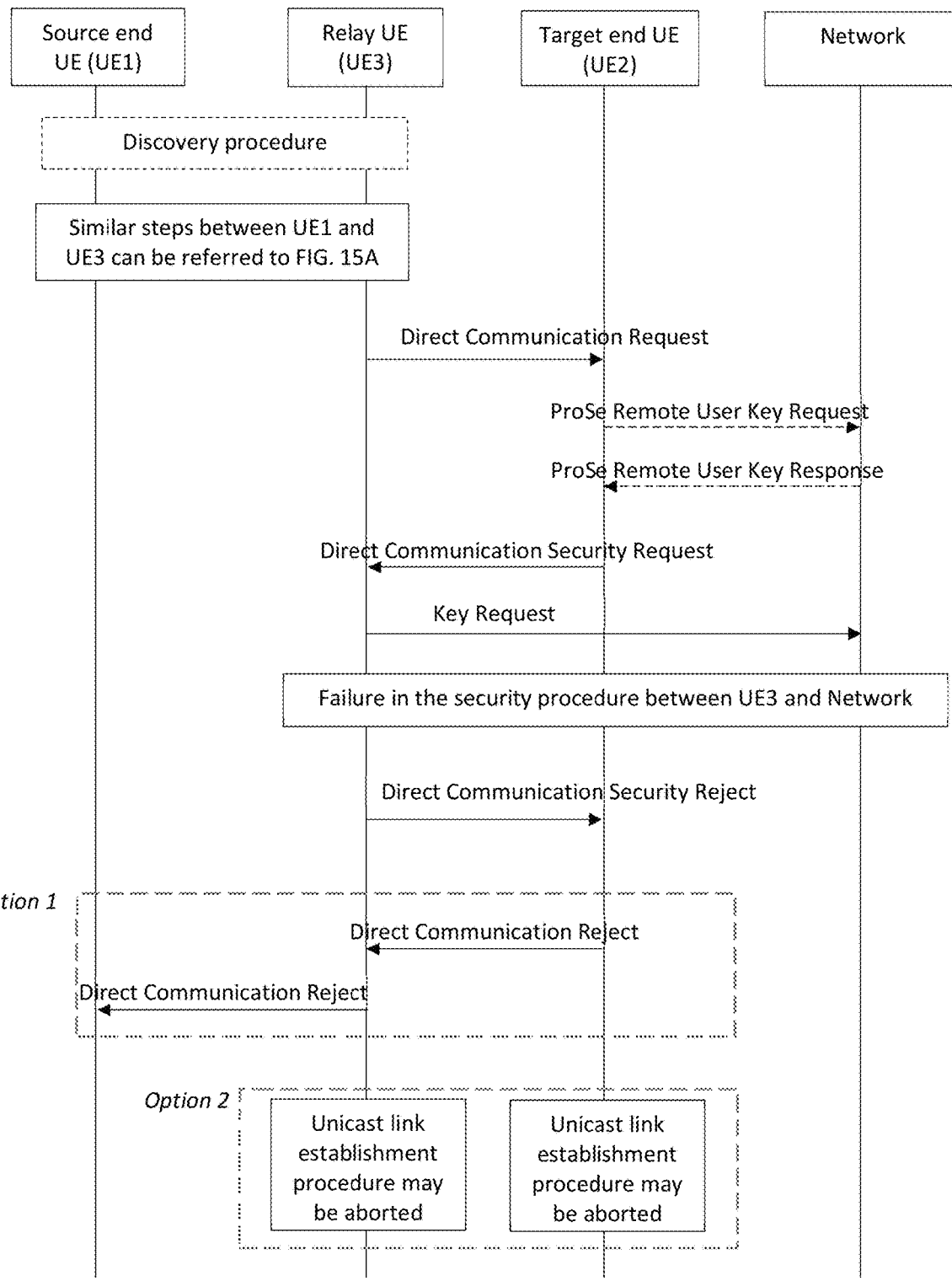
FIG. 16 illustrates an example of a potential way forward for the subsequent actions followed by sending Direct Communication Security Reject according to one exemplary embodiment.
Figure 18:
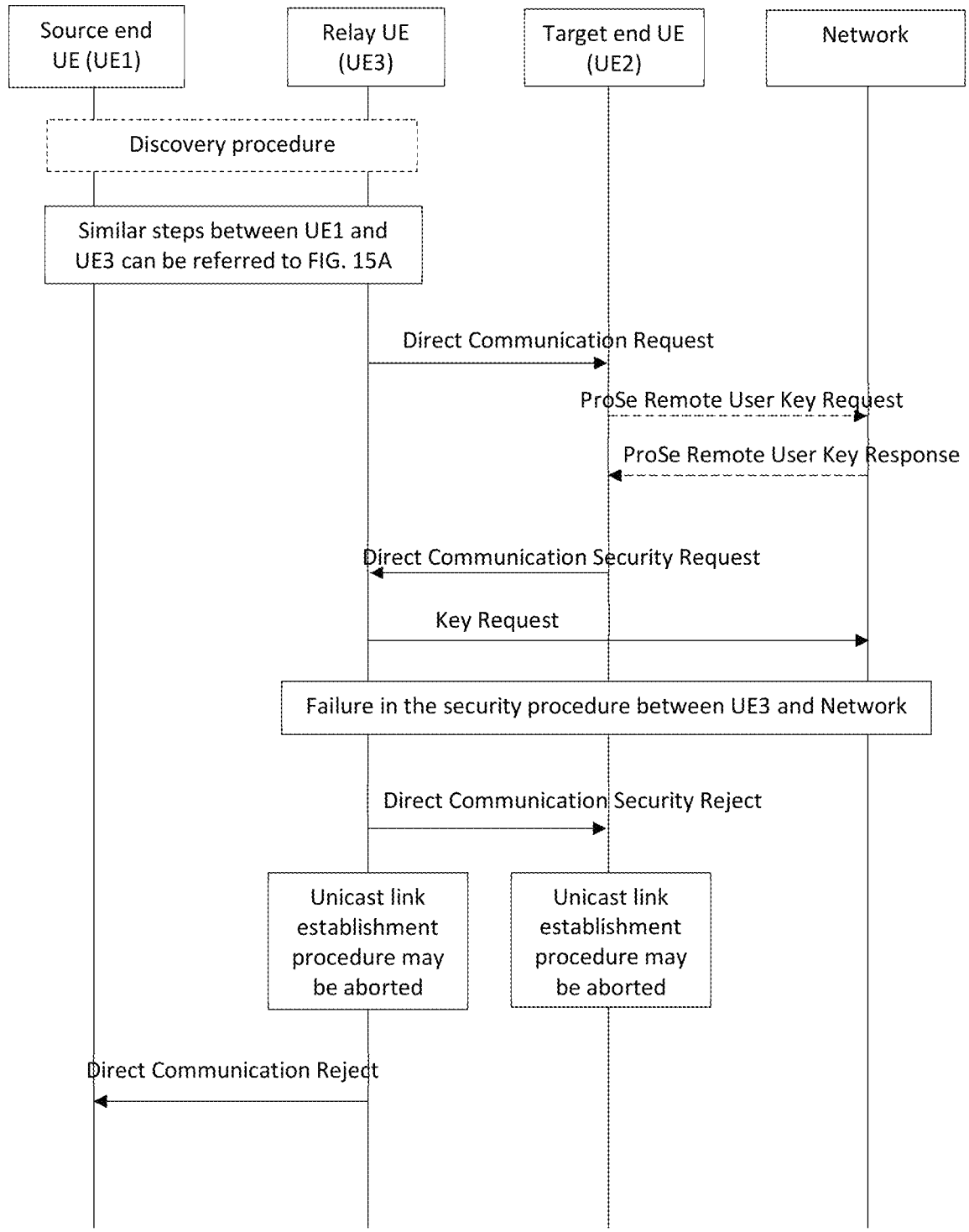
FIG. 18 illustrates an example of a possible solution for addressing the issue illustrated in FIG. 17 according to one exemplary embodiment.

Since the security establishment with network assistance cannot be satisfied, in response to reception of the direct communication reject message from the relay UE, UE1 may perform U2U relay reselection to find another relay UE for establishing the U2U relay communication with UE2. The U2U relay reselection may be a discovery procedure for finding one or more U2U relay UEs. If a new relay UE is found, the service flow may be re-initiated as illustrated in FIG. 15A, FIG. 16, and FIG. 18.

Figure 19:
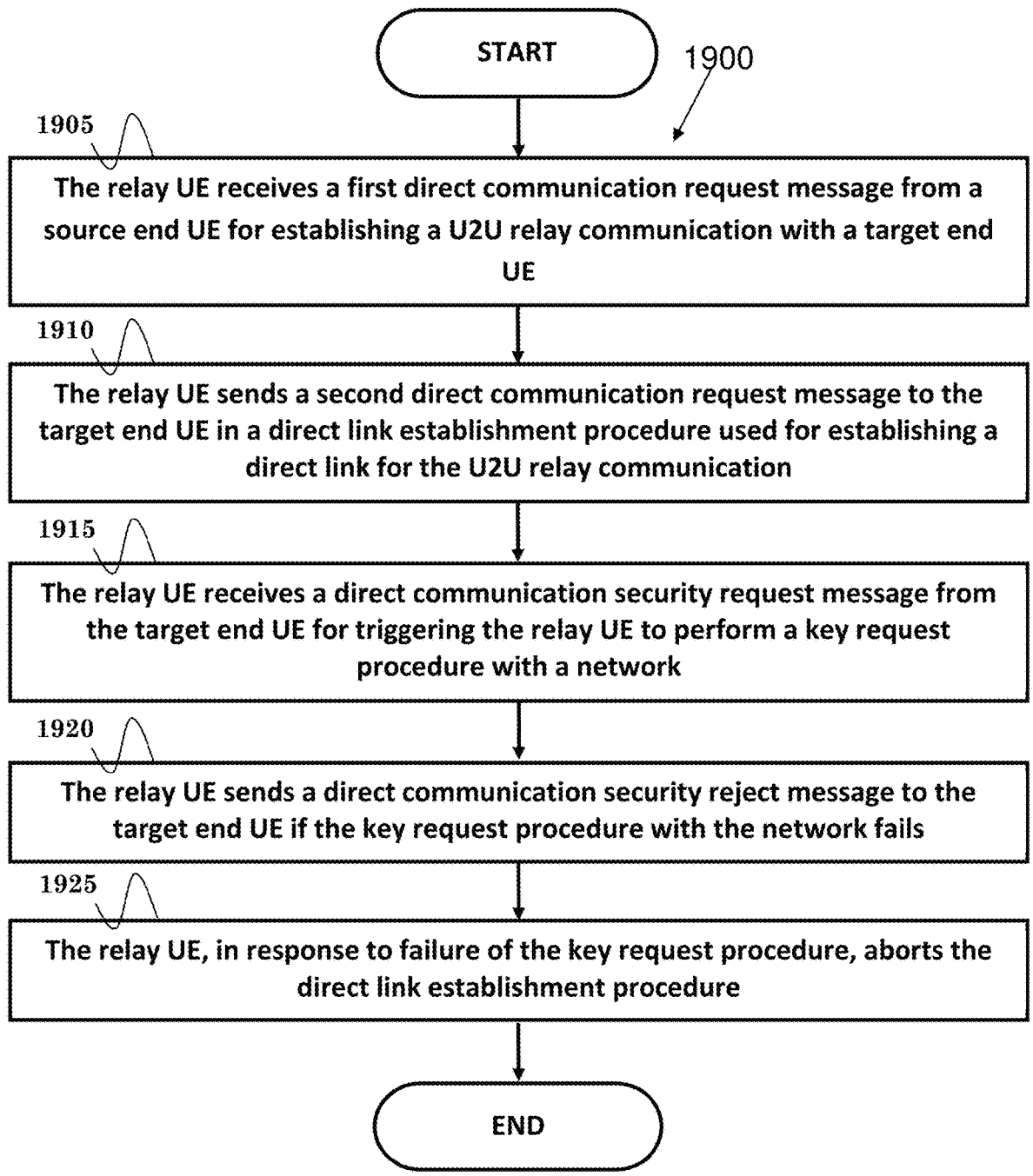
FIG. 19 is a flow chart according to one exemplary embodiment.

FIG. 19 is a flow chart 1900 for a relay User Equipment (UE). In step 1905, the relay UE receives a first direct communication request message from a source end UE for establishing a UE-to-UE (U2U) relay communication with a target end UE. In step 1910, the relay UE sends a second direct communication request message to the target end UE in a direct link establishment procedure used for establishing a direct link for the U2U relay communication. In step 1915, the relay UE receives a direct communication security request message from the target end UE for triggering the relay UE to perform a key request procedure with a network. In step 1920, the relay UE sends a direct communication security reject message to the target end UE if the key request procedure with the network fails. In step 1925, the relay UE, in response to failure of the key request procedure, aborts the direct link establishment procedure.

Referring back to FIGS. 3 and 4, in one exemplary embodiment from the perspective of a relay UE. The relay UE 300 includes a program code 312 stored in the memory 310. The CPU 308 could execute program code 312 to enable the relay UE (i) to receive a first direct communication request message from a source end UE for establishing a U2U relay communication with a target end UE, (ii) to send a second direct communication request message to the target end UE in a direct link establishment procedure used for establishing a direct link for the U2U relay communication, (iii) to receive a direct communication security request message from the target end UE for triggering the relay UE to perform a key request procedure with a network, (iv) to send a direct communication security reject message to the target end UE if the key request procedure with the network fails, and (v) to abort the direct link establishment procedure in response to failure of the key request procedure. Furthermore, the CPU 308 can execute the program code 312 to perform all of the above-described actions and steps or others described herein.

Figure 20:
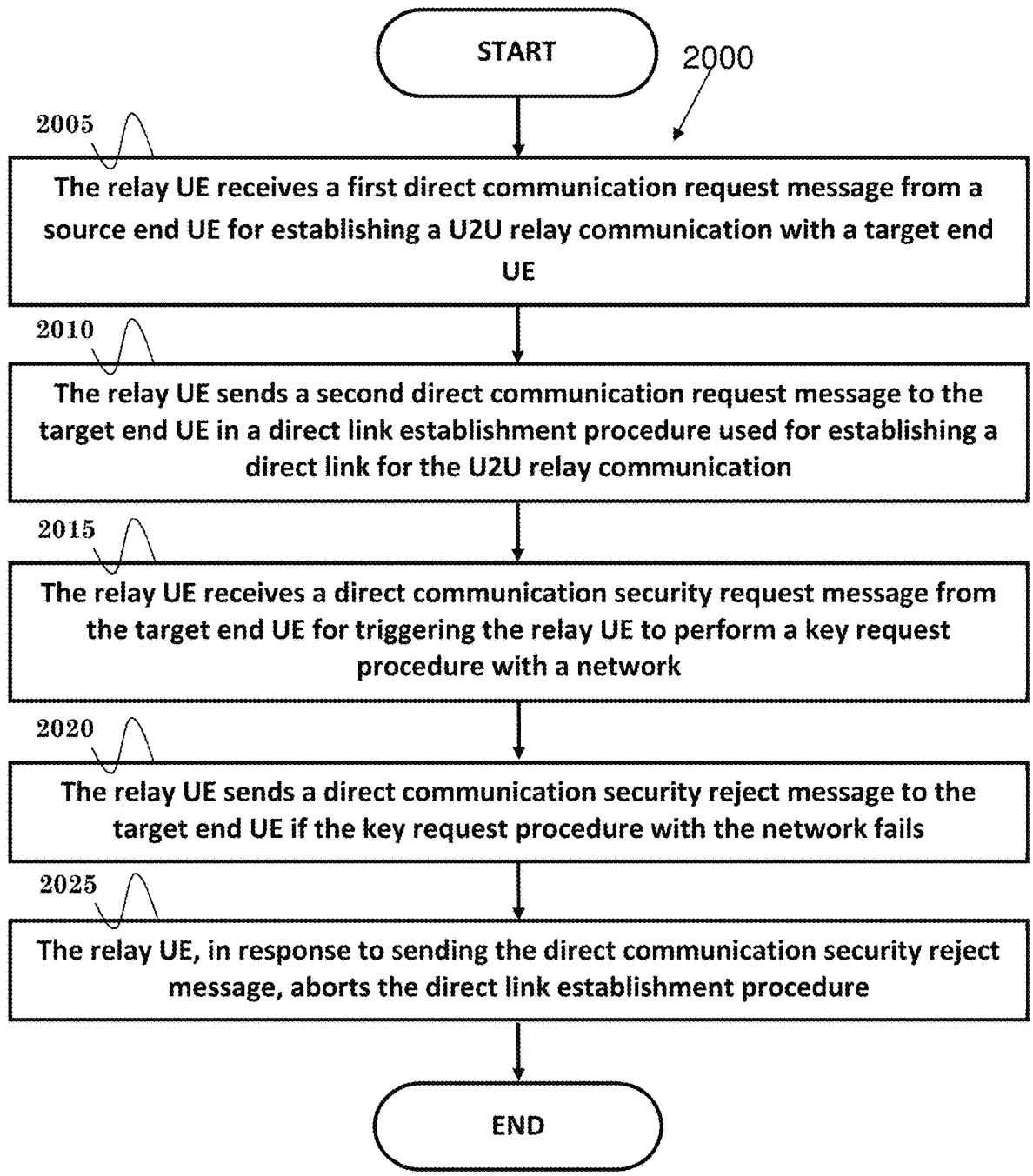
FIG. 20 is a flow chart according to one exemplary embodiment.

FIG. 20 is a flow chart 2000 for a relay User Equipment (UE). In step 2005, the relay UE receives a first direct communication request message from a source end UE for establishing a UE-to-UE (U2U) relay communication with a target end UE. In step 2010, the relay UE sends a second direct communication request message to the target end UE in a direct link establishment procedure used for establishing a direct link for the U2U relay communication. In step 2015, the relay UE receives a direct communication security request message from the target end UE for triggering the relay UE to perform a key request procedure with a network. In step 2020, the relay UE sends a direct communication security reject message to the target end UE if the key request procedure with the network fails. In step 2025, the relay UE, in response to sending the direct communication security reject message, aborts the direct link establishment procedure.

Referring back to FIGS. 3 and 4, in one exemplary embodiment from the perspective of a relay UE. The relay UE 300 includes a program code 312 stored in the memory 310. The CPU 308 could execute program code 312 to enable the relay UE (i) to receive a first direct communication request message from a source end UE for establishing a U2U relay communication with a target end UE, (ii) to send a second direct communication request message to the target end UE in a direct link establishment procedure used for establishing a direct link for the U2U relay communication, (iii) to receive a direct communication security request message from the target end UE for triggering the relay UE to perform a key request procedure with a network, (iv) to send a direct communication security reject message to the target end UE if the key request procedure with the network fails, and (v) to abort the direct link establishment procedure in response to sending the direct communication security reject message. Furthermore, the CPU 308 can execute the program code 312 to perform all of the above-described actions and steps or others described herein.

Figure 21:
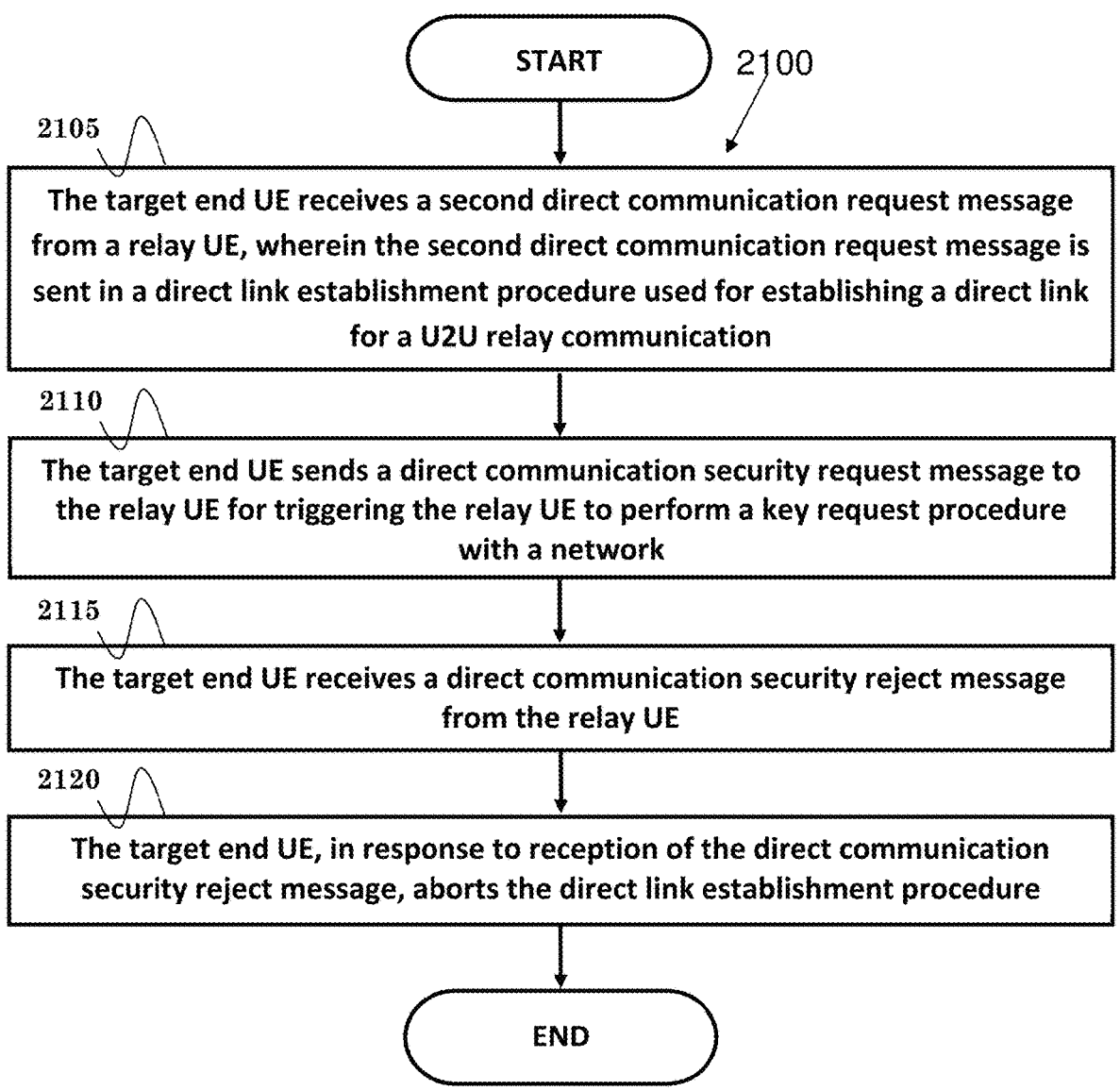
FIG. 21 is a flow chart according to one exemplary embodiment.

FIG. 21 is a flow chart 2100 for a target User Equipment (UE). In step 2105, the target end UE receives a second direct communication request message from a relay UE, wherein the second direct communication request message is sent in a direct link establishment procedure used for establishing a direct link for a UE-to-UE (U2U) relay communication. In step 2110, the target end UE sends a direct communication security request message to the relay UE for triggering the relay UE to perform a key request procedure with a network. In step 2115, the target end UE receives a direct communication security reject message from the relay UE. In step 2120, the target end UE, in response to reception of the direct communication security reject message, aborts the direct link establishment procedure.

Referring back to FIGS. 3 and 4, in one exemplary embodiment from the perspective of a target UE. The target UE 300 includes a program code 312 stored in the memory 310. The CPU 308 could execute program code 312 to enable the target UE (i) to receives a second direct communication request message from a relay UE, wherein the second direct communication request message is sent in a direct link establishment procedure used for establishing a direct link for a U2U relay communication, (ii) to sends a direct communication security request message to the relay UE for triggering the relay UE to perform a key request procedure with a network, (iii) to receive a direct communication security reject message from the relay UE, and (iv) to aborts the direct link establishment procedure in response to reception of the direct communication security reject message. Furthermore, the CPU 308 can execute the program code 312 to perform all of the above-described actions and steps or others described herein.

In the context of the embodiments shown in FIGS. 19, 20, and 21, in one embodiment, the relay UE, in response to aborting the direct link establishment procedure, could send a first direct communication reject message to the source end UE. The relay UE, in response to failure of the key request procedure, could send a first direct communication reject message to the source end UE.

In one embodiment, the first/second direct communication request message may include at least one of user info of a source end UE, user info of the relay UE, user info of the target end UE, and a relay service code. The direct communication security request message may include at least one of SUCI, UP-PRUK ID and $K_{NRP}$ freshness parameter 1. The direct communication security reject message may include a cause value or an information indicating the key request procedure fails. The first direct communication reject message may include a cause value or an information indicating security establishment with network assistance cannot be satisfied. The user info may be an upper layer ID or an application layer ID.

More specifically, in one embodiment, the network may include one or more network nodes containing one of following:
gNB or base station;
AMF;
PKMF of the source end UE;
PKMF of the target end UE; and/or
PKMF of the relay UE.

More specifically, in one embodiment, the PKMF of the source end UE and the PKMF of the relay UE may be the same. The PKMF of the target end UE and the PKMF of the relay UE may be the same. The PKMF of the source end UE and the PKMF of the target end UE may be the same.

More specifically, in one embodiment, the direct link may be a layer-2 link, a unicast link, a PC5 link, a PC5 connection, a PC5-S connection or a PC5-RRC connection. The ProSe Remote User Key Request message may be a PROSE_PRUK_REQUEST message. The ProSe Remote User Key Response message may be a PROSE_PRUK_RESPONSE message. The key request message may be a PROSE_KEY_REQUEST message. The key response message may be a PROSE_KEY_RESPONSE message.

Figure 22:
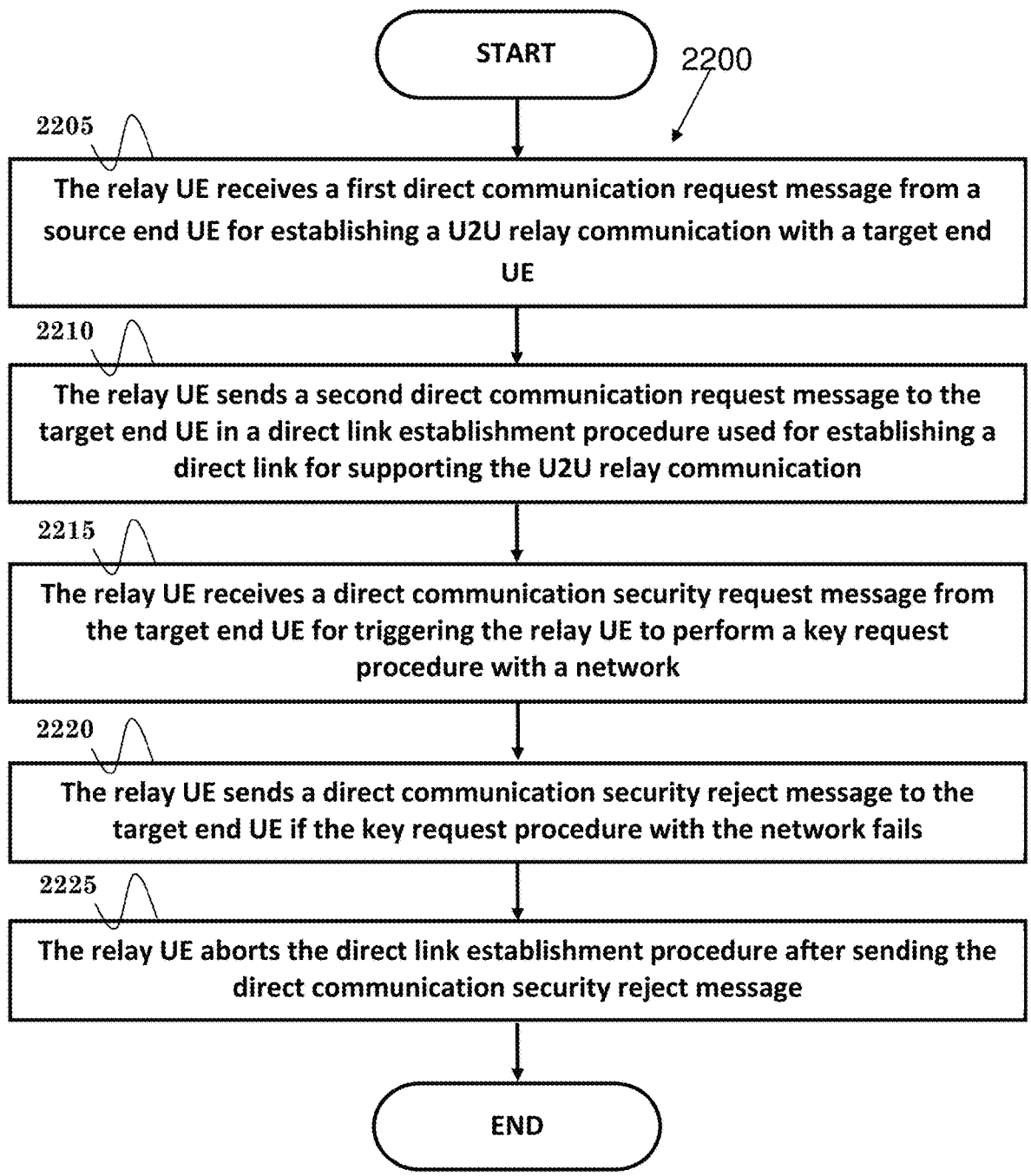
FIG. 22 is a flow chart according to one exemplary embodiment.

FIG. 22 is a flow chart 2200 for a relay User Equipment (UE). In step 2205, the relay UE receives a first direct communication request message from a source end UE for establishing a UE-to-UE (U2U) relay communication with a target end UE. In step 2210, the relay UE sends a second direct communication request message to the target end UE in a direct link establishment procedure used for establishing a direct link for supporting the U2U relay communication. In step 2215, the relay UE receives a direct communication security request message from the target end UE for triggering the relay UE to perform a key request procedure with a network. In step 2220, the relay UE sends a direct communication security reject message to the target end UE if the key request procedure with the network fails. In step 2225, the relay UE aborts the direct link establishment procedure after sending the direct communication security reject message.

In the context of the embodiment shown in FIG. 22, in one embodiment, the relay UE may send a first direct communication reject message to the source end UE after aborting the direct link establishment procedure.

In one embodiment, the first direct communication reject message may correspond to the first direct communication request message.

In one embodiment, the second direct communication request message may include at least a relay service code associated with a Network Assistance Security Indicator indicating security procedures with network assistance are required.

In one embodiment, the first/second direct communication request message may be a PROSE DIRECT LINK ESTABLISHMENT REQUEST message, the direct communication security request message may be a PROSE DIRECT LINK SECURITY ESTABLISHMENT REQUEST message, and/or the direct communication security reject message may be a PROSE DIRECT LINK SECURITY ESTABLISHMENT REJECT message. The first direct communication reject message may be a PROSE DIRECT LINK ESTABLISHMENT REJECT message.

Referring back to FIGS. 3 and 4, in one exemplary embodiment from the perspective of a relay UE. The relay UE 300 includes a program code 312 stored in the memory 310. The CPU 308 could execute program code 312 to enable the relay UE (i) to receive a first direct communication request message from a source end UE for establishing a U2U relay communication with a target end UE, (ii) to send a second direct communication request message to the target end UE in a direct link establishment procedure used for establishing a direct link for supporting the U2U relay communication, (iii) to receive a direct communication security request message from the target end UE for triggering the relay UE to perform a key request procedure with a network, (iv) to send a direct communication security reject message to the target end UE if the key request procedure with the network fails, and (v) to abort the direct link establishment procedure after sending the direct communication security reject message. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE), comprising:
   the relay UE receives a first direct communication request message from a source end UE for establishing a UE-to-UE (U2U) relay communication with a target end UE;
   the relay UE sends a second direct communication request message to the target end UE in a direct link establishment procedure used for establishing a direct link for supporting the U2U relay communication;
   the relay UE receives a direct communication security request message from the target end UE for triggering the relay UE to perform a key request procedure with a network;

the relay UE sends a direct communication security reject message to the target end UE if the key request procedure with the network fails; and the relay UE aborts the direct link establishment procedure after sending the direct communication security reject message.

2. The method of claim 1, further comprising:

the relay UE sends a first direct communication reject message to the source end UE after aborting the direct link establishment procedure.

3. The method of claim 2, wherein the first direct communication reject message corresponds to the first direct communication request message.

4. The method of claim 2, wherein the first direct communication reject message is a PROSE DIRECT LINK ESTABLISHMENT REJECT message.

5. The method of claim 1, wherein the second direct communication request message includes at least a relay service code associated with a Network Assistance Security Indicator indicating security procedures with network assistance are required.

6. The method of claim 1, wherein the first/second direct communication request message is a PROSE DIRECT LINK ESTABLISHMENT REQUEST message, the direct communication security request message is a PROSE DIRECT LINK SECURITY ESTABLISHMENT REQUEST message, and/or the direct communication security reject message is a PROSE DIRECT LINK SECURITY ESTABLISHMENT REJECT message.

7. A relay User Equipment (UE), comprising:

a control circuit;

a processor installed in the control circuit; and a memory installed in the control circuit and operatively coupled to the processor;

wherein the processor is configured to execute a program code stored in the memory to:

receive a first direct communication request message from a source end UE for establishing a UE-to-UE (U2U) relay communication with a target end UE;

send a second direct communication request message to the target end UE in a direct link establishment procedure used for establishing a direct link for supporting the U2U relay communication;

receive a direct communication security request message from the target end UE for triggering the relay UE to perform a key request procedure with a network;

send a direct communication security reject message to the target end UE if the key request procedure with the network fails; and abort the direct link establishment procedure after sending the direct communication security reject message.

8. The relay UE of claim 7, wherein the processor is further configured to execute a program code stored in the memory to:

send a first direct communication reject message to the source end UE after aborting the direct link establishment procedure.

9. The relay UE of claim 8, wherein the first direct communication reject message corresponds to the first direct communication request message.

10. The relay UE of claim 8, wherein the first direct communication reject message is a PROSE DIRECT LINK ESTABLISHMENT REJECT message.

11. The relay UE of claim 7, wherein the second direct communication request message includes at least a relay service code associated with a Network Assistance Security Indicator indicating security procedures with network assistance are required.

12. The relay UE of claim 7, wherein the first/second direct communication request message is a PROSE DIRECT LINK ESTABLISHMENT REQUEST message, the direct communication security request message is a PROSE DIRECT LINK SECURITY ESTABLISHMENT REQUEST message, and/or the direct communication security reject message is a PROSE DIRECT LINK SECURITY ESTABLISHMENT REJECT message.

* * * * *